(12) United States Patent
Hu et al.

(10) Patent No.: US 11,460,667 B2
(45) Date of Patent: Oct. 4, 2022

(54) OPTICAL IMAGING LENS ASSEMBLY

(71) Applicant: ZHEJIANG SUNNY OPTICAL CO., LTD, Zhejiang (CN)

(72) Inventors: Yabin Hu, Zhejiang (CN); Bo Song, Zhejiang (CN); Ling Ding, Zhejiang (CN)

(73) Assignee: ZHEJIANG SUNNY OPTICAL CO., LTD, Zhejiang (CN)

( * ) Notice: Subject to any disclaimer, the term of this patent is extended or adjusted under 35 U.S.C. 154(b) by 80 days.

(21) Appl. No.: 16/489,704

(22) PCT Filed: Sep. 26, 2018

(86) PCT No.: PCT/CN2018/107655
§ 371 (c)(1),
(2) Date: Aug. 29, 2019

(87) PCT Pub. No.: WO2019/095865
PCT Pub. Date: May 23, 2019

(65) Prior Publication Data
US 2021/0278634 A1 Sep. 9, 2021

(30) Foreign Application Priority Data
Nov. 16, 2017 (CN) .......................... 201711139632.6

(51) Int. Cl.
*G02B 13/00* (2006.01)
*G02B 9/64* (2006.01)
(52) U.S. Cl.
CPC .......... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 2015/0268448 A1* | 9/2015 | Kubota | G02B 13/0045 |
| | | | 359/755 |
| 2017/0059826 A1* | 3/2017 | Tang | G02B 13/0045 |
| 2019/0079270 A1* | 3/2019 | Tseng | G02B 13/18 |

FOREIGN PATENT DOCUMENTS

| CN | 203965708 U | 11/2014 |
| CN | 105866924 A | 8/2016 |
| CN | 107015343 A | 8/2017 |
| CN | 107664830 A | 2/2018 |
| CN | 207473184 U | 6/2018 |
| JP | 2011059640 A | 3/2011 |

* cited by examiner

*Primary Examiner* — Wen Huang
(74) *Attorney, Agent, or Firm* — Gang Yu

(57) ABSTRACT

An optical imaging lens assembly is provided. The optical imaging lens includes a first lens (E1), a second lens (E2), a third lens (E3), a fourth lens (E4), a fifth lens (E5), a sixth lens (E6) and a seventh lens (E7) which are provided in sequence from an object side to an image side along an optical axis and have refractive powers. The first lens has a positive refractive power. The fourth lens has a positive refractive power. The sixth lens has a negative refractive power. The seventh lens has a negative refractive power. An object-side surface (S7) of the fourth lens is a concave surface, and an image-side surface (S8) is a convex surface. An object-side surface (S9) of the fifth lens is a convex surface.

16 Claims, 41 Drawing Sheets longitudinal aberration curve (mm)

astigmatism curve (mm)

distortion curve (percentage %)

lateral color curve (μm)

longitudinal aberration curve astigmatism curve distortion curve lateral color curve (μm)

longitudinal aberration curve (mm)

astigmatism curve (mm)

distortion curve (percentage %)

lateral color curve ($\mu$m)

longitudinal aberration curve (mm)

distortion curve image height (percentage %)

lateral color curve (μ m)

astigmatism curve (mm)

distortion curve (percentage %)

lateral color curve (μm)

longitudinal aberration curve distortion curve image height (percentage %)

lateral color curve (μm)

longitudinal aberration curve distortion curve image height (percentage %)

lateral color curve (μm)

longitudinal aberration curve

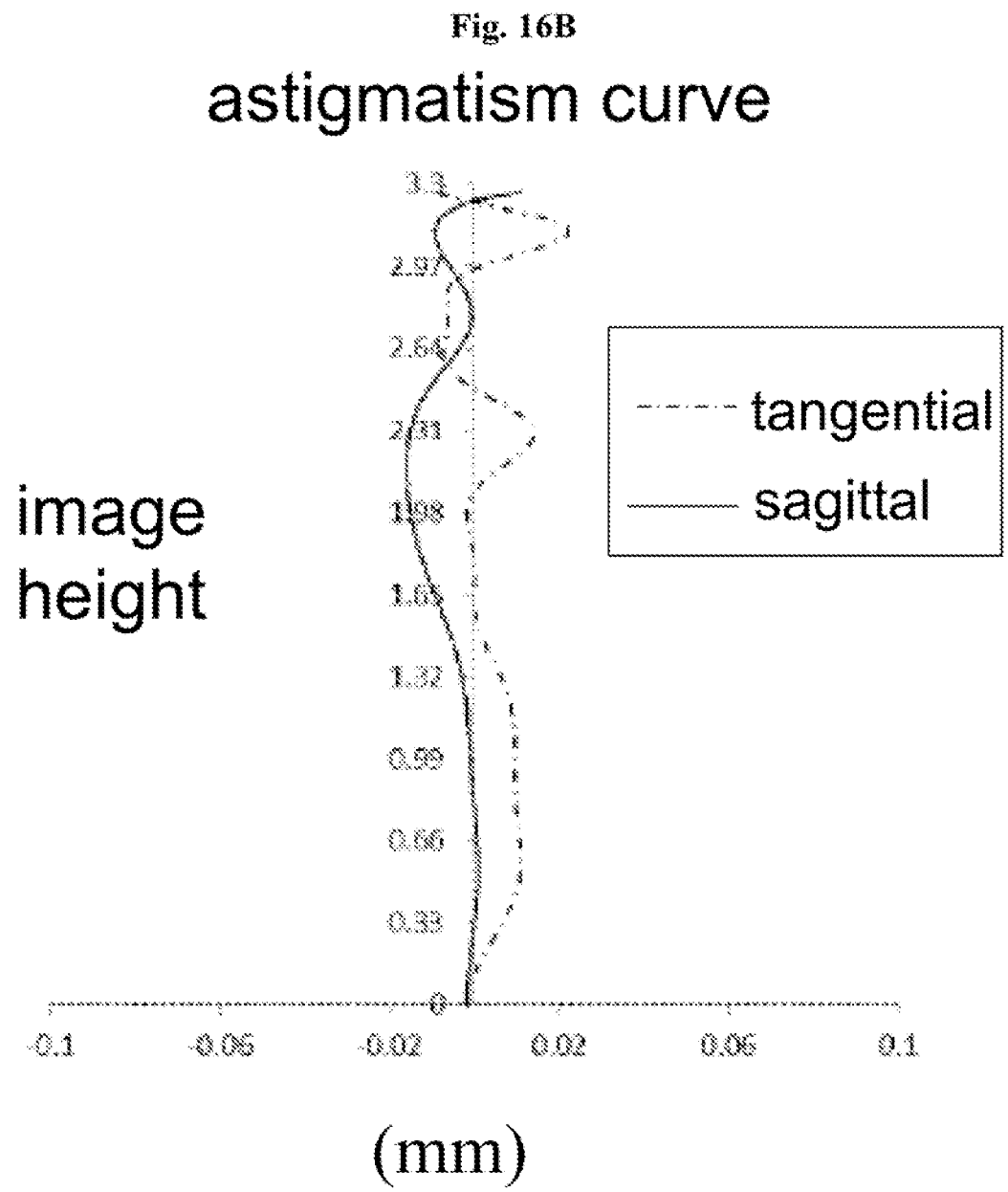

distortion curve (percentage %)

lateral color curve (μm)

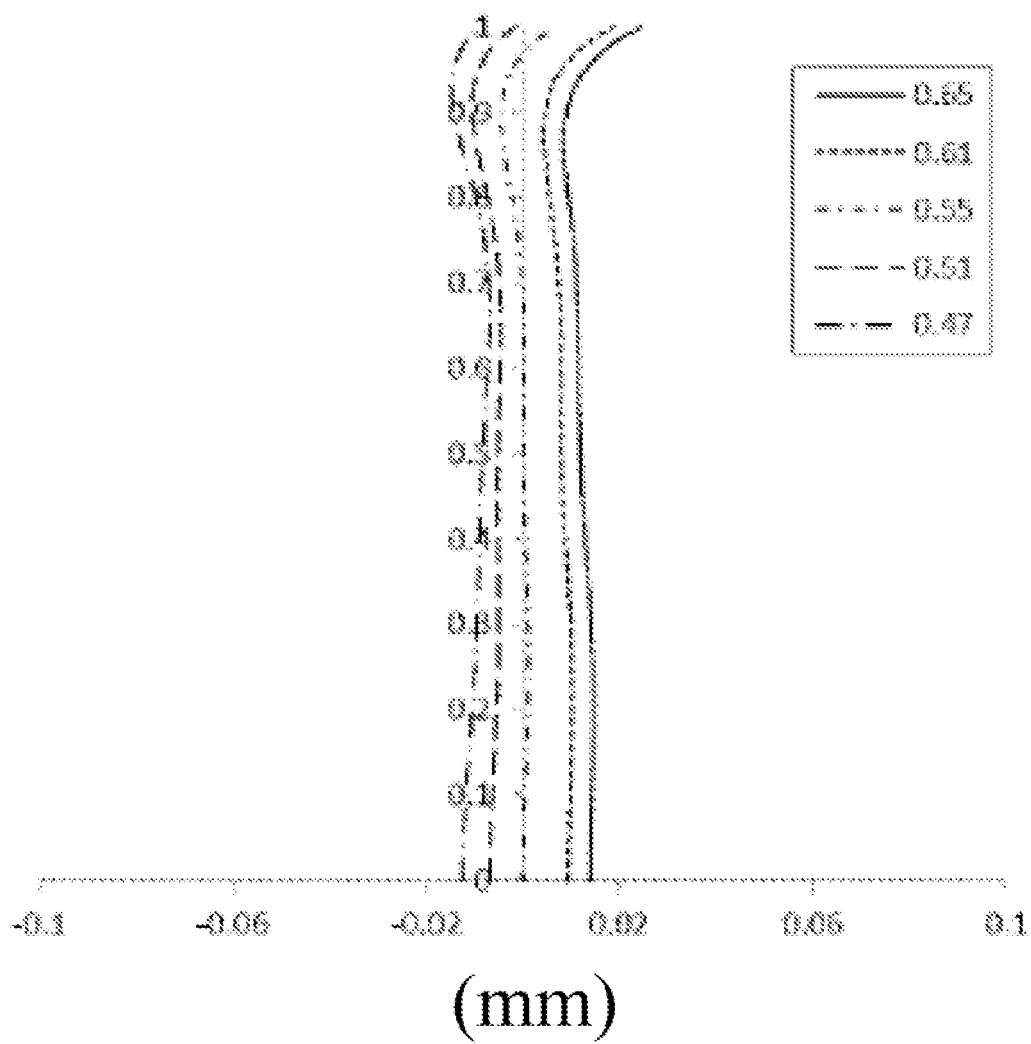

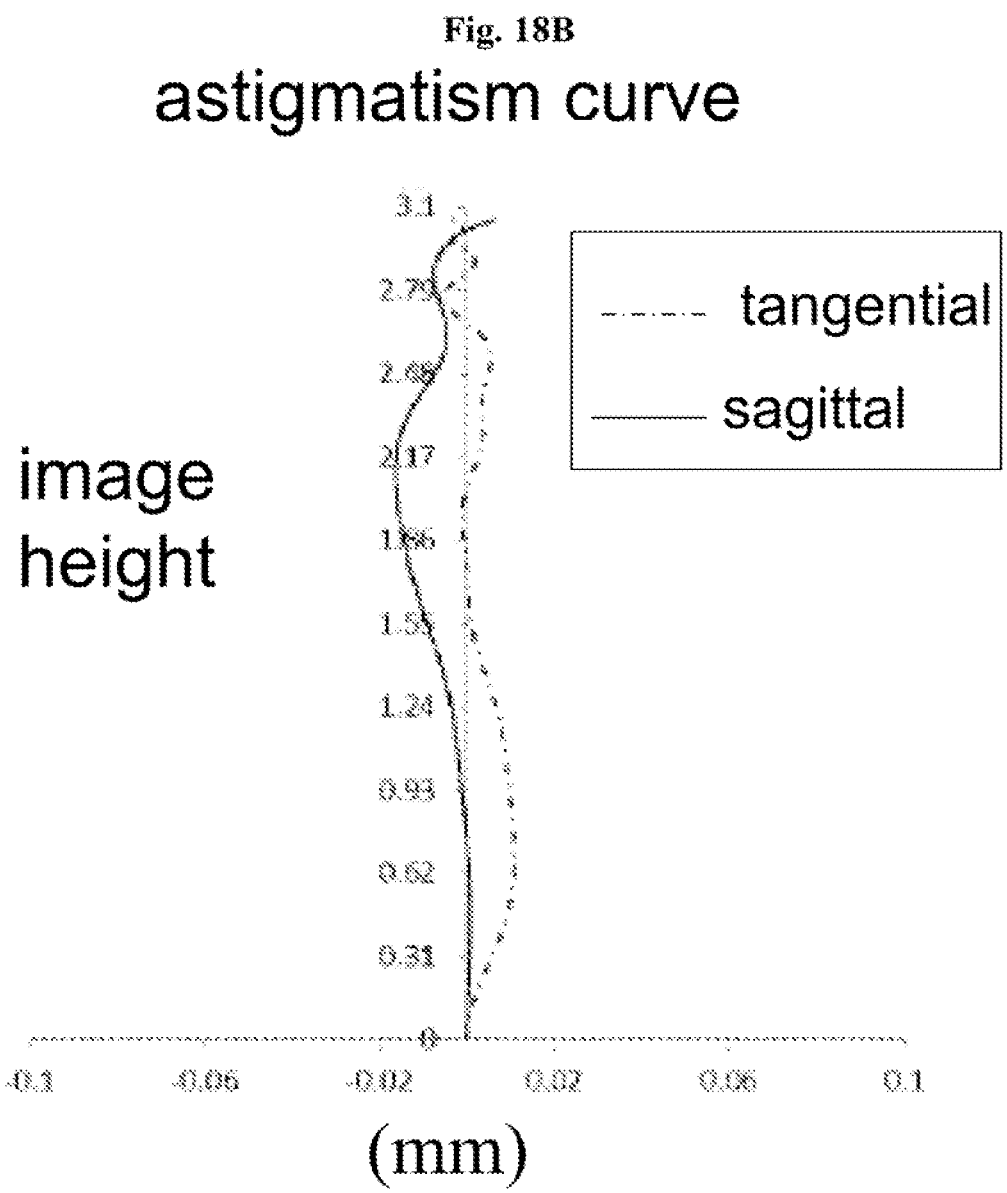

distortion curve (percentage %)

lateral color curve (μm)

longitudinal aberration curve (mm)

astigmatism curve (mm)

distortion curve (percentage %)

lateral color curve (μm)

distortion curve (percentage %)

lateral color curve (μm)

longitudinal aberration curve (mm)

astigmatism curve (mm)

distortion curve (percentage %)

lateral color curve (μm)

longitudinal aberration curve (mm)

astigmatism curve (mm)

distortion curve image height (percentage %)

lateral color curve (μm)

OPTICAL IMAGING LENS ASSEMBLY

CROSS-REFERENCE TO RELATED APPLICATIONS

The present application claims priority to Chinese Patent Application No. 201711139632.6, submitted to the China National Intellectual Property Administration (CNIPA) on Nov. 16, 2017, the contents of which are hereby incorporated by reference in its entirety.

TECHNICAL FIELD

Embodiments of the present disclosure relates to an optical imaging lens assembly, and more particularly to an optical imaging lens assembly including seven lenses.

BACKGROUND

A photosensitive element of a conventional imaging device is usually a Charge-Coupled Device (CCD) or a Complementary Metal-Oxide Semiconductor (CMOS). Performance improvement and size reduction of CCDs and CMOSs provide favorable conditions for development of optical imaging lens assembly. Meanwhile, the miniaturization development trend of electronic devices with imaging devices, for example, smart phones, makes higher requirements on miniaturization and high-quality imaging of optical imaging lens assembly of photographic devices.

SUMMARY

An embodiment of the present disclosure provides an optical imaging lens assembly with seven lenses. The optical imaging lens assembly includes a first lens, a second lens, a third lens, a fourth lens, a fifth lens, a sixth lens and a seventh lens which are provided in sequence from an object side to an image side along an optical axis and have refractive powers. The first lens has a positive refractive power, the fourth lens has a positive refractive power, the sixth lens has a negative refractive power, and the seventh lens has a negative refractive power. An object-side surface of the fourth lens is a concave surface, and an image-side surface is a convex surface. An object-side surface of the fifth lens is a convex surface.

In an exemplary embodiment, an object-side surface of the seventh lens is a concave surface.

In an exemplary embodiment, an effective focal length f1 of the first lens and a center thickness CT1 of the first lens may satisfy the following relationship: $4.5<f1/CT1<6.5$.

In an exemplary embodiment, an effective focal length f4 of the fourth lens and an effective focal length f of the optical imaging lens assembly may satisfy the following relationship: $0.5<f4/f<1.5$.

In an exemplary embodiment, the effective focal length f4 of the fourth lens and a radius of curvature R7 of the object-side surface of the fourth lens may satisfy the following relationship: $-2<f4/R7<-1$.

In an exemplary embodiment, a radius of curvature R9 of the object-side surface of the fifth lens and a radius of curvature R10 of an image-side surface of the fifth lens may satisfy the following relationship: $0<|R9/R10|<10$.

In an exemplary embodiment, an effective focal length f6 of the sixth lens and a center thickness CT6 of the sixth lens may satisfy the following relationship: $32<|f6/CT6|<64$.

In an exemplary embodiment, a maximum inclination angle β7 of an image-side surface of the seventh lens may satisfy the following relationship: $15°≤β7≤51°$.

In an exemplary embodiment, a radius of curvature R13 of an object-side surface of the seventh lens and a center thickness CT7 of the seventh lens may satisfy the following relationship: $-12<R13/CT7<-8$.

In an exemplary embodiment, an effective focal length f of the optical imaging lens assembly and an Entrance Pupil Diameter (EPD) of the optical imaging lens assembly may satisfy the following relationship: $f/EPD≤2.0$.

In an exemplary embodiment, a radius of curvature R3 of an object-side surface of the second lens and a radius of curvature R4 of an image-side surface of the second lens may satisfy the following relationship: $-46<(R3+R4)/(R3-R4)<6$.

In an exemplary embodiment, an effective focal length f1 of the first lens and an effective focal length f7 of the seventh lens may satisfy the following relationship: $0.5<|f1/f7|<1.5$.

According to the application, the seven lenses are adopted, and a surface type, an effective focal length and a center thickness of each lens, on-axis distances between the lenses and the like are reasonably configured to achieve at least one beneficial effect of super thinness, miniaturization, large aperture, high imaging quality and the like of the optical imaging lens assembly.

Another aspect of the application provides an optical imaging lens assembly with seven lenses. The optical imaging lens assembly includes a first lens, a second lens, a third lens, a fourth lens, a fifth lens, a sixth lens and a seventh lens which are provided in sequence from an object side to an image side along an optical axis and have refractive powers. The first lens has a positive refractive power, the fourth lens has a positive refractive power, the sixth lens has a negative refractive power, and the seventh lens has a negative refractive power. An object-side surface of the fourth lens is a concave surface, and an object-side surface of the fifth lens is a convex surface. An effective focal length f4 of the fourth lens and an effective focal length f of the optical imaging lens assembly satisfy the following relationship: $0.5<f4/f<1.5$.

Another aspect of some embodiments of the present disclosure provides an optical imaging lens assembly with seven lenses. The optical imaging lens assembly includes a first lens, a second lens, a third lens, a fourth lens, a fifth lens, a sixth lens and a seventh lens which are provided in sequence from an object side to an image side along an optical axis and have refractive powers. The first lens has a positive refractive power, the fourth lens has a positive refractive power, the sixth lens has a negative refractive power, and the seventh lens has a negative refractive power. An object-side surface of the fourth lens is a concave surface, and an object-side surface of the fifth lens is a convex surface. An effective focal length f1 of the first lens and a center thickness CT1 of the first lens satisfies the following relationship: $4.5<f1/CT1<6.5$.

Another aspect of some embodiments of the present disclosure provides an optical imaging lens assembly with seven lenses. The optical imaging lens assembly includes a first lens, a second lens, a third lens, a fourth lens, a fifth lens, a sixth lens and a seventh lens which are provided in sequence from an object side to an image side along an optical axis and have refractive powers. The first lens has a positive refractive power, the fourth lens has a positive refractive power, the sixth lens has a negative refractive power, and the seventh lens has a negative refractive power. An object-side surface of the fourth lens is a concave surface, and an object-side surface of the fifth lens is a convex surface. An effective focal length f4 of the fourth lens and a radius of curvature R7 of the object-side surface of the fourth lens satisfy the following relationship: $-2<f4/R7<-1$.

Another aspect of some embodiments of the present disclosure provides an optical imaging lens assembly with seven lenses. The optical imaging lens assembly includes a first lens, a second lens, a third lens, a fourth lens, a fifth lens, a sixth lens and a seventh lens which are provided in sequence from an object side to an image side along an optical axis and have refractive powers. The first lens has a positive refractive power, the fourth lens has a positive refractive power, the sixth lens has a negative refractive power, and the seventh lens has a negative refractive power. An object-side surface of the fourth lens is a concave surface, and an object-side surface of the fifth lens is a convex surface. A radius of curvature R9 of the object-side surface of the fifth lens and a radius of curvature R10 of an image-side surface of the fifth lens satisfy the following relationship: $0<|R9/R10|<10$.

Another aspect of some embodiments of the present disclosure provides an optical imaging lens assembly with seven lenses. The optical imaging lens assembly includes a first lens, a second lens, a third lens, a fourth lens, a fifth lens, a sixth lens and a seventh lens which are provided in sequence from an object side to an image side along an optical axis and have refractive powers. The first lens has a positive refractive power, the fourth lens has a positive refractive power, the sixth lens has a negative refractive power, and the seventh lens has a negative refractive power. An object-side surface of the fourth lens is a concave surface, and an object-side surface of the fifth lens is a convex surface. An effective focal length f6 of the sixth lens and a center thickness CT6 of the sixth lens satisfy the following relationship: $32<|f6/CT6|<64$.

Another aspect of some embodiments of the present disclosure provides an optical imaging lens assembly with seven lenses. The optical imaging lens assembly includes a first lens, a second lens, a third lens, a fourth lens, a fifth lens, a sixth lens and a seventh lens which are provided in sequence from an object side to an image side along an optical axis and have refractive powers. The first lens has a positive refractive power, the fourth lens has a positive refractive power, the sixth lens has a negative refractive power, and the seventh lens has a negative refractive power. An object-side surface of the fourth lens is a concave surface, and an object-side surface of the fifth lens is a convex surface. A maximum inclination angle $\beta 7$ of an image-side surface of the seventh lens satisfies the following relationship: $15°\leq\beta 7\leq 51°$.

Another aspect of some embodiments of the present disclosure provides an optical imaging lens assembly with seven lenses. The optical imaging lens assembly includes a first lens, a second lens, a third lens, a fourth lens, a fifth lens, a sixth lens and a seventh lens which are provided in sequence from an object side to an image side along an optical axis and have refractive powers. The first lens has a positive a refractive power, the fourth lens has a positive refractive power, the sixth lens has a negative refractive power, and the seventh lens has a negative refractive power. An object-side surface of the fourth lens is a concave surface, and an object-side surface of the fifth lens is a convex surface. A radius of curvature R13 of an object-side surface of the seventh lens and a center thickness CT7 of the seventh lens satisfy the following relationship: $-12<R13/CT7<-8$.

BRIEF DESCRIPTION OF THE DRAWINGS

Detailed descriptions are made to unrestrictive implementations below in combination with the drawings to make the other characteristics, purposes and advantages of the application more apparent. In the drawings:

FIG. 16A to FIG. 16D illustrate a longitudinal aberration curve, an astigmatism curve, a distortion curve and a lateral color curve of an optical imaging lens assembly respectively according to embodiment 8;

FIG. 18A to FIG. 18D illustrate a longitudinal aberration curve, an astigmatism curve, a distortion curve and a lateral color curve of an optical imaging lens assembly respectively according to embodiment 9;

DETAILED DESCRIPTION OF THE EMBODIMENTS

Figure 1:
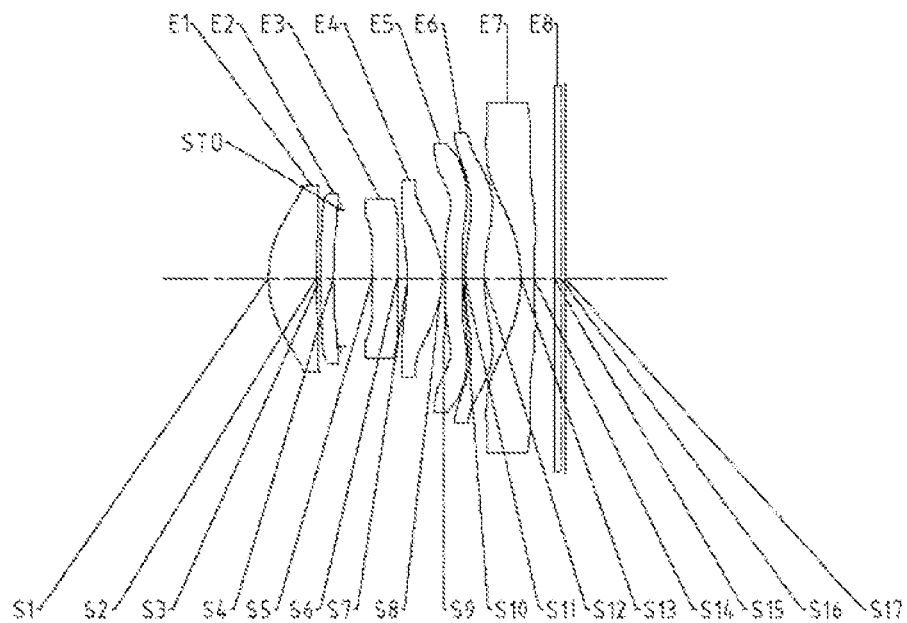
FIG. 1 is a schematic structure diagram of an optical imaging lens assembly according to embodiment 1 of the application.

For understanding the application better, more detailed descriptions will be made to each aspect of the application with reference to the drawings. It is to be understood that these detailed descriptions are only descriptions about the exemplary implementations of the application and not intended to limit the scope of the application in any manner. In the whole specification, the same reference sign numbers represent the same components. Expression "and/or" includes any or all combinations of one or more in associated items which are listed.

It is to be noted that, in the specification, expressions like first, second and third are adopted not to represent any limit to characteristics but only to distinguish one characteristic from another characteristic. Therefore, a first lens discussed below may also be called a second lens or a third lens under the condition of not departing from the teachings of the application.

For convenient description, thicknesses, sizes and shapes of lenses are slightly magnified in the drawings. Specifically, spherical or aspherical shapes in the drawings are shown exemplarily. That is, spherical or aspherical shapes are not limited to the spherical or aspherical shapes shown in the drawings. The drawings are drawn only exemplarily but not strictly to scale.

In the application, a paraxial region refers to a region nearby an optical axis. If a surface of a lens is a convex surface and a position of the convex surface is not defined, it is indicated that at least a paraxial region of the surface of the lens is a convex surface; and if a surface of a lens is a concave surface and a position of the concave surface is not defined, it is indicated that at least a paraxial region of the surface of the lens is a concave surface. A surface, closest to an object, in each lens is called an object-side surface, and a surface, closest to an imaging surface, in each lens is called an image-side surface.

It is also to be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementations of the application are described, "may" is used to represent "one or more implementations of the application". Furthermore, term "exemplary" refers to an example or illustration.

Unless otherwise defined, all terms (including technical terms and scientific terms) used in the application have the same meanings usually understood by those of ordinary skill in the art of the application. It is also to be understood that the terms (for example, terms defined in a common dictionary) should be explained to have meanings consistent with the meanings in the context of a related art and may not be explained with ideal or excessively formal meanings, unless clearly defined like this in the application.

It is to be noted that the embodiments in the application and characteristics in the embodiments may be combined without conflicts. The application will be described below with reference to the drawings and in combination with the embodiments in detail.

The characteristics, principles and other aspects of the application will be described below in detail.

An optical imaging lens assembly according to an exemplary implementation of the application may include, for example, seven lenses with refractive powers, i.e., a first lens, a second lens, a third lens, a fourth lens, a fifth lens, a sixth lens and a seventh lens. The seven lenses are sequentially arranged from an object side to an image side along an optical axis.

In the exemplary implementation, the first lens has a positive refractive power, the fourth lens has a positive refractive power, the sixth lens has a negative refractive power, and the seventh lens has a negative refractive power. An object-side surface of the fourth lens is a concave surface, and an image-side surface is a convex surface. An object-side surface of the fifth lens is a convex surface.

In the exemplary implementation, an object-side surface of the seventh lens is a concave surface.

In the exemplary implementation, an effective focal length f1 of the first lens and a center thickness CT1 of the first lens satisfy the following relationship: $4.5<f1/CT1<6.5$, specifically $4.88 \leq f1/CT1 \leq 6.40$. A ratio of the effective focal length and the center thickness of the first lens is reasonably balanced to correct an aberration of the optical imaging lens assembly and also ensure feasibility of a forming machining process.

In the exemplary implementation, an effective focal length f4 of the fourth lens and an effective focal length f of the optical imaging lens assembly may satisfy the following relationship: $0.5<f4/f<1.5$, specifically $0.89 \leq f4/f5 \leq 1.06$. The relationship between the effective focal length of the fourth lens and the effective focal length of the optical imaging lens assembly is reasonably configured to control aberration influence caused by light deflection under the condition of reducing an axial distance TTL, also reduce an incident angle of light on the object-side surface of the fifth lens as much as possible and favorably improve transmittance of the light.

In the exemplary implementation, the effective focal length f4 of the fourth lens and a radius of curvature R7 of the object-side surface of the fourth lens may satisfy the following relationship: $-2<f4/R7<-1$, specifically $-1.77 \leq f4/R7 \leq 1.30$. This means that the fourth lens may assume a part of a positive refractive power. On the other hand, the relationship between the effective focal length of the fourth lens and the radius of curvature of the object-side surface of the fourth lens is reasonably configured to avoid the risk of generation of a ghost image by a relatively large inclination angle in case of an excessively small radius of curvature of the object-side surface thereof.

In the exemplary implementation, a radius of curvature R9 of the object-side surface of the fifth lens and a radius of curvature R10 of an image-side surface of the fifth lens may satisfy the following relationship: $0<|R9/R10|<10$, specifically $0.07 \leq |R9/R10| \leq 9.44$. The radius of curvature of the object-side surface and image-side surface of the fifth lens are controlled within the range to balance a comatic aberration and astigmatism of the fifth lens and also improve imaging quality of an off-axis field of view.

In the exemplary implementation, an effective focal length f6 of the sixth lens and a center thickness CT6 of the sixth lens may satisfy the following relationship: $32<|f6/CT6|<64$, specifically $32.01 \leq |f6/CT6| \leq 63.07$. Since a refractive power of a lens is related to a center thickness thereof, a ratio of the refractive power and the center thickness of the sixth lens within the above range is controlled to facilitate correction of a comatic aberration and distortion of the optical imaging lens assembly on one hand and, on the other hand, prevent a manufacturability problem brought by an excessively small center thickness.

In the exemplary implementation, a maximum inclination angle $\beta 7$ of an image-side surface of the seventh lens may satisfy the following relationship: $15° \leq \beta 7 \leq 51°$. The maximum inclination angle of the image-side surface of the seventh lens is controlled to avoid a non-ideal lens edge coating caused by a relatively large inclination angle, thereby avoiding manufacturability deterioration of an optical imaging system.

In the exemplary implementation, a radius of curvature R13 of the object-side surface of the seventh lens and a center thickness CT7 of the seventh lens may satisfy the following relationship: $-12<R13/CT7<-8$, specifically $-11.33 \leq R13/CT7 \leq -8.49$. The optical imaging lens assembly of the application usually provides a field angle larger than 80°. The radius of curvature of the object-side surface of the seventh lens and the center thickness of the seventh lens are configured within the above range to limit distortion influence caused by a large field of view angle and also ensure that a chief ray angle of light reaching an image surface in each field of view is relatively large and matched with a sensor chip with a large chief ray angle.

In the exemplary implementation, the effective focal length f of the optical imaging lens assembly and an EPD of the optical imaging lens assembly may satisfy the following relationship: $f/EPD \leq 2.0$, specifically $f/EPD \leq 1.88$. A ratio of the effective focal length and EPD of the optical imaging lens assembly is an F number of the lens, and is valued not to be larger than 2 to equivalently ensure a large aperture. In addition, considering that the system adopts the seven lenses, a large aperture may be achieved under the condition that the degree of design freedom is increased, thereby enhancing a light collection capability of the optical imaging lens assembly.

In the exemplary implementation, a radius of curvature R3 of an object-side surface of the second lens and a radius of curvature R4 of the image-side surface of the second lens may satisfy the following relationship: $-46<(R3+R4)/(R3-R4)<6$, specifically $-45.55 \leq (R3+R4)/(R3-R4) \leq 5.99$. The radius of curvature of the object-side surface and image-side surface of the second lens are controlled within the range to effectively correct astigmatism of the optical imaging lens assembly in a tangential direction.

In the exemplary implementation, the effective focal length f1 of the first lens and the effective focal length f7 of the seventh lens may satisfy the following relationship: $0.5<|f1/f7|<1.5$, specifically $0.96 \leq |f1/f7| \leq 1.24$. The positive and negative refractive power of the two lenses is reasonably configured to correct a lateral chromatic aberration of the system.

In the exemplary implementation, the optical imaging lens assembly may further include at least one diaphragm to improve imaging quality of the lens. For example, the diaphragm may be arranged between the second lens and the third lens.

Optionally, the optical imaging lens assembly may further include an optical filter configured to correct the chromatic aberration and/or configured to protect a photosensitive element on the imaging surface.

The optical imaging lens assembly according to the implementation of the application may adopt multiple lenses, for example, the abovementioned seven. A surface type, a effective focal length and a center thickness of each lens, on-axis distances between the lenses and the like are reasonably configured to effectively reduce a size of the lens, reduce sensitivity of the lens, improve manufacturability of the lens and ensure that the optical imaging lens assembly is more favorable for production and machining and may be applied to a portable electronic product. Meanwhile, the optical imaging lens assembly configured above is further endowed with the beneficial effects of, for example, super thinness, miniaturization, large aperture and high imaging quality.

In the implementation of the application, at least one of mirror surfaces of each lens is an aspherical mirror surface. The aspherical mirror surface has the characteristic that the curvature keeps changing from a center of the lens to a periphery of the lens. Unlike a spherical lens with a constant curvature from a center of the lens to a periphery of the lens, an aspherical lens has a better radius of curvature characteristic and the advantages of improving distortion and improving aberrations. With adoption of the aspherical lens, the aberrations during imaging may be eliminated as much as possible, thereby improving the imaging quality.

However, those skilled in the art should know that the number of the lenses forming the optical imaging lens assembly may be changed without departing from the technical solutions claimed in the application to achieve each result and advantage described in the specification. For example, although descriptions are made in the implementation with seven lenses as an example, the optical imaging lens assembly is not limited to seven lenses. If necessary, the optical imaging lens assembly may further include another number of lenses.

Specific embodiments of the optical imaging lens assembly applied to the abovementioned implementation will further be described below with reference to the drawings.

Embodiment 1

An optical imaging lens assembly according to embodiment 1 of the application will be described below with reference to FIG. 1 to FIG. 2D. FIG. 1 is a schematic structure diagram of an optical imaging lens assembly according to embodiment 1 of the application.

As shown in FIG. 1, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a negative refractive power, an object-side surface S5 thereof is a convex surface, and an image-side surface S6 is a concave surface. The fourth lens E4 has a positive refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a convex surface, and an image-side surface S12 is a concave surface. The seventh lens E7 has a negative refractive power, an object-side surface S13 thereof is a concave surface, and an image-side surface S14 is a concave surface. The optical filter E8 has an object-side surface S15 and an image-side surface S16. Light from an object sequentially penetrates through each of the surfaces S1 to S16 and is finally image on the imaging surface S17.

Table 1 shows the surface type, the radius of curvature, the thickness, the material and the conic coefficient of each lens of the optical imaging lens assembly according to embodiment 1. Units of the radius of curvature and the thickness are millimeter (mm).

TABLE 1

| Surface number | Surface type | Radius of curvature | Thickness | Refractive index | Abbe number | Conic coefficient |
|---|---|---|---|---|---|---|
| OBJ | spherical | Infinite | Infinite | | | |
| S1 | aspherical | 1.8326 | 0.7661 | 1.55 | 64.1 | −0.1137 |
| S2 | aspherical | 8.6128 | 0.0645 | | | 12.5635 |
| S3 | aspherical | 10.0391 | 0.2100 | 1.67 | 20.4 | −99.0000 |
| S4 | aspherical | 7.1680 | 0.1273 | | | −27.8972 |
| STO | spherical | Infinite | 0.4934 | | | 0.0000 |
| S5 | aspherical | 12.4176 | 0.4011 | 1.65 | 23.5 | 98.8991 |
| S6 | aspherical | 8.7089 | 0.1643 | | | 43.2783 |
| S7 | aspherical | −2.7860 | 0.5565 | 1.55 | 64.1 | −1.4117 |
| S8 | aspherical | −1.2722 | 0.0300 | | | −0.4954 |
| S9 | aspherical | 130.9429 | 0.2987 | 1.55 | 64.1 | −99.0000 |
| S10 | aspherical | −36.9302 | 0.0300 | | | 42.3442 |
| S11 | aspherical | 4.3118 | 0.3094 | 1.67 | 20.4 | −1.6200 |
| S12 | aspherical | 3.0806 | 0.5887 | | | −5.2274 |
| S13 | aspherical | −2.3787 | 0.2100 | 1.55 | 64.1 | −1.9502 |
| S14 | aspherical | 7.6118 | 0.3194 | | | −81.3329 |
| S15 | spherical | Infinite | 0.1100 | 1.52 | 64.2 | |
| S16 | spherical | Infinite | 0.0707 | | | |
| S17 | spherical | Infinite | | | | |

From Table 1, it can be seen that both the object-side surface and image-side surface of any lens in the first lens E1 to the seventh lens E7 are aspherical surfaces. In the embodiment, the surface type x of each aspherical lens may be defined by use of, but not limited to, the following aspherical surface formula:

$$x = \frac{ch^2}{1 + \sqrt{1 - (k+1)c^2h^2}} + \Sigma A_i h^i \quad (1)$$

Here, x is the sag—the axis-component of the displacement of the surface from the aspheric vertex, when the surface is at a height h from the optical axis; c is a paraxial curvature of the aspherical surface, c=1/R (i.e., the paraxial curvature c is the reciprocal of the radius of curvature R in Table 1); k is the conic coefficient (given in Table 1); and Ai is the correction coefficient of the $i^{th}$ order of aspheric surface. Table 2 shows high-order coefficients $A_4$, $A_6$, $A_8$, $A_{10}$, $A_{12}$, $A_{14}$, $A_{16}$, $A_{18}$ and $A_{20}$ applied to the aspherical mirror surfaces S1-S14 in embodiment 1.

TABLE 2

| Surface number | A4 | A6 | A8 | A10 | A12 |
|---|---|---|---|---|---|
| S1 | −2.1441E−03 | −4.6705E−03 | 9.8935E−03 | −1.8604E−02 | 1.7024E−02 |
| S2 | −8.6340E−02 | 1.0494E−01 | −3.6771E−02 | −8.2672E−02 | 1.0538E−01 |
| S3 | −1.0527E−01 | 1.9378E−01 | −9.4070E−02 | −1.5358E−01 | 2.5611E−01 |
| S4 | −5.6856E−02 | 1.4891E−01 | −1.4899E−01 | −3.5717E−02 | 2.0573E−01 |
| S5 | −1.2847E−01 | 7.4521E−02 | −4.9553E−01 | 1.0617E+00 | −1.2768E+00 |
| S6 | −6.6745E−02 | 1.3675E−01 | −3.8173E−01 | 4.7022E−01 | −3.4184E−01 |
| S7 | −6.6745E−02 | 1.3675E−01 | −3.8173E−01 | 4.7022E−01 | −3.4184E−01 |
| S8 | −6.6745E−02 | 1.3675E−01 | −3.8173E−01 | 4.7022E−01 | −3.4184E−01 |
| S9 | −6.6745E−02 | 1.3675E−01 | −3.8173E−01 | 4.7022E−01 | −3.4184E−01 |
| S10 | 2.4533E−02 | 1.1517E−01 | −1.2807E−01 | 5.0365E−02 | −8.7766E−03 |
| S11 | 1.1198E−01 | −2.9428E−01 | 2.6722E−01 | −1.3952E−01 | 4.2943E−02 |
| S12 | 8.2363E−02 | −2.3098E−01 | 2.1455E−01 | −1.2827E−01 | 5.0744E−02 |
| S13 | 1.6724E−02 | −1.2062E−01 | 1.4427E−01 | −8.1801E−02 | 2.7359E−02 |
| S14 | −2.2185E−02 | −4.0314E−02 | 2.8948E−02 | −5.0463E−03 | −1.0257E−03 |

| Surface number | A14 | A16 | A18 | A20 |
|---|---|---|---|---|
| S1 | −8.9307E−03 | 1.6781E−03 | 0.0000E+00 | 0.0000E+00 |
| S2 | −4.8055E−02 | 7.9599E−03 | 0.0000E+00 | 0.0000E+00 |
| S3 | −1.3968E−01 | 2.7075E−02 | −6.6953E−13 | −9.4284E−14 |
| S4 | −1.6075E−01 | 4.0737E−02 | −1.1633E−14 | −9.4622E−16 |
| S5 | 8.1914E−01 | −2.1473E−01 | 0.0000E+00 | 0.0000E+00 |

TABLE 2-continued

| | | | | |
|---|---|---|---|---|
| S6 | 1.4029E−01 | −2.4503E−02 | 0.0000E+00 | 0.0000E+00 |
| S7 | 1.4029E−01 | −2.4503E−02 | 0.0000E+00 | 0.0000E+00 |
| S8 | 1.4029E−01 | −2.4503E−02 | 0.0000E+00 | 0.0000E+00 |
| S9 | 1.4029E−01 | −2.4503E−02 | 0.0000E+00 | 0.0000E+00 |
| S10 | 5.6195E−04 | 1.7552E−06 | 0.0000E+00 | 0.0000E+00 |
| S11 | −7.4601E−03 | 6.3000E−04 | −1.0913E−05 | −1.0960E−06 |
| S12 | −1.3102E−02 | 2.1200E−03 | −1.9421E−04 | 7.6416E−06 |
| S13 | −5.6486E−03 | 7.0526E−04 | −4.8727E−05 | 1.4279E−06 |
| S14 | 5.5944E−04 | −9.4131E−05 | 7.3264E−06 | −2.2348E−07 |

Table 3 shows effective focal lengths f1 to f7 of the lenses in embodiment 1, a total effective focal length f of the optical imaging lens assembly, a TTL of the optical imaging lens assembly (i.e., a distance between a center of the object-side surface S1 of the first lens E1 to the imaging surface S17 on the optical axis) and a half of the diagonal length ImgH of an effective pixel region on the imaging surface S17 of the optical imaging lens assembly.

TABLE 3

| | | | |
|---|---|---|---|
| f1(mm) | 4.10 | f(mm) | 3.58 |
| f2(mm) | −38.68 | TTL(mm) | 3.98 |
| f3(mm) | −47.18 | ImgH(mm) | 3.01 |
| f4(mm) | 3.79 | | |
| f5(mm) | 52.78 | | |
| f6(mm) | −17.97 | | |
| f7(mm) | −3.29 | | |

Each parameter of the optical imaging lens assembly in embodiment 1 is configured as follows.

A relationship between the effective focal length f1 of the first lens and the center thickness CT1 of the first lens is: f1/CT1=5.35.

A relationship between the effective focal length f4 of the fourth lens and the effective focal length f of the optical imaging lens assembly is: f4/f=1.06.

A relationship between the effective focal length f4 of the fourth lens and the radius of curvature R7 of the object-side surface of the fourth lens is: f4/R7=−1.36.

A relationship between the radius of curvature R9 of the object-side surface of the fifth lens and the radius of curvature R10 of the image-side surface of the fifth lens is: |R9/R10|=3.55.

A relationship between the effective focal length f6 of the sixth lens and the center thickness CT6 of the sixth lens is: |f6/CT6|=58.09.

A relationship of the maximum inclination angle β7 of the image-side surface of the seventh lens is: ρ7=15.0.

A relationship between the radius of curvature R13 of the object-side surface of the seventh lens and the center thickness CT7 of the seventh lens is: R13/CT7=−11.33.

A relationship between the effective focal length f of the optical imaging lens assembly and an EPD of the optical imaging lens assembly is: f/EPD=1.41.

A relationship between the radius of curvature R3 of the object-side surface of the second lens and the radius of curvature R4 of the image-side surface of the second lens is: (R3+R4)/(R3−R4)=5.99.

A relationship between the effective focal length f1 of the first lens and the effective focal length f7 of the seventh lens is: |f1/f7|=1.24.

Figure 2A:
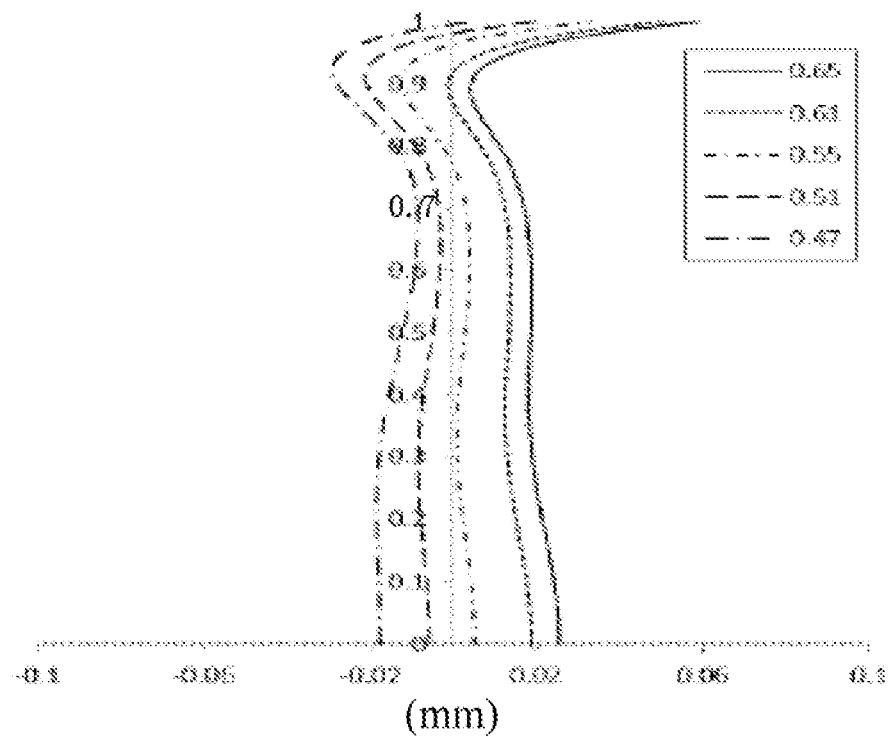
FIG. 2A to FIG. 2D illustrate a longitudinal aberration curve, an astigmatism curve, a distortion curve and a lateral color curve of an optical imaging lens assembly respectively according to embodiment 1.
Figure 2B:
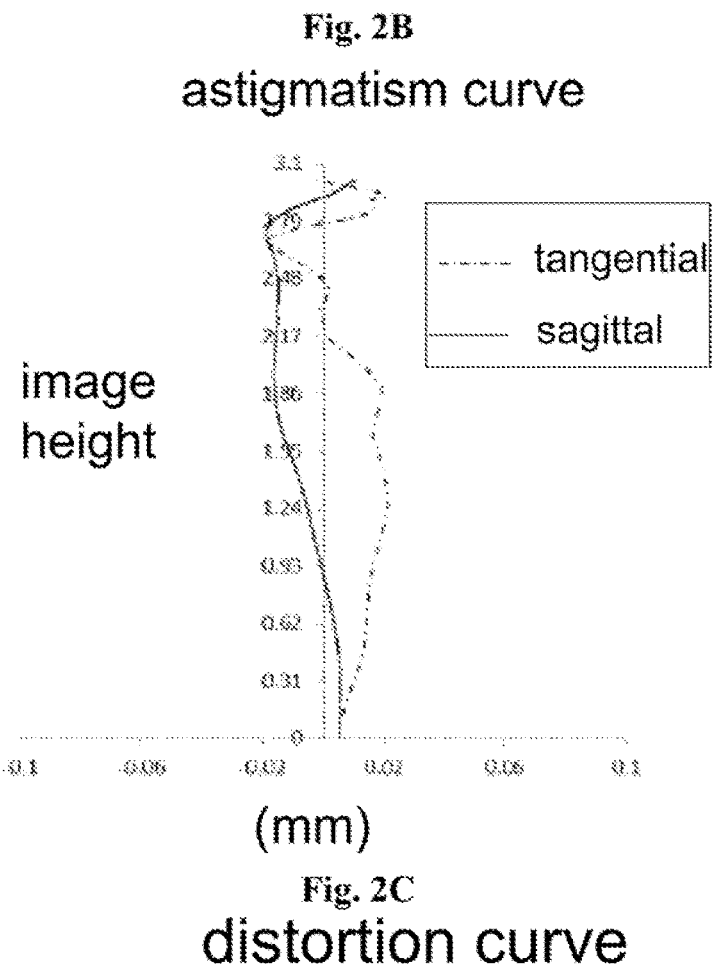
Figure 2C:
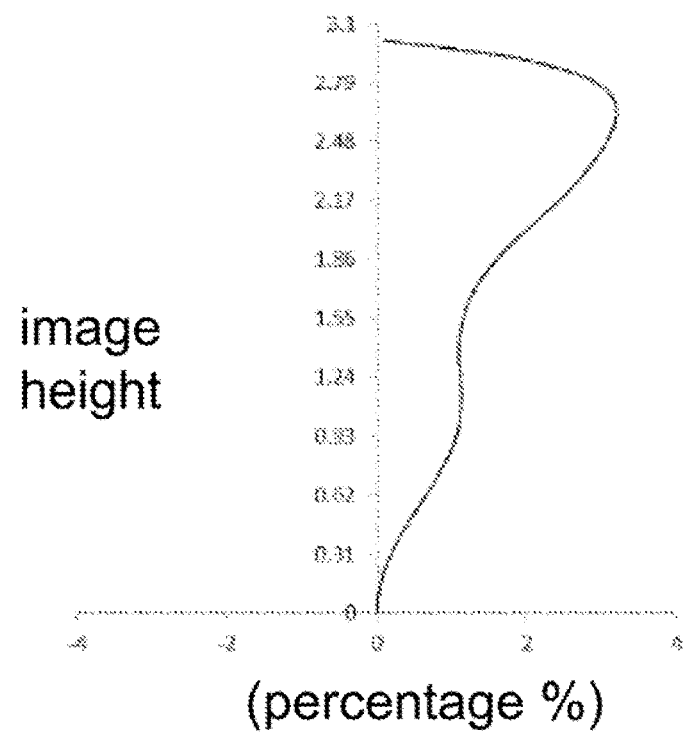
Figure 2D:
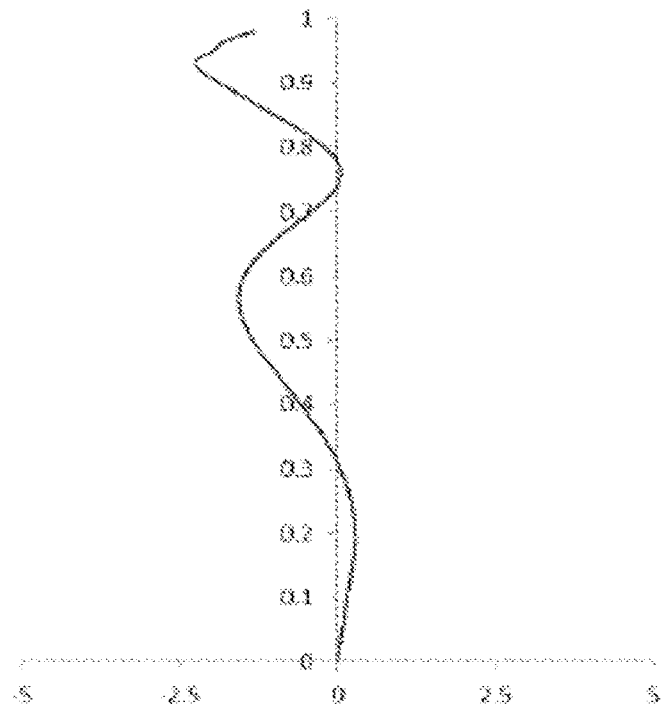

In addition, FIG. 2A illustrates a longitudinal aberration curve of the optical imaging lens assembly according to embodiment 1 to represent deviation of a convergence focal point after light with different wavelengths passes through the lens. FIG. 2B illustrates an astigmatism curve of the optical imaging lens assembly according to embodiment 1 to represent a tangential image surface curvature and a sagittal image surface curvature. FIG. 2C illustrates a distortion curve of the optical imaging lens assembly according to embodiment 1 to represent a distortion value under different viewing angles. FIG. 2D illustrates a lateral color curve of the optical imaging lens assembly according to embodiment 1 to represent deviation of different image heights on the imaging surface after the light passes through the lens. According to FIG. 2A to FIG. 2D, it can be seen that the optical imaging lens assembly provided in embodiment 1 can achieve high imaging quality.

Embodiment 2

Figure 3:
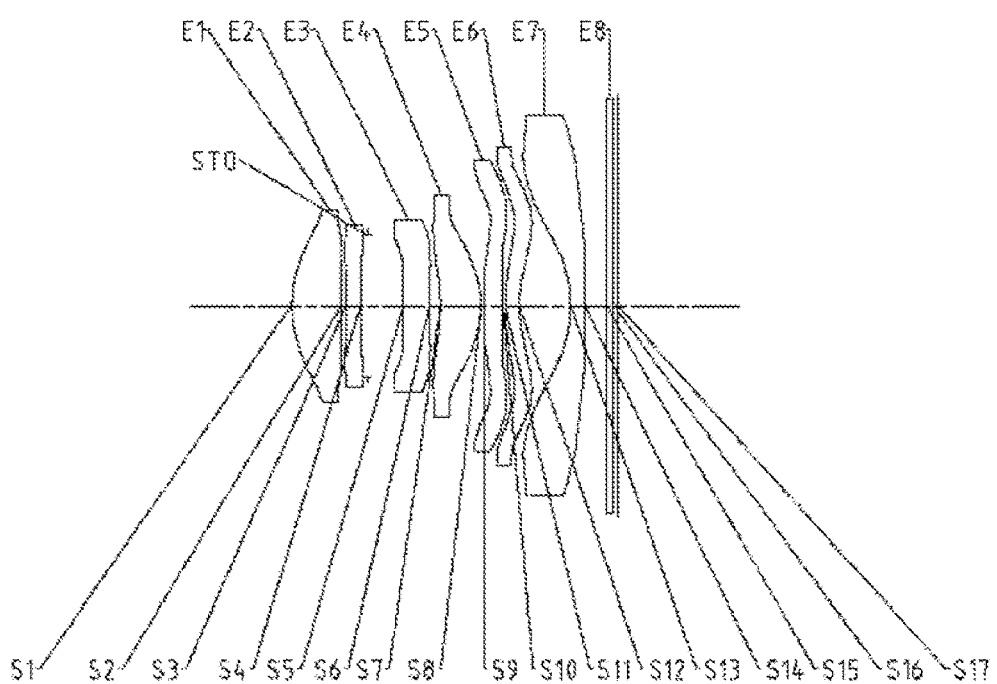
FIG. 3 is a schematic structure diagram of an optical imaging lens assembly according to embodiment 2 of the application.

An optical imaging lens assembly according to embodiment 2 of the application will be described below with reference to FIG. 3 to FIG. 4D. In the embodiment and the following embodiments, part of descriptions similar to those about embodiment 1 are omitted for simplicity. FIG. 3 is a schematic structure diagram of an optical imaging lens assembly according to embodiment 2 of the application.

As shown in FIG. 3, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a negative refractive power, an object-side surface S3 thereof is a concave surface, and an image-side surface S4 is a concave surface. The third lens E3 has a negative refractive power, an object-side surface S5 thereof is a convex surface, and an image-side surface S6 is a concave surface. The fourth lens E4 has a positive refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a convex surface, and an image-side surface S12 is a concave surface. The seventh lens E7 has a negative refractive power, an object-side surface S13 thereof is a concave surface, and an image-side surface S14 is a concave surface. The optical filter E8 has an object-side surface S15 and an image-side surface S16. Light from an object sequentially penetrates through each of the surfaces S1 to S16 and is finally image on the imaging surface S17.

Table 4 shows a surface type, radius of curvature, thickness, material and conic coefficient of each lens of the optical imaging lens assembly according to embodiment 2. Units of the radius of curvature and the thickness are mm.

TABLE 4

| Surface number | Surface type | Radius of curvature | Thickness | Material Refractive index | Abbe number | Conic coefficient |
|---|---|---|---|---|---|---|
| OBJ | spherical | Infinite | Infinite | | | |
| S1 | aspherical | 1.8673 | 0.7252 | 1.55 | 64.1 | −0.2796 |
| S2 | aspherical | 25.5673 | 0.0672 | | | 53.8499 |
| S3 | aspherical | −285.1433 | 0.2100 | 1.67 | 20.4 | −99.0000 |
| S4 | aspherical | 10.4660 | 0.1006 | | | 51.7385 |
| STO | spherical | Infinite | 0.5244 | | | 0.0000 |
| S5 | aspherical | 13.8000 | 0.3824 | 1.65 | 23.5 | 99.0000 |
| S6 | aspherical | 9.4022 | 0.1600 | | | 51.7385 |
| S7 | aspherical | −2.5287 | 0.5979 | 1.55 | 64.1 | −1.9685 |
| S8 | aspherical | −1.1889 | 0.0300 | | | −0.5125 |
| S9 | aspherical | 35.5665 | 0.2816 | 1.55 | 64.1 | −99.0000 |
| S10 | aspherical | −13.1183 | 0.0300 | | | −73.2727 |
| S11 | aspherical | 2.8897 | 0.2059 | 1.67 | 20.4 | −3.5372 |
| S12 | aspherical | 1.8822 | 0.7413 | | | −6.8700 |
| S13 | aspherical | −1.9071 | 0.2100 | 1.55 | 64.1 | −2.0102 |
| S14 | aspherical | 55.2436 | 0.3122 | | | −99.0000 |
| S15 | spherical | Infinite | 0.1100 | 1.52 | 64.2 | |
| S16 | spherical | Infinite | 0.0613 | | | |
| S17 | spherical | Infinite | | | | |

Table 5 shows higher-order coefficients applied to each aspherical mirror surface in embodiment 2. The surface type of each aspherical surface may be defined by formula (1) in embodiment 1.

Table 6 shows effective focal lengths f1 to f7 of the lenses in embodiment 2, a total effective focal length f of the optical imaging lens assembly, a TTL of the optical imaging lens assembly and a half of the diagonal length ImgH of an effective pixel region on the imaging surface S17 of the optical imaging lens assembly.

TABLE 6

| f1(mm) | 3.65 | f(mm) | 3.58 |
|---|---|---|---|
| f2(mm) | −15.12 | TTL(mm) | 4.02 |
| f3(mm) | −47.33 | ImgH(mm) | 3.05 |
| f4(mm) | 3.55 | | |
| f5(mm) | 17.58 | | |
| f6(mm) | −8.81 | | |
| f7(mm) | −3.37 | | |

Figure 4A:
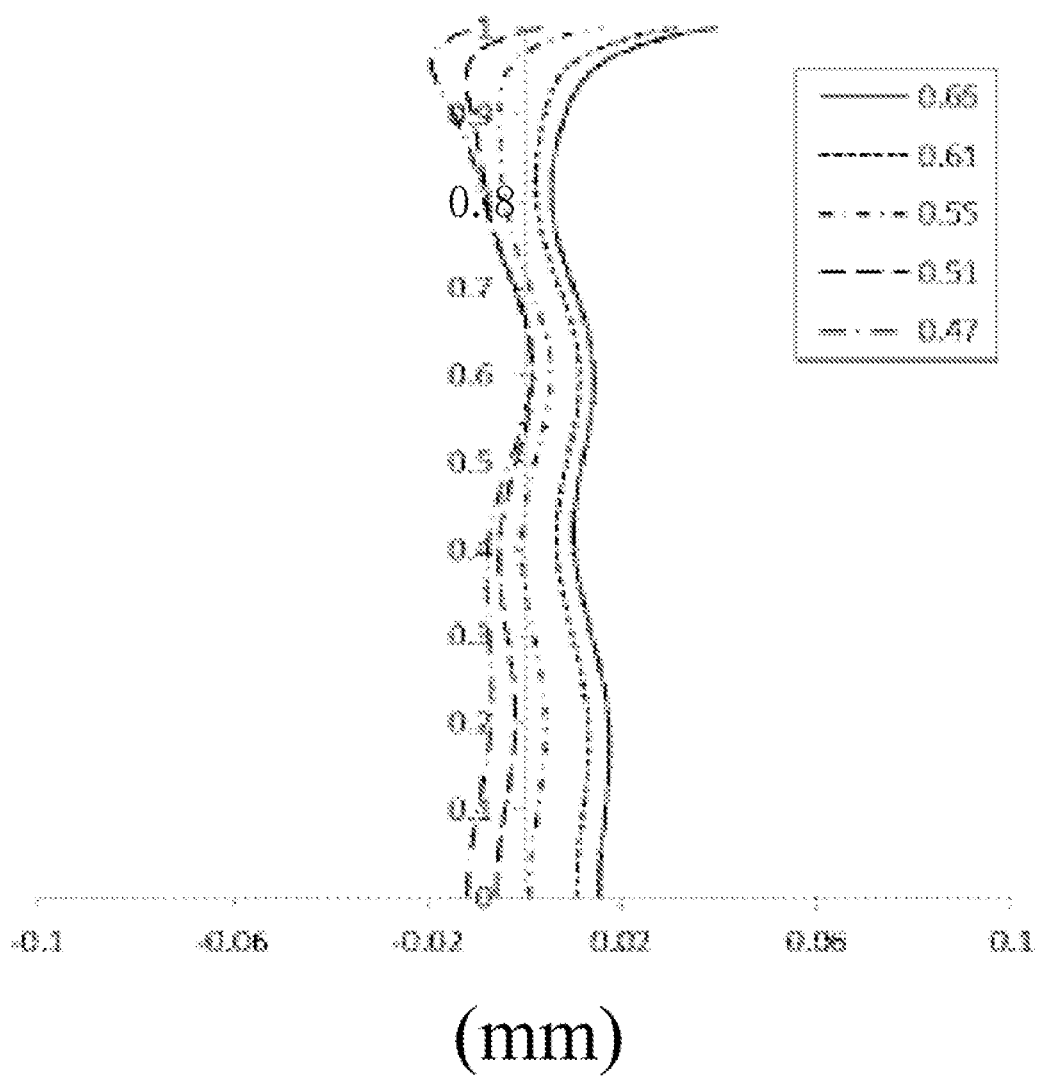
FIG. 4A to FIG. 4D illustrate a longitudinal aberration curve, an astigmatism curve, a distortion curve and a lateral color curve of an optical imaging lens assembly respectively according to embodiment 2.
Figure 4B:
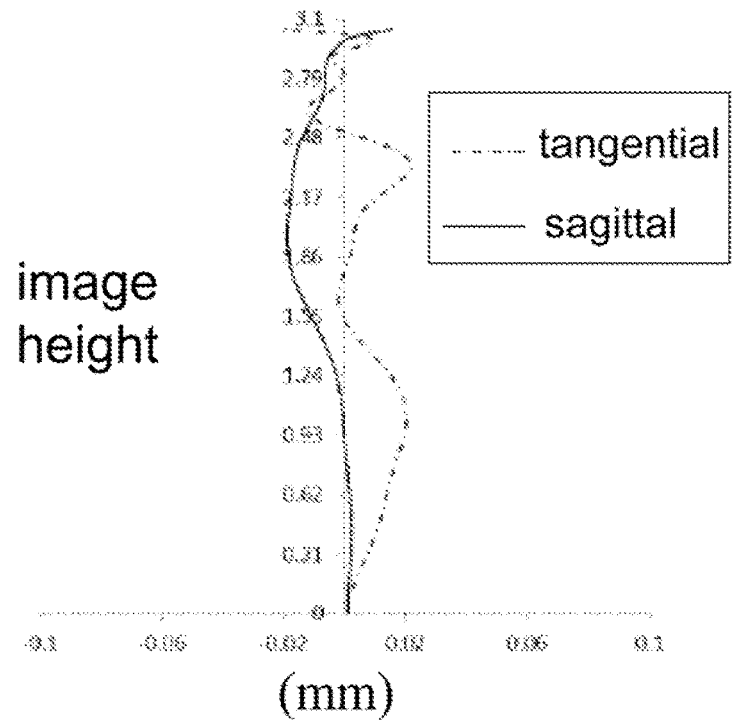
Figure 4C:
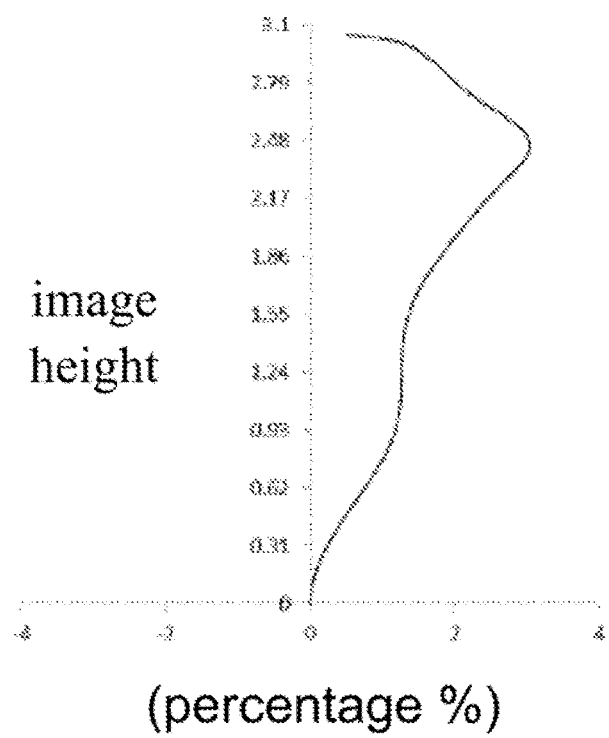
Figure 4D:
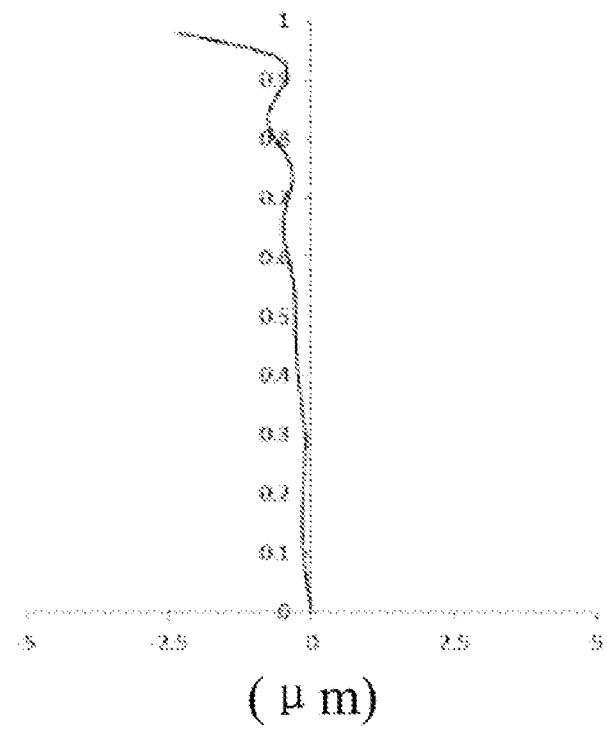

FIG. 4A illustrates a longitudinal aberration curve of the optical imaging lens assembly according to embodiment 2 to represent deviation of a convergence focal point after light with different wavelengths passes through the lens. FIG. 4B illustrates an astigmatism curve of the optical imaging lens assembly according to embodiment 2 to represent a tangential image surface curvature and a sagittal image surface curvature. FIG. 4C illustrates a distortion curve of the optical imaging lens assembly according to embodiment 2 to represent a distortion value under different viewing angles. FIG. 4D illustrates a lateral color curve of the optical imaging lens assembly according to embodiment 2 to represent deviation of different image heights on the imaging surface after the light passes through the lens. According to FIG. 4A to FIG. 4D, it can be seen that the optical imaging lens assembly provided in embodiment 2 can achieve high imaging quality.

TABLE 5

| Surface number | A4 | A6 | A8 | A10 | A12 |
|---|---|---|---|---|---|
| S1 | −8.3911E−03 | 3.1797E−02 | −8.9989E−02 | 1.1513E−01 | −8.0004E−02 |
| S2 | −8.8025E−02 | 1.1875E−01 | −7.1205E−02 | −3.3810E−02 | 6.6220E−02 |
| S3 | −9.9086E−02 | 1.9722E−01 | −9.2793E−02 | −1.5513E−01 | 2.5561E−01 |
| S4 | −4.7631E−02 | 1.0289E−01 | 4.5763E−03 | −3.3213E−01 | 5.1949E−01 |
| S5 | −1.3631E−01 | −3.4045E−02 | −1.3081E−01 | 2.7267E−01 | −2.9219E−01 |
| S6 | −4.8387E−02 | −1.4347E−02 | −5.4707E−02 | 5.7807E−02 | −2.7143E−02 |
| S7 | 1.0125E−01 | 6.1280E−02 | −1.6244E−01 | 1.2313E−01 | −3.8046E−02 |
| S8 | 3.6135E−01 | −5.0639E−01 | 5.1934E−01 | −3.5843E−01 | 1.7459E−01 |
| S9 | 1.6243E−01 | −1.5526E−01 | 1.1151E−01 | −7.4679E−02 | 2.8479E−02 |
| S10 | −8.3315E−03 | 1.8676E−01 | −1.8847E−01 | 7.9768E−02 | −1.7073E−02 |
| S11 | 5.8980E−02 | −2.5038E−01 | 3.0032E−01 | −2.1410E−01 | 9.1971E−02 |
| S12 | 3.9776E−02 | −1.7735E−01 | 1.8552E−01 | −1.1785E−01 | 4.6243E−02 |
| S13 | 3.6352E−02 | −1.5905E−01 | 1.6633E−01 | −8.1197E−02 | 2.2618E−02 |
| S14 | 3.6151E−02 | −1.2536E−01 | 1.0229E−01 | −4.3580E−02 | 1.1430E−02 |
| Surface number | A14 | A16 | A18 | A20 | |
| S1 | 2.4968E−02 | −2.7314E−03 | 0.0000E+00 | 0.0000E+00 | |
| S2 | −3.2482E−02 | 5.5896E−03 | 0.0000E+00 | 0.0000E+00 | |
| S3 | −1.3978E−01 | 2.7075E−02 | −1.5001E−15 | −3.5497E−16 | |
| S4 | −3.3945E−01 | 8.2594E−02 | 0.0000E+00 | 0.0000E+00 | |
| S5 | 1.6006E−01 | −3.3399E−02 | 0.0000E+00 | 0.0000E+00 | |
| S6 | 5.4399E−03 | −1.3972E−04 | 0.0000E+00 | 0.0000E+00 | |
| S7 | 2.6965E−03 | 4.9641E−04 | 0.0000E+00 | 0.0000E+00 | |
| S8 | −4.8705E−02 | 5.5911E−03 | 0.0000E+00 | 0.0000E+00 | |
| S9 | −5.2020E−03 | 3.6096E−04 | 0.0000E+00 | 0.0000E+00 | |
| S10 | 1.7870E−03 | −7.0375E−05 | 0.0000E+00 | 0.0000E+00 | |
| S11 | −2.3761E−02 | 3.5971E−03 | −2.9187E−04 | 9.6933E−06 | |
| S12 | −1.1190E−02 | 1 6339E−03 | −1.3227E−04 | 4.5576E−06 | |
| S13 | −3.8043E−03 | 3.8184E−04 | −2.0944E−05 | 4.7673E−07 | |
| S14 | −1.9210E−03 | 2.0102E−04 | −1.1845E−05 | 2.9812E−07 | |

Embodiment 3

Figure 5:
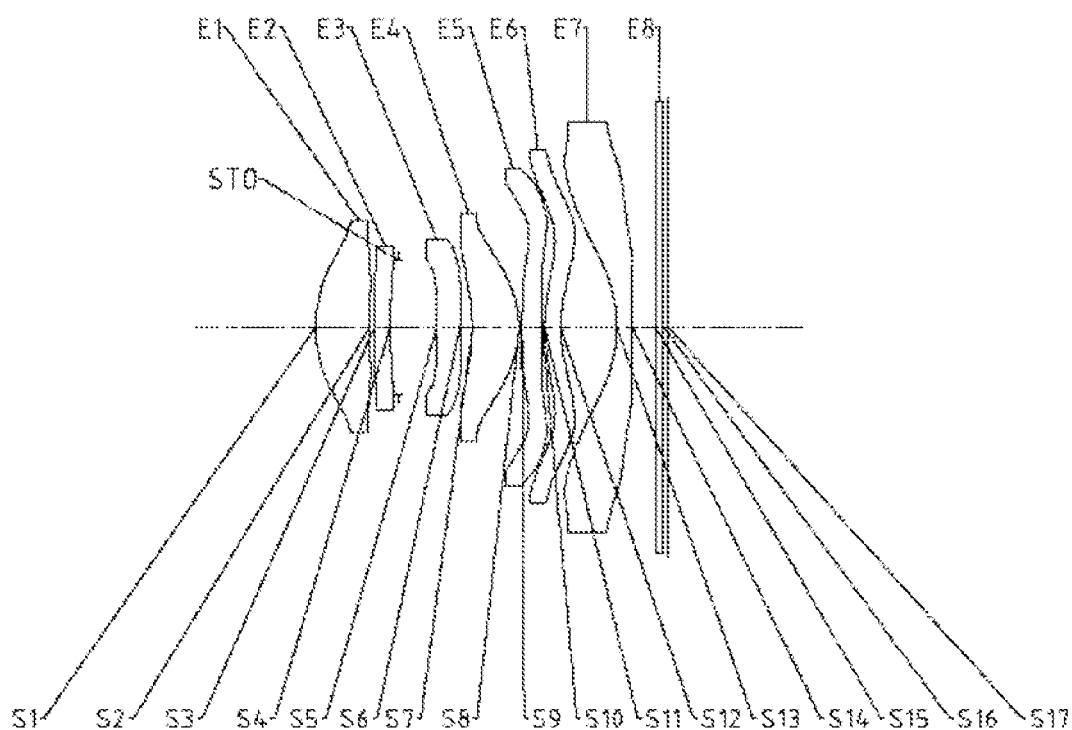
FIG. 5 is a schematic structure diagram of an optical imaging lens assembly according to embodiment 3 of the application.

An optical imaging lens assembly according to embodiment 3 of the application is described below with reference to FIG. 5 to FIG. 6D. FIG. 5 is a schematic structure diagram of an optical imaging lens assembly according to embodiment 3 of the application.

As shown in FIG. 5, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a negative refractive power, an object-side surface S5 thereof is a convex surface, and an image-side surface S6 is a concave surface. The fourth lens E4 has a positive refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a convex surface, and an image-side surface S12 is a concave surface. The seventh lens E7 has a negative refractive power, an object-side surface S13 thereof is a concave surface, and an image-side surface S14 is a concave surface. The optical filter E8 has an object-side surface S15 and an image-side surface S16. Light from an object sequentially penetrates through each of the surfaces S1 to S16 and is finally image on the imaging surface S17.

Table 7 shows a surface type, radius of curvature, thickness, material and conic coefficient of each lens of the optical imaging lens assembly according to embodiment 3. Units of the radius of curvature and the thickness are mm.

TABLE 7

| Surface number | Surface type | Radius of curvature | Thickness | Refractive index | Abbe number | Conic coefficient |
|---|---|---|---|---|---|---|
| OBJ | spherical | Infinite | Infinite | | | |
| S1 | aspherical | 1.8186 | 0.7304 | 1.55 | 64.1 | −0.2638 |
| S2 | aspherical | 16.2151 | 0.0653 | | | −96.7857 |
| S3 | aspherical | 51.3588 | 0.2100 | 1.67 | 20.4 | −23.3419 |
| S4 | aspherical | 8.6818 | 0.1088 | | | 31.3419 |
| STO | spherical | Infinite | 0.5185 | | | 0.0000 |
| S5 | aspherical | 18.2773 | 0.3112 | 1.65 | 23.5 | 99.0000 |
| S6 | aspherical | 14.9346 | 0.1701 | | | 92.2034 |
| S7 | aspherical | −2.2422 | 0.6324 | 1.55 | 64.1 | −1.7756 |
| S8 | aspherical | −1.1317 | 0.0300 | | | −0.5174 |
| S9 | aspherical | 104.4765 | 0.2768 | 1.55 | 64.1 | 99.0000 |
| S10 | aspherical | −55.6561 | 0.0300 | | | −98.7267 |
| S11 | aspherical | 2.4970 | 0.2146 | 1.67 | 20.4 | −5.2774 |
| S12 | aspherical | 1.8289 | 0.7588 | | | −6.8812 |
| S13 | aspherical | −1.9173 | 0.2100 | 1.55 | 64.1 | −1.9877 |
| S14 | aspherical | 224.4091 | 0.3130 | | | −99.0000 |
| S15 | spherical | Infinite | 0.1100 | 1.52 | 64.2 | |
| S16 | spherical | Infinite | 0.0601 | | | |
| S17 | spherical | Infinite | | | | |

Table 8 shows higher-order coefficients applied to each aspherical mirror surface in embodiment 3. The surface type of each aspherical surface may be defined by formula (1) in embodiment 1.

TABLE 8

| Surface number | A4 | A6 | A8 | A10 | A12 |
|---|---|---|---|---|---|
| S1 | −4.3365E−03 | 2.0817E−02 | −6.2417E−02 | 8.0583E−02 | −5.8654E−02 |
| S2 | −6.2795E−02 | 5.4795E−02 | −1.7882E−02 | −3.4287E−02 | 4.3605E−02 |
| S3 | −6.2480E−02 | 1.0161E−01 | −1.9869E−02 | −1.0352E−01 | 1.5151E−01 |
| S4 | −2.6397E−02 | 4.6192E−02 | 3.6922E−02 | −2.7412E−01 | 4.6487E−01 |
| S5 | −1.5379E−01 | −1.2425E−02 | −3.0806E−02 | 5.8300E−01 | −6.2619E−01 |
| S6 | −8.5128E−02 | 8.2909E−02 | −2.9418E−01 | 3.5277E−01 | −2.1993E−01 |
| S7 | 4.1935E−02 | 2.0785E−01 | −4.0746E−01 | 3.7472E−01 | −1.8626E−01 |
| S8 | 3.4244E−01 | −4.8463E−01 | 5.3328E−01 | −4.1554E−01 | 2.2559E−01 |
| S9 | 1.7052E−01 | −1.9190E−01 | 1.6519E−01 | −1.0964E−01 | 4.0496E−02 |
| S10 | −5.2871E−02 | 2.0569E−01 | −1.7849E−01 | 6.9936E−02 | −1.4243E−02 |
| S11 | 8.3892E−03 | −1.3893E−01 | 1.8317E−01 | −1.4900E−01 | 7.2600E−02 |
| S12 | 2.3619E−02 | −1.1785E−01 | 1.0825E−01 | −6.4729E−02 | 2.4473E−02 |
| S13 | 4.4032E−02 | −1.6858E−01 | 1.7561E−01 | −8.5084E−02 | 2.3054E−02 |
| S14 | −4.3365E−03 | 2.0817E−02 | −6.2417E−02 | 8.0583E−02 | −5.8654E−02 |

| Surface number | A14 | A16 | A18 | A20 |
|---|---|---|---|---|
| S1 | 1.8486E−02 | −1.9349E−03 | 0.0000E+00 | 0.0000E+00 |
| S2 | −2.0644E−02 | 3.7185E−03 | 0.0000E+00 | 0.0000E+00 |
| S3 | −8.8770E−02 | 1.9305E−02 | 0.0000E+00 | 0.0000E+00 |
| S4 | −3.8003E−01 | 1.2022E−01 | 0.0000E+00 | 0.0000E+00 |
| S5 | 3.1431E−01 | −5.3098E−02 | 0.0000E+00 | 0.0000E+00 |
| S6 | 6.3996E−02 | −4.6479E−03 | 0.0000E+00 | 0.0000E+00 |
| S7 | 4.8391E−02 | −5.1647E−03 | 0.0000E+00 | 0.0000E+00 |
| S8 | −6.8071E−02 | 8.4187E−03 | 0.0000E+00 | 0.0000E+00 |
| S9 | −7.3745E−03 | 5.2208E−04 | 0.0000E+00 | 0.0000E+00 |
| S10 | 1.4475E−03 | −5.6949E−05 | 0.0000E+00 | 0.0000E+00 |
| S11 | −2.1071E−02 | 3.5807E−03 | −3.2904E−04 | 1.2621E−05 |
| S12 | −5.6956E−03 | 7.9550E−04 | −6.1332E−05 | 2.0041E−06 |
| S13 | −3.6820E−03 | 3.4116E−04 | −1.6647E−05 | 3.1748E−07 |
| S14 | 1.8486E−02 | −1.9349E−03 | 0.0000E+00 | 0.0000E+00 |

Table 9 shows effective focal lengths f1 to f7 of the lenses in embodiment 3, a total effective focal length f of the optical imaging lens assembly, a TTL of the optical imaging lens assembly and a half of the diagonal length ImgH of an effective pixel region on the imaging surface S17 of the optical imaging lens assembly.

TABLE 9

| f1(mm) | 3.68 | f(mm) | 3.58 |
|---|---|---|---|
| f2(mm) | −15.68 | TTL(mm) | 4.02 |
| f3(mm) | −131.32 | ImgH(mm) | 3.08 |
| f4(mm) | 3.48 | | |
| f5(mm) | 66.53 | | |
| f6(mm) | −11.75 | | |
| f7(mm) | −3.48 | | |

Figure 6A:
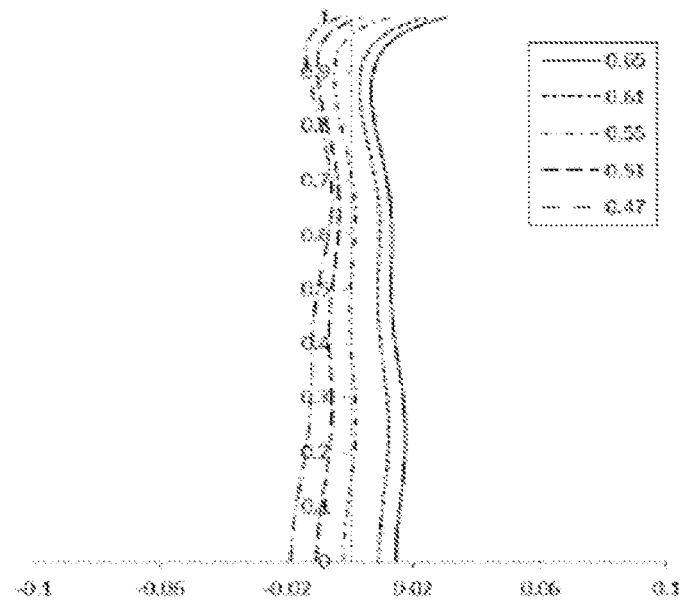
FIG. 6A to FIG. 6D illustrate a longitudinal aberration curve, an astigmatism curve, a distortion curve and a lateral color curve of an optical imaging lens assembly respectively according to embodiment 3.
Figure 6B:
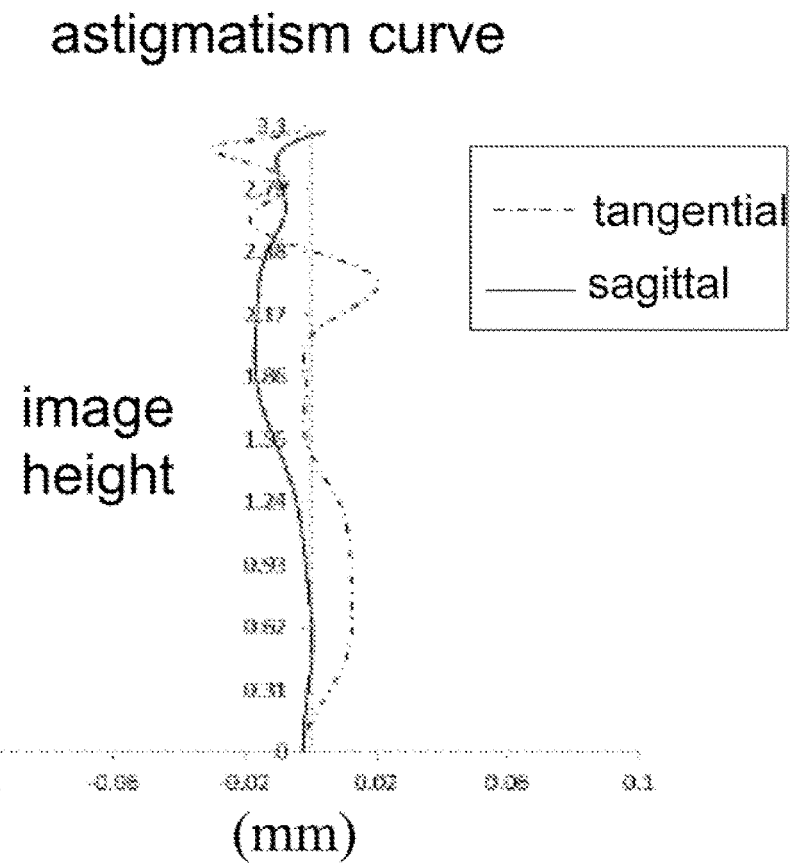
Figure 6C:
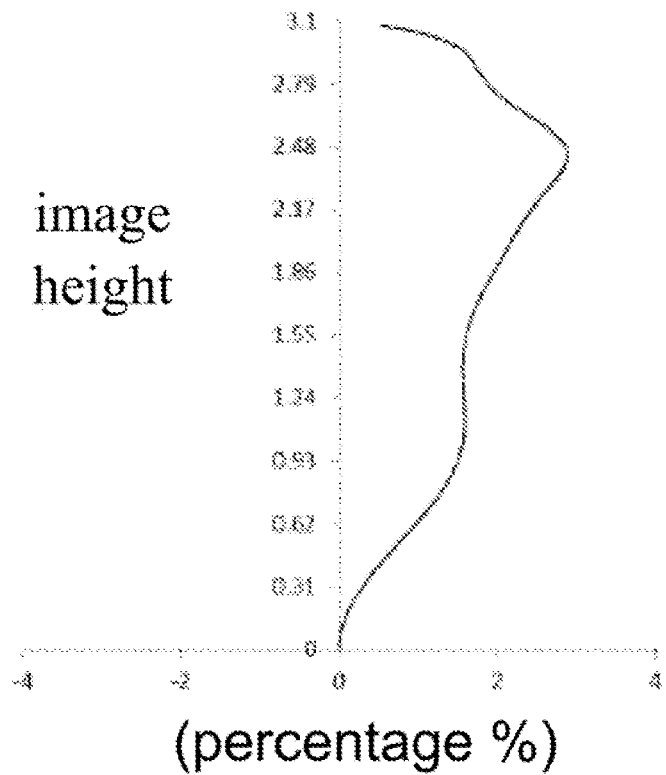
Figure 6D:
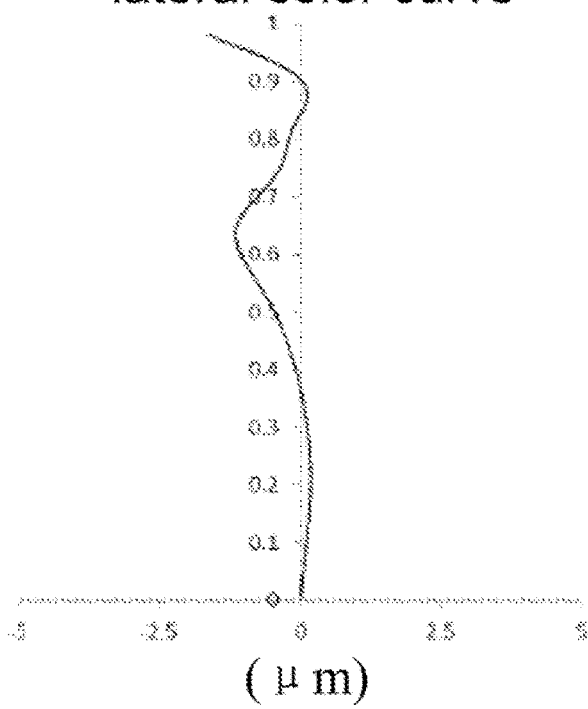

FIG. 6A illustrates a longitudinal aberration curve of the optical imaging lens assembly according to embodiment 3 to represent deviation of a convergence focal point after light with different wavelengths passes through the lens. FIG. 6B illustrates an astigmatism curve of the optical imaging lens assembly according to embodiment 3 to represent a tangential image surface curvature and a sagittal image surface curvature. FIG. 6C illustrates a distortion curve of the optical imaging lens assembly according to embodiment 3 to represent a distortion value under different viewing angles. FIG. 6D illustrates a lateral color curve of the optical imaging lens assembly according to embodiment 3 to represent deviation of different image heights on the imaging surface after the light passes through the lens. According to FIG. 6A to FIG. 6D, it can be seen that the optical imaging lens assembly provided in embodiment 3 can achieve high imaging quality.

Embodiment 4

Figure 7:
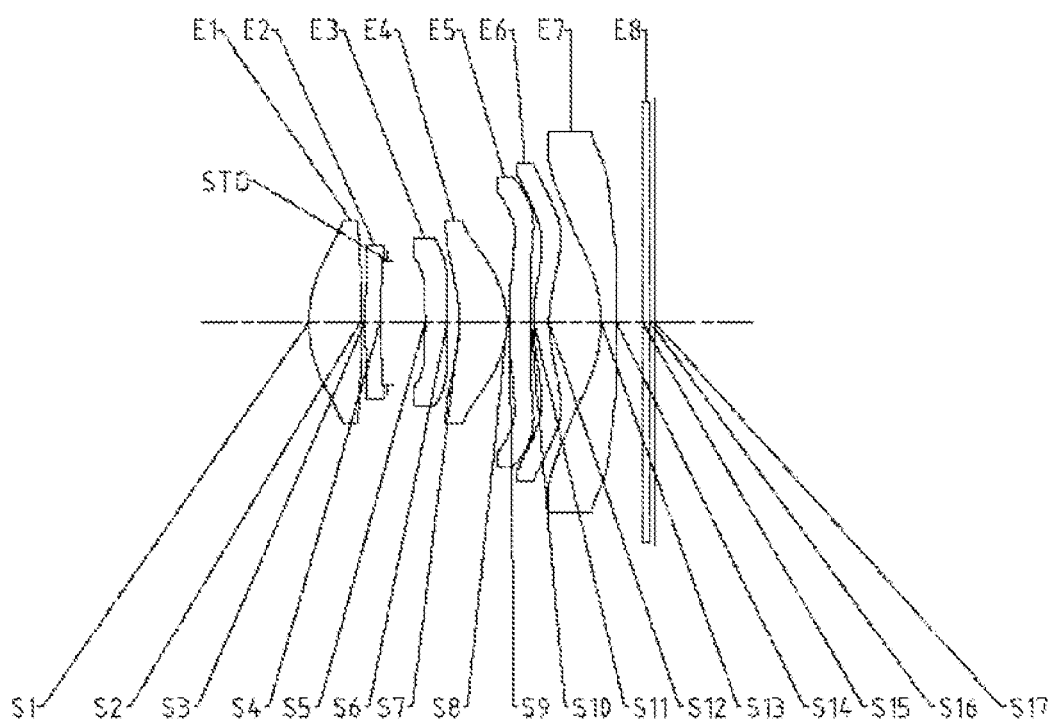
FIG. 7 is a schematic structure diagram of an optical imaging lens assembly according to embodiment 4 of the application.

An optical imaging lens assembly according to embodiment 4 of the application is described below with reference to FIG. 7 to FIG. 8D. FIG. 7 is a schematic structure diagram of an optical imaging lens assembly according to embodiment 4 of the application.

As shown in FIG. 7, the optical imaging lens assembly according to an exemplary implementation of the application includes, sequentially from an object side to an image side along an optical axis, a first lens E1, a first lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a negative refractive power, an object-side surface S5 thereof is a convex surface, and an image-side surface S6 is a concave surface. The fourth lens E4 has a positive refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a convex surface, and an image-side surface S12 is a concave surface. The seventh lens E7 has a negative refractive power, an object-side surface S13 thereof is a concave surface, and an image-side surface S14 is a convex surface. The optical filter E8 has an object-side surface S15 and an image-side surface S16. Light from an object sequentially penetrates through each of the surfaces S1 to S16 and is finally image on the imaging surface S17.

Table 10 shows a surface type, radius of curvature, thickness, material and conic coefficient of each lens of the optical imaging lens assembly according to embodiment 4. Units of the radius of curvature and the thickness are mm.

TABLE 10

| Surface number | Surface type | Radius of curvature | Thickness | Material Refractive index | Abbe number | Conic coefficient |
|---|---|---|---|---|---|---|
| OBJ | spherical | Infinite | Infinite | | | |
| S1 | aspherical | 1.8116 | 0.7079 | 1.55 | 64.1 | −0.2859 |
| S2 | aspherical | 18.4422 | 0.0634 | | | −95.7934 |
| S3 | aspherical | 47.7366 | 0.2100 | 1.67 | 20.4 | −99.0000 |
| S4 | aspherical | 8.2934 | 0.1018 | | | 17.5773 |
| STO | spherical | Infinite | 0.5117 | | | 0.0000 |
| S5 | aspherical | 32.8618 | 0.3065 | 1.65 | 23.5 | 35.7369 |
| S6 | aspherical | 25.2479 | 0.1709 | | | 80.4498 |
| S7 | aspherical | −2.1312 | 0.6543 | 1.55 | 64.1 | −1.6053 |
| S8 | aspherical | −1.0941 | 0.0369 | | | −0.5081 |
| S9 | aspherical | 71.9281 | 0.2816 | 1.55 | 64.1 | 79.9617 |
| S10 | aspherical | −25.4292 | 0.0424 | | | 82.3365 |
| S11 | aspherical | 2.7638 | 0.2091 | 1.67 | 20.4 | −6.0112 |
| S12 | aspherical | 1.8300 | 0.7171 | | | −7.3935 |
| S13 | aspherical | −1.9751 | 0.2100 | 1.55 | 64.1 | −1.9296 |
| S14 | aspherical | −531.1427 | 0.3562 | | | −99.0000 |
| S15 | spherical | Infinite | 0.1100 | 1.52 | 64.2 | |
| S16 | spherical | Infinite | 0.0600 | | | |
| S17 | spherical | Infinite | | | | |

Table 11 shows higher-order coefficients applied to each aspherical mirror surface in embodiment 4. The surface type of each aspherical surface may be defined by formula (1) in embodiment 1.

TABLE 11

| Surface number | A4 | A6 | A8 | A10 | A12 |
|---|---|---|---|---|---|
| S1 | −3.5401E−03 | 1.5576E−02 | −5.7121E−02 | 8.2079E−02 | −6.7836E−02 |
| S2 | −6.6159E−02 | 7.7758E−02 | −5.7056E−02 | −1.2830E−02 | 5.1950E−02 |
| S3 | −6.2213E−02 | 1.2743E−01 | −7.4266E−02 | −8.3687E−02 | 2.0086E−01 |
| S4 | −2.6678E−02 | 5.2716E−02 | 1.3465E−02 | −3.1300E−01 | 6.2984E−01 |
| S5 | −1.6217E−01 | 4.6475E−03 | −6.2886E−02 | 1.7374E+00 | −2.6993E+00 |
| S6 | −8.0446E−02 | 7.5562E−02 | −4.1030E−01 | 6.6009E−01 | −5.7606E−01 |
| S7 | 3.7674E−02 | 2.1950E−01 | −5.3207E−01 | 6.0008E−01 | −3.5524E−01 |
| S8 | 2.6910E−01 | −3.0150E−01 | 3.1021E−01 | −2.7133E−01 | 1.8329E−01 |
| S9 | 8.6268E−02 | −5.3668E−02 | 5.0121E−02 | −5.9523E−02 | 3.0161E−02 |
| S10 | −4.6324E−02 | 1.9769E−01 | −1.7314E−01 | 6.7569E−02 | −1.3613E−02 |
| S11 | −3.9998E−02 | 5.3586E−02 | −1.5223E−01 | 1.5787E−01 | −9.3788E−02 |

TABLE 11-continued

| | | | | | |
|---|---|---|---|---|---|
| S12 | −3.6753E−02 | 4.4573E−02 | −1.3672E−01 | 1.4235E−01 | −8.0064E−02 |
| S13 | 7.2877E−02 | −2.5485E−01 | 2.8072E−01 | −1.4860E−01 | 4.4519E−02 |
| S14 | 9.8620E−02 | −2.3686E−01 | 2.0299E−01 | −9.5391E−02 | 2.7600E−02 |

| Surface number | A14 | A16 | A18 | A20 |
|---|---|---|---|---|
| S1 | 2.4384E−02 | −2.9181E−03 | 0.0000E+00 | 0.0000E+00 |
| S2 | −3.3125E−02 | 7.3423E−03 | 0.0000E+00 | 0.0000E+00 |
| S3 | −1.4663E−01 | 3.7262E−02 | 0.0000E+00 | 0.0000E+00 |
| S4 | −5.8166E−01 | 2.0478E−01 | 0.0000E+00 | 0.0000E+00 |
| S5 | 2.0729E+00 | −6.1474E−01 | 0.0000E+00 | 0.0000E+00 |
| S6 | 2.7032E−01 | −5.1093E−02 | 0.0000E+00 | 0.0000E+00 |
| S7 | 1.0849E−01 | −1.3631E−02 | 0.0000E+00 | 0.0000E+00 |
| S8 | −6.5604E−02 | 9.3105E−03 | 0.0000E+00 | 0.0000E+00 |
| S9 | −6.7622E−03 | 5.6832E−04 | 0.0000E+00 | 0.0000E+00 |
| S10 | 1.3447E−03 | −4.9118E−05 | 0.0000E+00 | 0.0000E+00 |
| S11 | 3.4567E−02 | −7.6867E−03 | 9.3634E−04 | −4.7766E−05 |
| S12 | 2.6642E−02 | −5.2026E−03 | 5.4959E−04 | −2.4214E−05 |
| S13 | −7.9382E−03 | 8.2971E−04 | −4.6234E−05 | 1.0254E−06 |
| S14 | −5.0509E−03 | 5.6805E−04 | −3.5687E−05 | 9.5511E−07 |

Table 12 shows effective focal lengths f1 to f7 of the lenses in embodiment 4, a total effective focal length f of the optical imaging lens assembly, a TTL of the optical imaging lens assembly and a half of the diagonal length ImgH of an effective pixel region on the imaging surface S17 of the optical imaging lens assembly.

TABLE 12

| f1(mm) | 3.62 | f(mm) | 3.58 |
|---|---|---|---|
| f2(mm) | −15.07 | TTL(mm) | 4.04 |
| f3(mm) | −171.54 | ImgH(mm) | 3.06 |
| f4(mm) | 3.37 | | |
| f5(mm) | 34.43 | | |
| f6(mm) | −8.91 | | |
| f7(mm) | −3.63 | | |

Figure 8A:
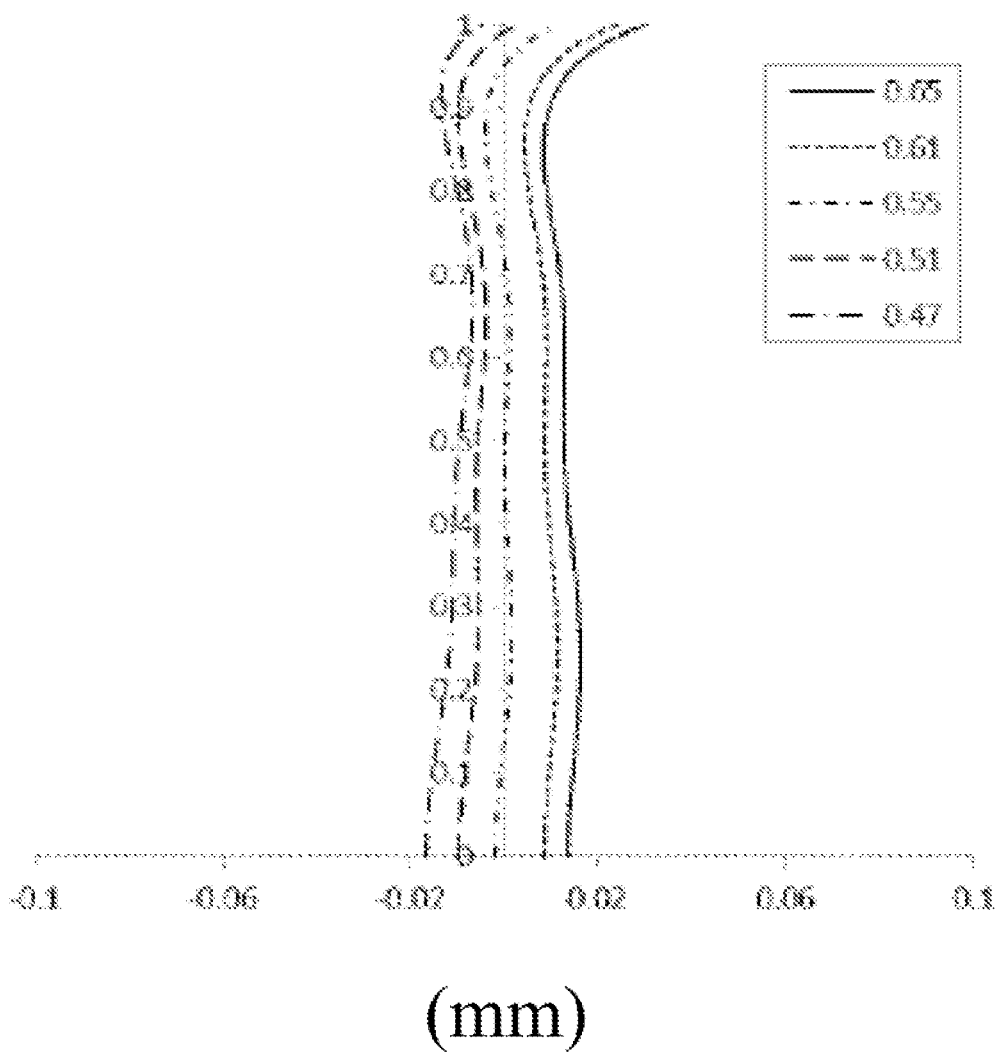
FIG. 8A to FIG. 8D illustrate a longitudinal aberration curve, an astigmatism curve, a distortion curve and a lateral color curve of an optical imaging lens assembly respectively according to embodiment 4.
Figure 8B:
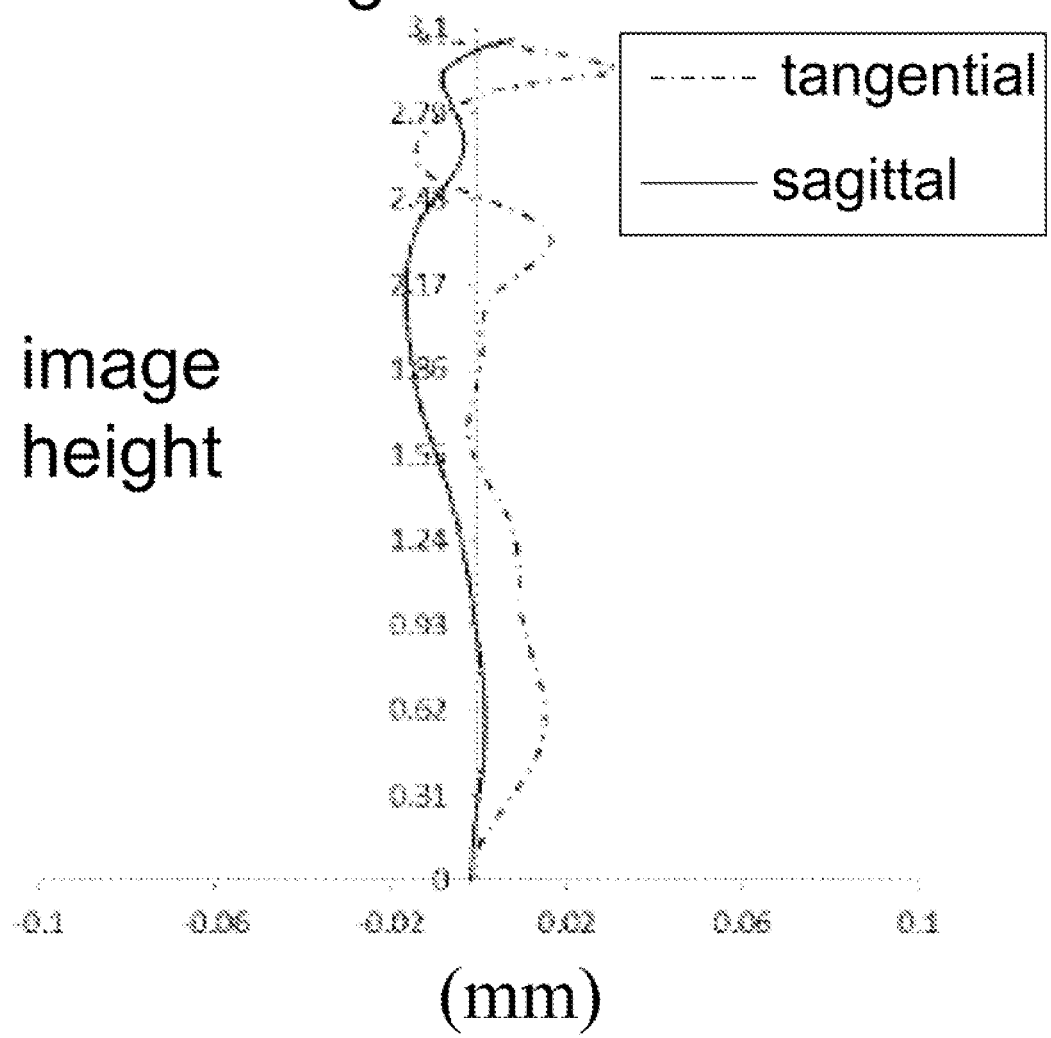
Figure 8C:
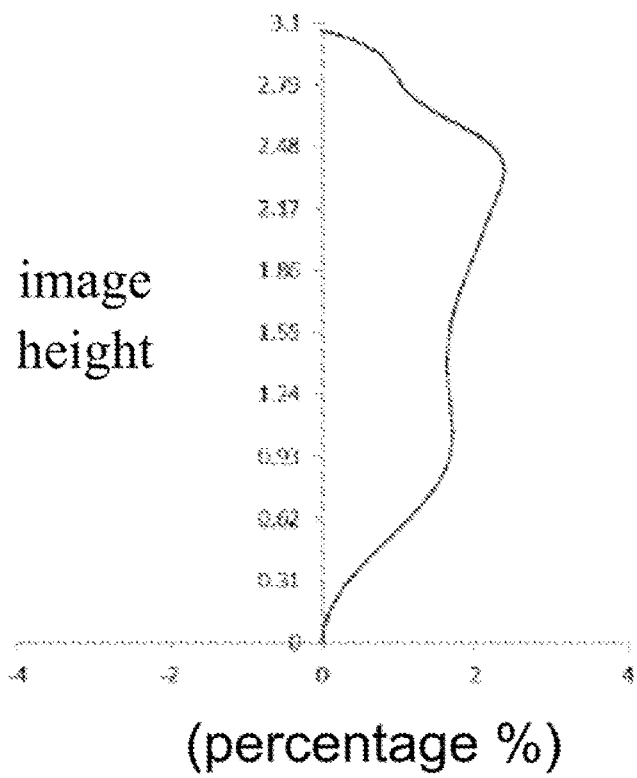
Figure 8D:
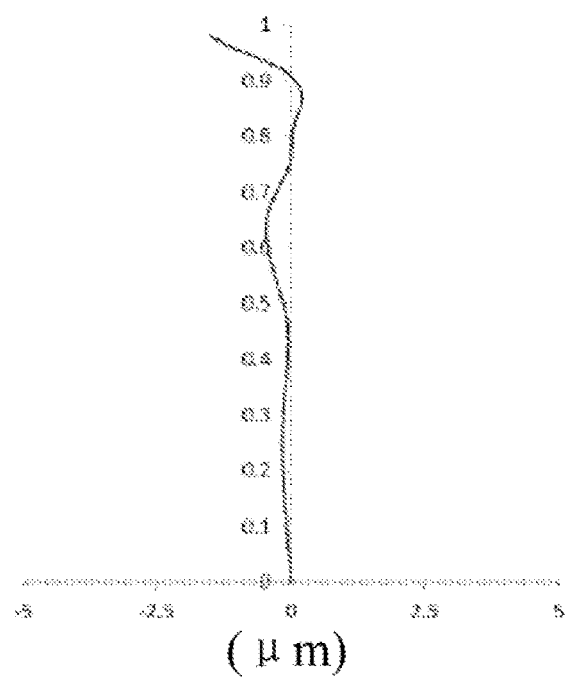

FIG. 8A illustrates a longitudinal aberration curve of the optical imaging lens assembly according to embodiment 4 to represent deviation of a convergence focal point after light with different wavelengths passes through the lens. FIG. 8B illustrates an astigmatism curve of the optical imaging lens assembly according to embodiment 4 to represent a tangential image surface curvature and a sagittal image surface curvature. FIG. 8C illustrates a distortion curve of the optical imaging lens assembly according to embodiment 4 to represent a distortion value under different viewing angles. FIG. 8D illustrates a lateral color curve of the optical imaging lens assembly according to embodiment 4 to represent deviation of different image heights on the imaging surface after the light passes through the lens. According to FIG. 8A to FIG. 8D, it can be seen that the optical imaging lens assembly provided in embodiment 4 can achieve high imaging quality.

Embodiment 5

Figure 9:
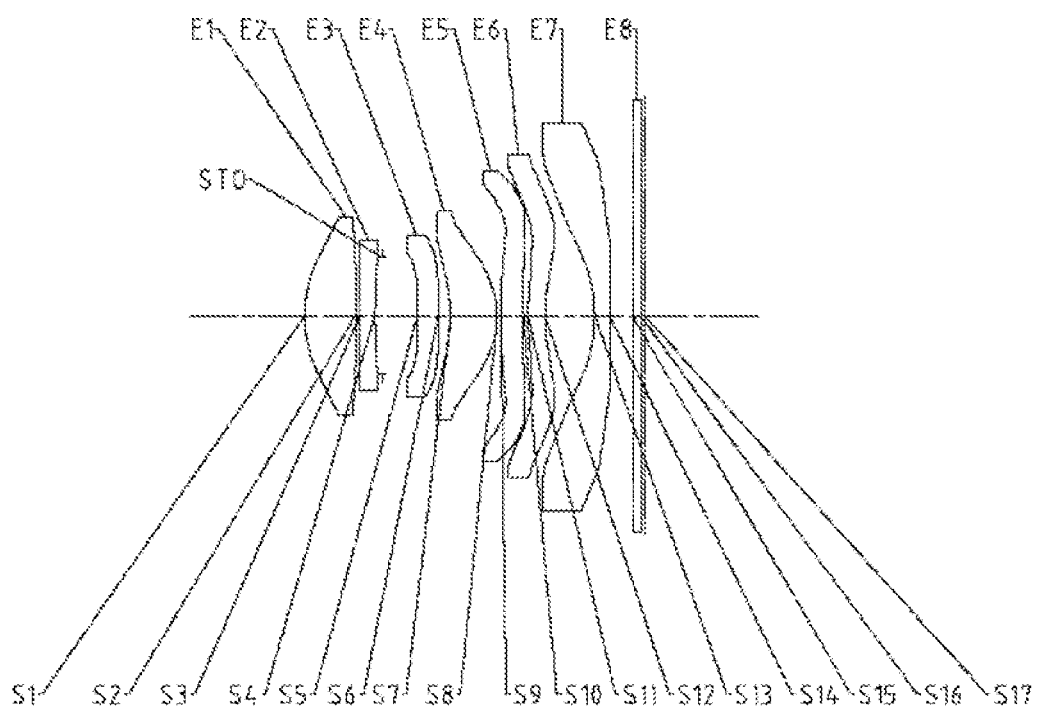
FIG. 9 is a schematic structure diagram of an optical imaging lens assembly according to embodiment 5 of the application.

An optical imaging lens assembly according to embodiment 5 of the application is described below with reference to FIG. 9 to FIG. 10D. FIG. 9 is a schematic structure diagram of an optical imaging lens assembly according to embodiment 5 of the application.

As shown in FIG. 9, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a concave surface. The fourth lens E4 has a positive refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a convex surface, and an image-side surface S12 is a concave surface. The seventh lens E7 has a negative refractive power, an object-side surface S13 thereof is a concave surface, and an image-side surface S14 is a concave surface. The optical filter E8 has an object-side surface S15 and an image-side surface S16. Light from an object sequentially penetrates through each of the surfaces S1 to S16 and is finally image on the imaging surface S17.

Table 13 shows a surface type, radius of curvature, thickness, material and conic coefficient of each lens of the optical imaging lens assembly according to embodiment 5. Units of the radius of curvature and the thickness are mm.

TABLE 13

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| S1 | Aspherical | 1.8256 | 0.7056 | 1.55 | 64.1 | −0.2902 |
| S2 | Aspherical | 23.8472 | 0.0624 | | | −99.0000 |
| S3 | Aspherical | 62.9730 | 0.2100 | 1.67 | 20.4 | 99.0000 |
| S4 | Aspherical | 8.2356 | 0.0981 | | | 8.4162 |
| STO | Spherical | Infinite | 0.4962 | | | 0.0000 |
| S5 | Aspherical | 27.8802 | 0.2929 | 1.65 | 23.5 | 99.0000 |
| S6 | Aspherical | 34.3515 | 0.1744 | | | −62.8223 |
| S7 | Aspherical | −2.0612 | 0.6497 | 1.55 | 64.1 | −1.4969 |
| S8 | Aspherical | −1.0864 | 0.0528 | | | −0.5062 |

TABLE 13-continued

| Surface number | Surface type | Radius of curvature | Thickness | Material Refractive index | Abbe number | Conic coefficient |
|---|---|---|---|---|---|---|
| S9 | Aspherical | 47.9480 | 0.3102 | 1.55 | 64.1 | 79.9617 |
| S10 | Aspherical | −28.2140 | 0.643 | | | 96.5369 |
| S11 | Aspherical | 4.9914 | 0.2395 | 1.67 | 20.4 | 0.8992 |
| S12 | Aspherical | 2.5043 | 0.6946 | | | −5.3716 |
| S13 | Aspherical | −1.9683 | 0.2108 | 1.55 | 64.1 | −1.9405 |
| S14 | Aspherical | 137.2989 | 0.3185 | | | 99.0000 |
| S15 | Spherical | Infinite | 0.1100 | 1.52 | 64.2 | |
| S16 | Spherical | Infinite | 0.0600 | | | |
| S17 | Spherical | Infinite | | | | |

Table 14 shows higher-order coefficients applied to each aspherical mirror surface in embodiment 5. The surface type of each aspherical surface may be defined by formula (1) in embodiment 1.

TABLE 14

| Surface number | A4 | A6 | A8 | A10 | A12 |
|---|---|---|---|---|---|
| S1 | −3.3049E−03 | 1.0274E−02 | −4.3915E−02 | 6.3922E−02 | −5.5168E−02 |
| S2 | −6.9300E−02 | 9.7695E−02 | −9.4266E−02 | 2.3905E−02 | 3.4525E−02 |
| S3 | −6.5505E−02 | 1.5433E−01 | −1.3589E−01 | −1.6834E−02 | 1.6635E−01 |
| S4 | −2.7531E−02 | 5.1313E−02 | 5.0276E−02 | −4.9665E−01 | 9.8013E−01 |
| S5 | −1.5790E−01 | −3.1331E−02 | −4.8695E−01 | 1.3600E+00 | −2.2046E+00 |
| S6 | −7.9945E−02 | 5.5355E−02 | −3.6138E−01 | 5.9113E−01 | −5.2603E−01 |
| S7 | 2.9967E−02 | 2.0219E−01 | −4.6847E−01 | 5.3493E−01 | −3.2346E−01 |
| S8 | 2.7020E−01 | −3.1552E−01 | 3.3807E−01 | −2.9598E−01 | 1.9839E−01 |
| S9 | 9.7300E−02 | −9.5259E−02 | 8.6101E−02 | −7.2687E−02 | 3.1807E−02 |
| S10 | −4.3018E−02 | 1.6440E−01 | −1.3526E−01 | 4.8412E−02 | −8.8315E−03 |
| S11 | 6.2825E−03 | −7.6915E−02 | 4.0246E−02 | −2.1125E−03 | −1.2960E−02 |
| S12 | −3.3813E−02 | −1.7091E−02 | −2.4159E−02 | 4.5612E−02 | −3.1480E−02 |
| S13 | 9.9808E−02 | −3.0846E−01 | 3.3301E−01 | −1.7856E−01 | 5.5227E−02 |
| S14 | 1.0916E−01 | −2.4626E−01 | 2.0052E−01 | −8.9823E−02 | 2.4804E−02 |

| Surface number | A14 | A16 | A18 | A20 |
|---|---|---|---|---|
| S1 | 2.0188E−02 | −2.3149E−03 | 0.0000E+00 | 0.0000E+00 |
| S2 | −3.0555E−02 | 7.8474E−03 | 0.0000E+00 | 0.0000E+00 |
| S3 | −1.4372E−01 | 3.9465E−02 | 0.0000E+00 | 0.0000E+00 |
| S4 | −9.0076E−01 | 3.1899E−01 | 0.0000E+00 | 0.0000E+00 |
| S5 | 1.7427E+00 | −5.2167E−01 | 0.0000E+00 | 0.0000E+00 |
| S6 | 2.5299E−01 | −4.8128E−02 | 0.0000E+00 | 0.0000E+00 |
| S7 | 1.0064E−01 | −1.2817E−02 | 0.0000E+00 | 0.0000E+00 |
| S8 | −7.1531E−02 | 1.0327E−02 | 0.0000E+00 | 0.0000E+00 |
| S9 | −6.6244E−03 | 5.3278E−04 | 0.0000E+00 | 0.0000E+00 |
| S10 | 7.8334E−04 | −2.5601E−05 | 0.0000E+00 | 0.0000E+00 |
| S11 | 9.0264E−03 | −2.7413E−03 | 3.9919E−04 | −2.2700E−05 |
| S12 | 1.1652E−02 | −2.4111E−03 | 2.6205E−04 | −1.1647E−05 |
| S13 | −1.0354E−02 | 1.1637E−03 | −7.2038E−05 | 1.8785E−06 |
| S14 | −4.3366E−03 | 4.6645E−04 | −2.8045E−05 | 7.1819E−07 |

Table 15 shows effective focal lengths f1 to f7 of the lenses in embodiment 5, a total effective focal length f of the optical imaging lens assembly, a TTL of the optical imaging lens assembly and a half of the diagonal length ImgH of an effective pixel region on the imaging surface S17 of the optical imaging lens assembly.

TABLE 15

| f1(mm) | 3.58 | f(mm) | 3.58 |
|---|---|---|---|
| f2(mm) | −14.22 | TTL(mm) | 4.04 |
| f3(mm) | 225.30 | ImgH(mm) | 3.06 |
| f4(mm) | 3.40 | | |
| f5(mm) | 32.57 | | |
| f6(mm) | −7.83 | | |
| f7(mm) | −3.55 | | |

Figure 10A:
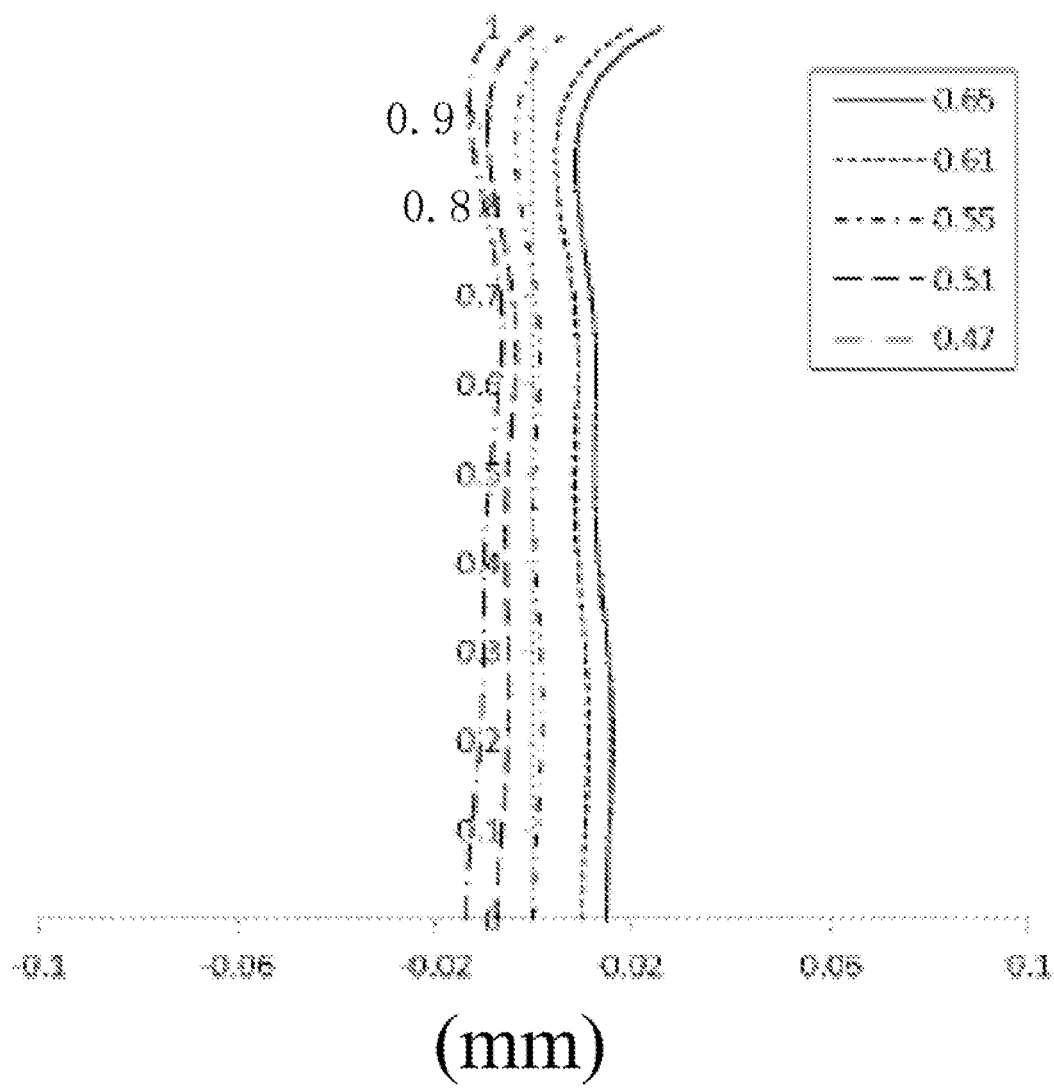
FIG. 10A to FIG. 10D illustrate a longitudinal aberration curve, an astigmatism curve, a distortion curve and a lateral color curve of an optical imaging lens assembly respectively according to embodiment 5.
Figure 10B:
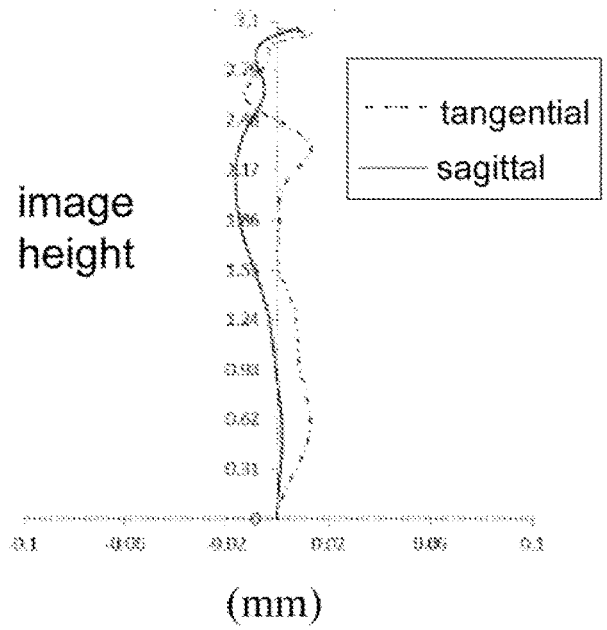
Figure 10C:
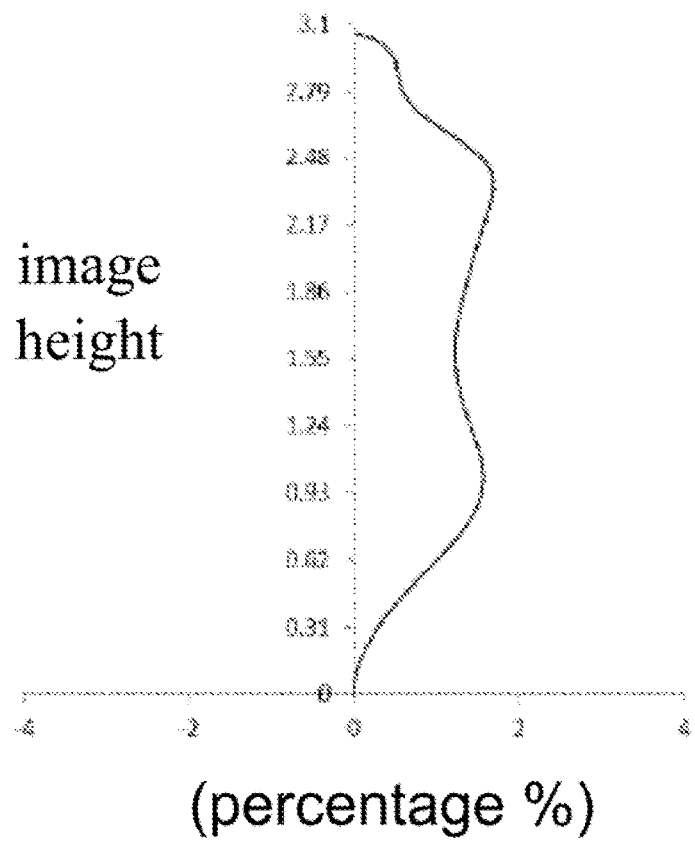
Figure 10D:
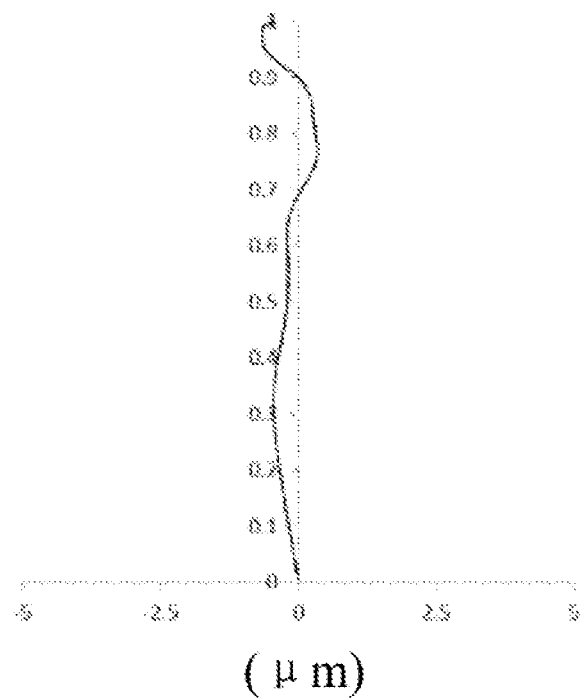

FIG. 10A illustrates a longitudinal aberration curve of the optical imaging lens assembly according to embodiment 5 to represent deviation of a convergence focal point after light with different wavelengths passes through the lens. FIG. 10B illustrates an astigmatism curve of the optical imaging lens assembly according to embodiment 5 to represent a tangential image surface curvature and a sagittal image surface curvature. FIG. 10C illustrates a distortion curve of the optical imaging lens assembly according to embodiment 5 to represent a distortion value under different viewing angles. FIG. 10D illustrates a lateral color curve of the optical imaging lens assembly according to embodiment 5 to represent deviation of different image heights on the imaging surface after the light passes through the lens. According to FIG. 10A to FIG. 10D, it can be seen that the optical imaging lens assembly provided in embodiment 5 can achieve high imaging quality.

Embodiment 6

Figure 11:
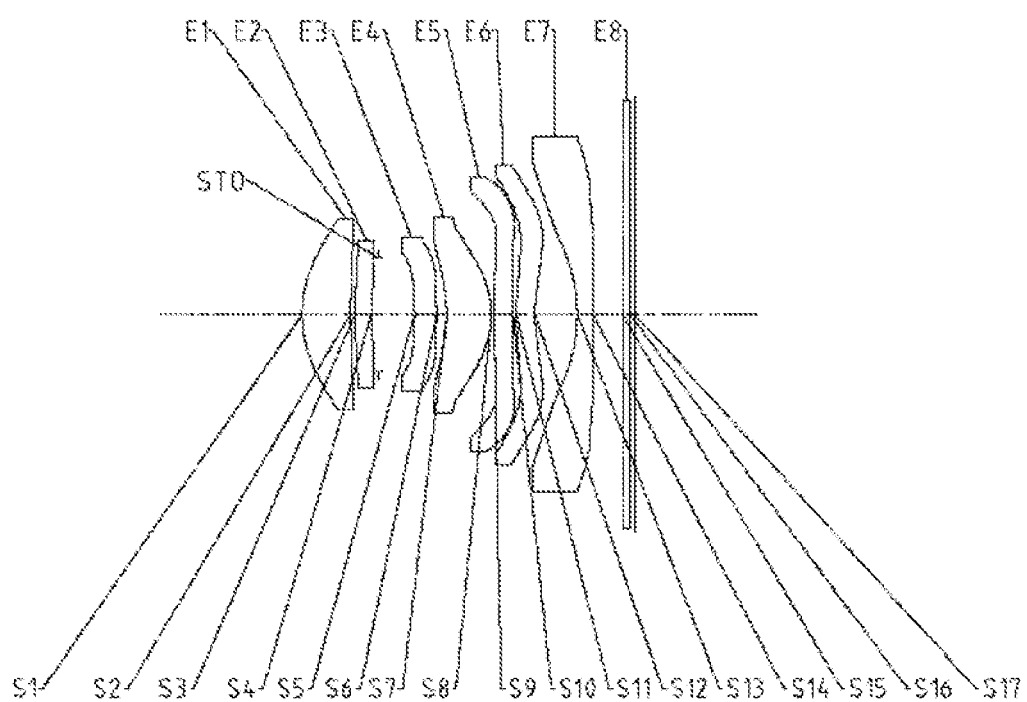
FIG. 11 is a schematic structure diagram of an optical imaging lens assembly according to embodiment 6 of the application.

An optical imaging lens assembly according to embodiment 6 of the application is described below with reference to FIG. 11 to FIG. 12D. FIG. 11 is a schematic structure diagram of an optical imaging lens assembly according to embodiment 6 of the application.

As shown in FIG. 11, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a positive refractive power, an object-side surface S3 thereof is a convex surface, and an image-side surface S4 is a concave surface. The third lens E3 has a negative refractive power, an object-side surface S5 thereof is a concave surface, and an image-side surface S6 is a convex surface. The fourth lens E4 has a positive refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a convex surface, and an image-side surface S12 is a concave surface. The seventh lens E7 has a negative refractive power, an object-side surface S13 thereof is a concave surface, and an image-side surface S14 is a concave surface. The optical filter E8 has an object-side surface S15 and an image-side surface S16. Light from an object sequentially penetrates through each of the surfaces S1 to S16 and is finally image on the imaging surface S17.

Table 16 shows a surface type, radius of curvature, thickness, material and conic coefficient of each lens of the optical imaging lens assembly according to embodiment 6. Units of the radius of curvature and the thickness are mm.

TABLE 16

| Surface number | Surface type | Radius of curvature | Thickness | Refractive index | Abbe number | Conic coefficient |
|---|---|---|---|---|---|---|
| OBJ | Spherical | Infinite | Infinite | | | |
| S1 | Aspherical | 1.7736 | 0.6815 | 1.55 | 64.1 | −0.2615 |

TABLE 16-continued

| Surface number | Surface type | Radius of curvature | Thickness | Refractive index | Abbe number | Conic coefficient |
|---|---|---|---|---|---|---|
| S2 | Aspherical | 6.0505 | 0.0657 | | | −94.8897 |
| S3 | Aspherical | 6.4727 | 0.2293 | 1.67 | 20.4 | −97.6887 |
| S4 | Aspherical | 10.4660 | 0.1006 | | | 51.7385 |
| STO | Spherical | Infinite | 0.5071 | | | 0.0000 |
| S5 | Aspherical | −12.9993 | 0.3158 | 1.65 | 23.5 | −35.1942 |
| S6 | Aspherical | −16.0762 | 0.1431 | | | 54.2937 |
| S7 | Aspherical | −2.1156 | 0.6311 | 1.55 | 64.1 | −1.4437 |
| S8 | Aspherical | −1.1502 | 0.0347 | | | −0.4904 |
| S9 | Aspherical | 52.3344 | 0.2696 | 1.55 | 64.1 | −99.0000 |
| S10 | Aspherical | −11.5089 | 0.0433 | | | 29.5820 |
| S11 | Aspherical | 4.1897 | 0.2650 | 1.67 | 20.4 | −5.7691 |
| S12 | Aspherical | 2.3470 | 0.6039 | | | −8.0800 |
| S13 | Aspherical | −2.0727 | 0.2207 | 1.55 | 64.1 | −2.1131 |
| S14 | Aspherical | 47.7664 | 0.4133 | | | −0.3659 |
| S15 | Spherical | Infinite | 0.1100 | 1.52 | 64.2 | |
| S16 | Spherical | Infinite | 0.0687 | | | |
| S17 | Spherical | Infinite | | | | |

Table 17 shows higher-order coefficients applied to each aspherical mirror surface in embodiment 6. The surface type of each aspherical surface may be defined by formula (1) in embodiment 1.

TABLE 17

| Surface number | A4 | A6 | A8 | A10 | A12 |
|---|---|---|---|---|---|
| S1 | −5.6742E−03 | 1.5245E−02 | −4.9643E−02 | 6.3763E−02 | −4.9339E−02 |
| S2 | −4.0639E−02 | −1.1572E−02 | 1.3607E−01 | −2.8379E−01 | 2.9512E−01 |
| S3 | −5.0290E−02 | 5.0308E−02 | 1.1461E−01 | −3.6192E−01 | 4.4442E−01 |
| S4 | −3.4962E−02 | 6.4557E−02 | −1.2066E−02 | −2.6202E−01 | 5.0895E−01 |
| S5 | −1.3726E−01 | −3.0516E−01 | 6.5894E−01 | −1.3696E+00 | 1.7093E+00 |
| S6 | −4.8658E−02 | −8.2679E−02 | −2.3762E−01 | 6.1515E−01 | −6.5380E−01 |
| S7 | 9.5819E−02 | 9.7676E−02 | −6.2830E−01 | 9.8025E−01 | −6.9869E−01 |
| S8 | 2.5999E−01 | −3.1803E−01 | 2.9663E−01 | −1.7945E−01 | 8.1212E−02 |
| S9 | 6.7515E−02 | −8.4082E−02 | 1.1723E−01 | −1.2429E−01 | 6.2151E−02 |
| S10 | −4.0673E−02 | 2.3610E−01 | −2.3385E−01 | 1.0957E−01 | −2.9235E−02 |
| S11 | −3.6394E−02 | 2.9872E−02 | −7.0426E−02 | 5.3175E−02 | −2.4541E−02 |
| S12 | −6.1557E−02 | 3.6698E−02 | −6.5325E−02 | 5.0663E−02 | −2.2499E−02 |
| S13 | 6.8050E−02 | −1.8834E−01 | 1.7948E−01 | −7.4346E−02 | 1.3266E−02 |
| S14 | 6.4653E−02 | −1.4914E−01 | 1.1298E−01 | −4.4574E−02 | 1.0451E−02 |

| Surface number | A14 | A16 | A18 | A20 |
|---|---|---|---|---|
| S1 | 1.6108E−02 | −1.3064E−03 | 0.0000E+00 | 0.0000E+00 |
| S2 | −1.5488E−01 | 3.3735E−02 | 0.0000E+00 | 0.0000E+00 |
| S3 | −2.6529E−01 | 6.1726E−02 | 0.0000E+00 | 0.0000E+00 |
| S4 | −4.6495E−01 | 1.6986E−01 | 0.0000E+00 | 0.0000E+00 |
| S5 | −1.3240E+00 | 4.5213E−01 | 0.0000E+00 | 0.0000E+00 |
| S6 | 3.6064E−01 | −8.0046E−02 | 0.0000E+00 | 0.0000E+00 |
| S7 | 2.4486E−01 | −3.4514E−02 | 0.0000E+00 | 0.0000E+00 |
| S8 | −1.9833E−02 | 1.8392E−03 | 0.0000E+00 | 0.0000E+00 |
| S9 | −1.4723E−02 | 1.3600E−03 | 0.0000E+00 | 0.0000E+00 |
| S10 | 4.3385E−03 | −2.8066E−04 | 0.0000E+00 | 0.0000E+00 |
| S11 | 8.3731E−03 | −1.9638E−03 | 2.6351E−04 | −1.4775E−05 |
| S12 | 6.3185E−03 | −1.0978E−03 | 1.0620E−04 | −4.3171E−06 |
| S13 | −4.1582E−05 | −3.5322E−04 | 5.0636E−05 | −2.3176E−06 |
| S14 | −1.5297E−03 | 1.3834E−04 | −7.0819E−06 | 1.5575E−07 |

Table 18 shows effective focal lengths f1 to f7 of the lenses in embodiment 6, a total effective focal length f of the optical imaging lens assembly, a TTL of the optical imaging lens assembly and a half of the diagonal length ImgH of an effective pixel region on the imaging surface S17 of the optical imaging lens assembly.

TABLE 18

| f1(mm) | 4.35 | f(mm) | 3.58 |
|---|---|---|---|
| f2(mm) | 171.54 | TTL(mm) | 4.02 |
| f3(mm) | −109.65 | ImgH(mm) | 3.06 |
| f4(mm) | 3.75 | | |
| f5(mm) | 17.30 | | |
| f6(mm) | −8.48 | | |
| f7(mm) | −3.63 | | |

Figure 12A:
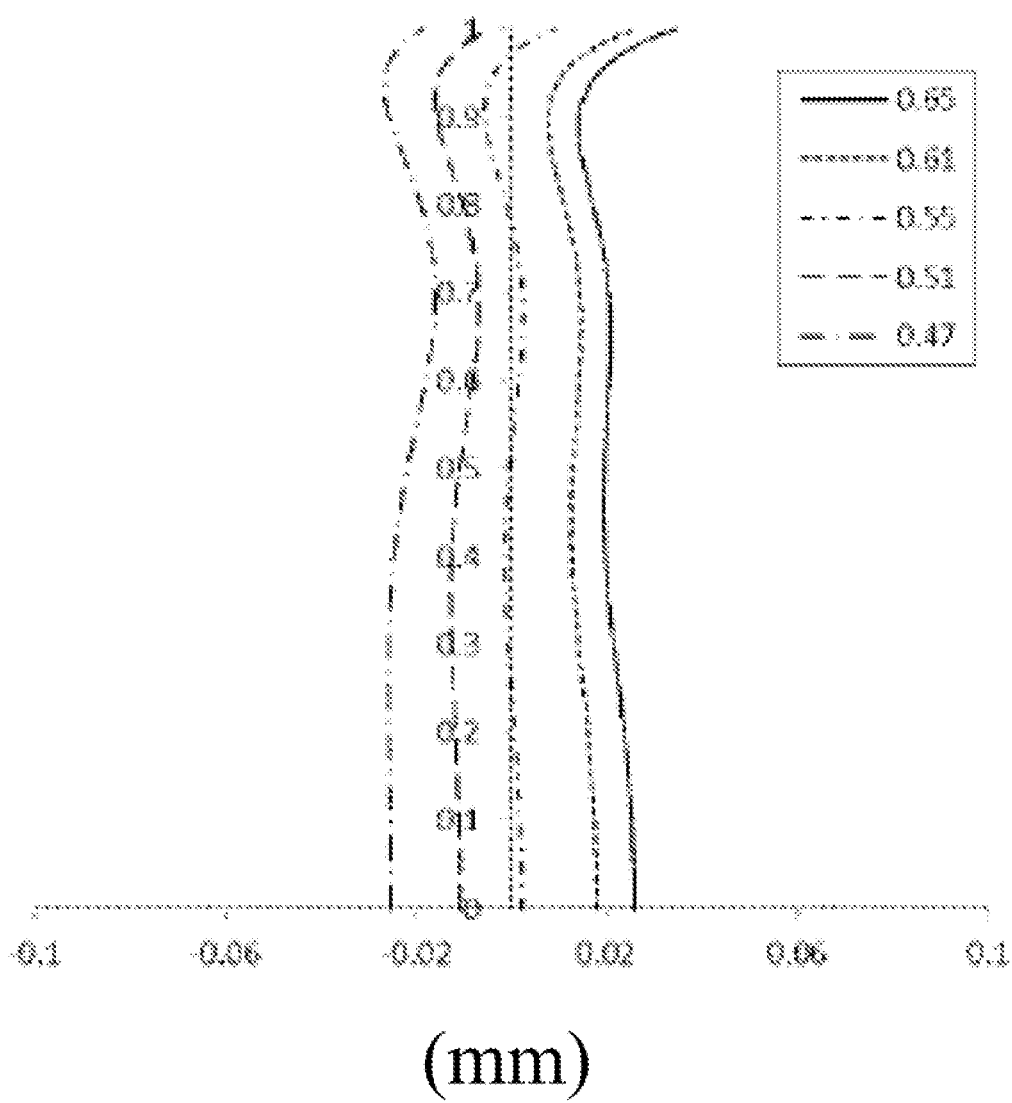
FIG. 12A to FIG. 12D illustrate a longitudinal aberration curve, an astigmatism curve, a distortion curve and a lateral color curve of an optical imaging lens assembly respectively according to embodiment 6.
Figure 12B:
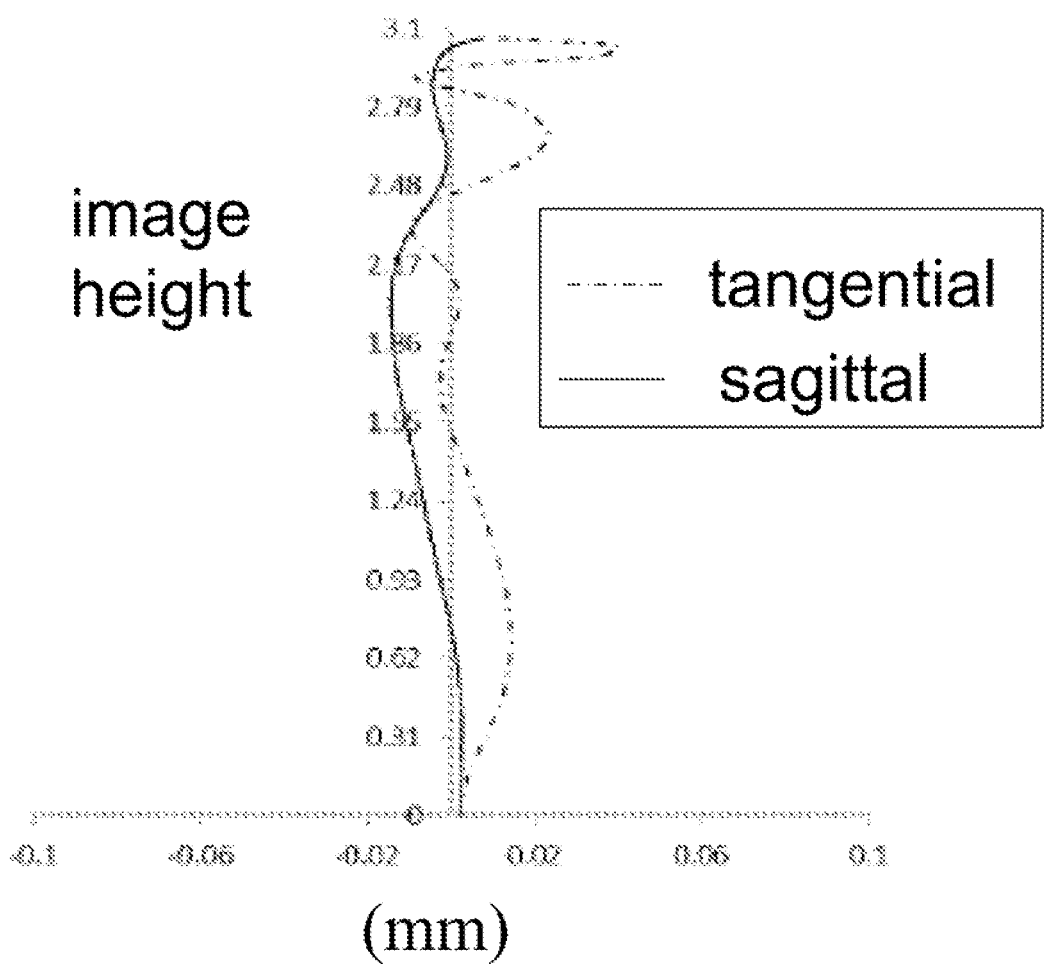
Figure 12C:
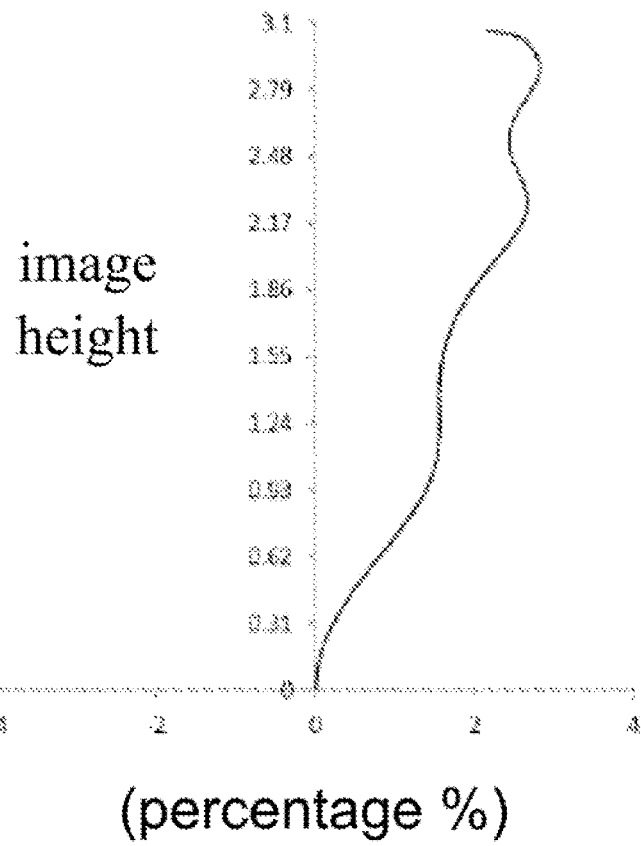
Figure 12D:
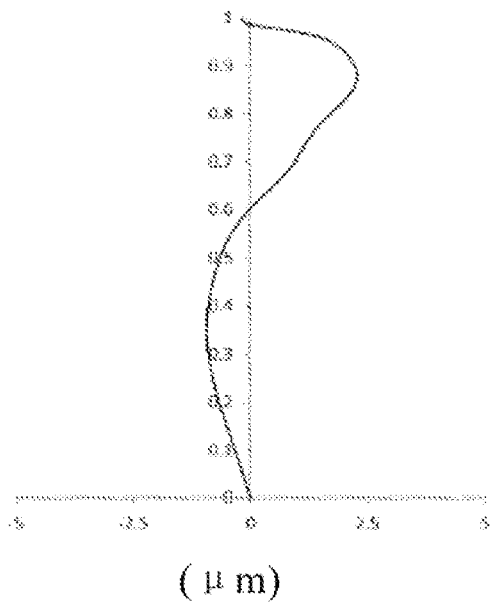

FIG. 12A illustrates a longitudinal aberration curve of the optical imaging lens assembly according to embodiment 6 to represent deviation of a convergence focal point after light with different wavelengths passes through the lens. FIG. 12B illustrates an astigmatism curve of the optical imaging lens assembly according to embodiment 6 to represent a tangential image surface curvature and a sagittal image surface curvature. FIG. 12C illustrates a distortion curve of the optical imaging lens assembly according to embodiment 6 to represent a distortion value under different viewing angles. FIG. 12D illustrates a lateral color curve of the optical imaging lens assembly according to embodiment 6 to represent deviation of different image heights on the imaging surface after the light passes through the lens. According to FIG. 12A to FIG. 12D, it can be seen that the optical imaging lens assembly provided in embodiment 6 may achieve high imaging quality.

Embodiment 7

Figure 13:
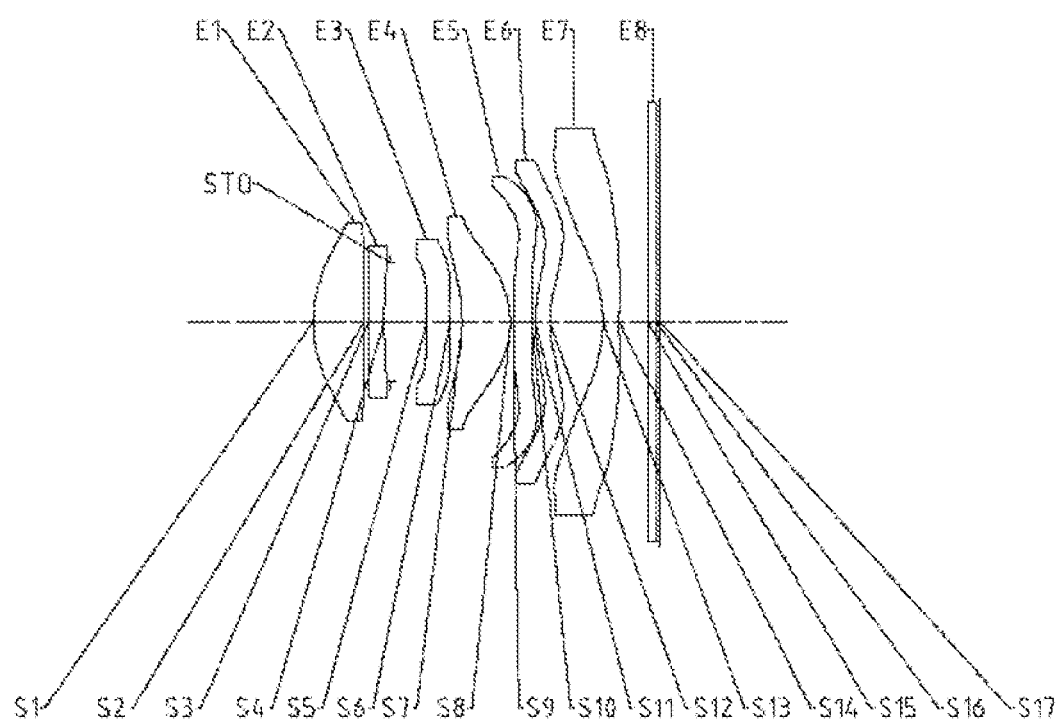
FIG. 13 is a schematic structure diagram of an optical imaging lens assembly according to embodiment 7 of the application.

An optical imaging lens assembly according to embodiment 7 of the application is described below with reference to FIG. 13 to FIG. 14D. FIG. 13 is a schematic structure diagram of an optical imaging lens assembly according to embodiment 7 of the application.

As shown in FIG. 13, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a negative refractive power, an object-side surface S5 thereof is a convex surface, and an image-side surface S6 is a concave surface. The fourth lens E4 has a positive refractive power, an object-side surface S7 thereof is a concave surface, and an image-side surface S8 is a convex surface. The fifth lens E5 has a negative refractive power, an object-side surface S9 thereof is a convex surface, and an image-side surface S10 is a concave surface. The sixth lens E6 has a negative refractive power, an object-side surface S11 thereof is a convex surface, and an image-side surface S12 is a concave surface. The seventh lens E7 has a negative refractive power, an object-side surface S13 thereof is a concave surface, and an image-side surface S14 is a convex surface. The optical filter E8 has an object-side surface S15 and an image-side surface S16. Light from an object sequentially penetrates through each of the surfaces S1 to S16 and is finally image on the imaging surface S17.

Table 13 shows a surface type, radius of curvature, thickness, material and conic coefficient of each lens of the optical imaging lens assembly according to embodiment 7. Units of the radius of curvature and the thickness are mm.

TABLE 19

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| S1 | Aspherical | 1.8396 | 0.6989 | 1.55 | 64.1 | −0.2787 |
| S2 | Aspherical | 34.4023 | 0.0630 | | | −70.1225 |
| S3 | Aspherical | 389.4823 | 0.2100 | 1.67 | 20.4 | 99.0000 |
| S4 | Aspherical | 8.4323 | 0.0922 | | | −5.2095 |
| STO | Spherical | Infinite | 0.4937 | | | 0.0000 |
| S5 | Aspherical | 102.1697 | 0.3180 | 1.65 | 23.5 | 99.0000 |
| S6 | Aspherical | 56.3564 | 0.1691 | | | −99.0000 |
| S7 | Aspherical | −2.1409 | 0.6584 | 1.55 | 64.1 | −1.2902 |
| S8 | Aspherical | −1.0864 | 0.0343 | | | −0.5027 |
| S9 | Aspherical | 37.4264 | 0.2532 | 1.55 | 64.1 | 79.9617 |
| S10 | Aspherical | 26.3170 | 0.0459 | | | 56.6676 |
| S11 | Aspherical | 1.9974 | 0.1994 | 1.67 | 20.4 | −8.5134 |
| S12 | Aspherical | 1.5490 | 0.7270 | | | −6.8288 |
| S13 | Aspherical | −2.0142 | 0.2228 | 1.55 | 64.1 | −2.0537 |
| S14 | Aspherical | −963.9063 | 0.3940 | | | −99.0000 |
| S15 | Spherical | Infinite | 0.1100 | 1.52 | 64.2 | |
| S16 | Spherical | Infinite | 0.0600 | | | |
| S17 | Spherical | Infinite | | | | |

Table 20 shows higher-order coefficients applied to each aspherical mirror surface in embodiment 7. The surface type of each aspherical surface may be

TABLE 20

| Surface number | A4 | A6 | A8 | A10 | A12 |
|---|---|---|---|---|---|
| S1 | −3.7257E−03 | 1.0120E−02 | −4.0096E−02 | 5.3711E−02 | −4.3089E−02 |
| S2 | −5.9020E−02 | 7.3470E−02 | −4.0940E−02 | −5.4919E−02 | 1.0551E−01 |
| S3 | −5.8197E−02 | 1.3146E−01 | −9.0542E−02 | −8.7245E−02 | 2.3408E−01 |
| S4 | −2.7075E−02 | 3.1556E−02 | 1.2655E−01 | −7.0774E−01 | 1.3118E+00 |
| S5 | −1.6027E−01 | −6.8288E−02 | −3.8642E−01 | 1.3203E+00 | −2.4025E+00 |
| S6 | −6.5348E−02 | −1.6082E−02 | −2.3189E−01 | 4.5100E−01 | −4.2456E−01 |
| S7 | 6.1704E−02 | 1.2028E−01 | −4.2535E−01 | 5.6596E−01 | −3.6887E−01 |
| S8 | 2.6751E−01 | −3.4626E−01 | 3.8797E−01 | −3.2850E−01 | 2.0672E−01 |
| S9 | 1.0651E−01 | −1.0961E−01 | 1.1298E−01 | −9.9463E−02 | 4.4595E−02 |
| S10 | −6.4333E−02 | 1.9911E−01 | −1.6762E−01 | 6.2192E−02 | −1.1729E−02 |
| S11 | −3.1427E−02 | −2.3503E−02 | −2.1577E−03 | 1.4388E−02 | −1.6706E−02 |
| S12 | −2.5210E−02 | −3.0880E−02 | −7.3076E−03 | 2.7668E−02 | −2.0880E−02 |

TABLE 20-continued

| | | | | |
|---|---|---|---|---|
| S13 | 7.0799E−02 | −2.2238E−01 | 2.3286E−01 | −1.1383E−01 | 2.9846E−02 |
| S14 | 8.3063E−02 | −2.0153E−01 | 1.6991E−01 | −7.9334E−02 | 2.3126E−02 |

| Surface number | A14 | A16 | A18 | A20 |
|---|---|---|---|---|
| S1 | 1.3624E−02 | −9.1806E−04 | 0.0000E+00 | 0.0000E+00 |
| S2 | −6.5666E−02 | 1.5302E−02 | 0.0000E+00 | 0.0000E+00 |
| S3 | −1.8096E−01 | 4.8322E−02 | 0.0000E+00 | 0.0000E+00 |
| S4 | −1.1764E+00 | 4.1381E−01 | 0.0000E+00 | 0.0000E+00 |
| S5 | 2.0551E+00 | −6.5457E−01 | 0.0000E+00 | 0.0000E+00 |
| S6 | 2.1022E−01 | −4.0227E−02 | 0.0000E+00 | 0.0000E+00 |
| S7 | 1.2048E−01 | −1.5883E−02 | 0.0000E+00 | 0.0000E+00 |
| S8 | −7.1402E−02 | 1.0113E−02 | 0.0000E+00 | 0.0000E+00 |
| S9 | −9.5460E−03 | 7.8995E−04 | 0.0000E+00 | 0.0000E+00 |
| S10 | 1.0550E−03 | −3.3563E−05 | 0.0000E+00 | 0.0000E+00 |
| S11 | 1.0285E−02 | −3.2636E−03 | 5.0901E−04 | −3.1050E−05 |
| S12 | 8.3132E−03 | −1.8549E−03 | 2.1746E−04 | −1.0412E−05 |
| S13 | −4.2207E−03 | 2.7420E−04 | −1.1241E−06 | −5.1047E−07 |
| S14 | −4.3272E−03 | 5.0352E−04 | −3.2957E−05 | 9.2147E−07 |

Table 21 shows effective focal lengths f1 to f7 of the lenses in embodiment 7, a total effective focal length f of the optical imaging lens assembly, a TTL of the optical imaging lens assembly and a half of the diagonal length ImgH of an effective pixel region on the imaging surface S17 of the optical imaging lens assembly.

TABLE 21

| | | | |
|---|---|---|---|
| f1(mm) | 3.53 | f(mm) | 3.58 |
| f2(mm) | −12.92 | TTL(mm) | 4.05 |
| f3(mm) | −195.26 | ImgH(mm) | 3.06 |
| f4(mm) | 3.31 | | |
| f5(mm) | −163.65 | | |
| f6(mm) | −12.57 | | |
| f7(mm) | −3.70 | | |

Figure 14A:
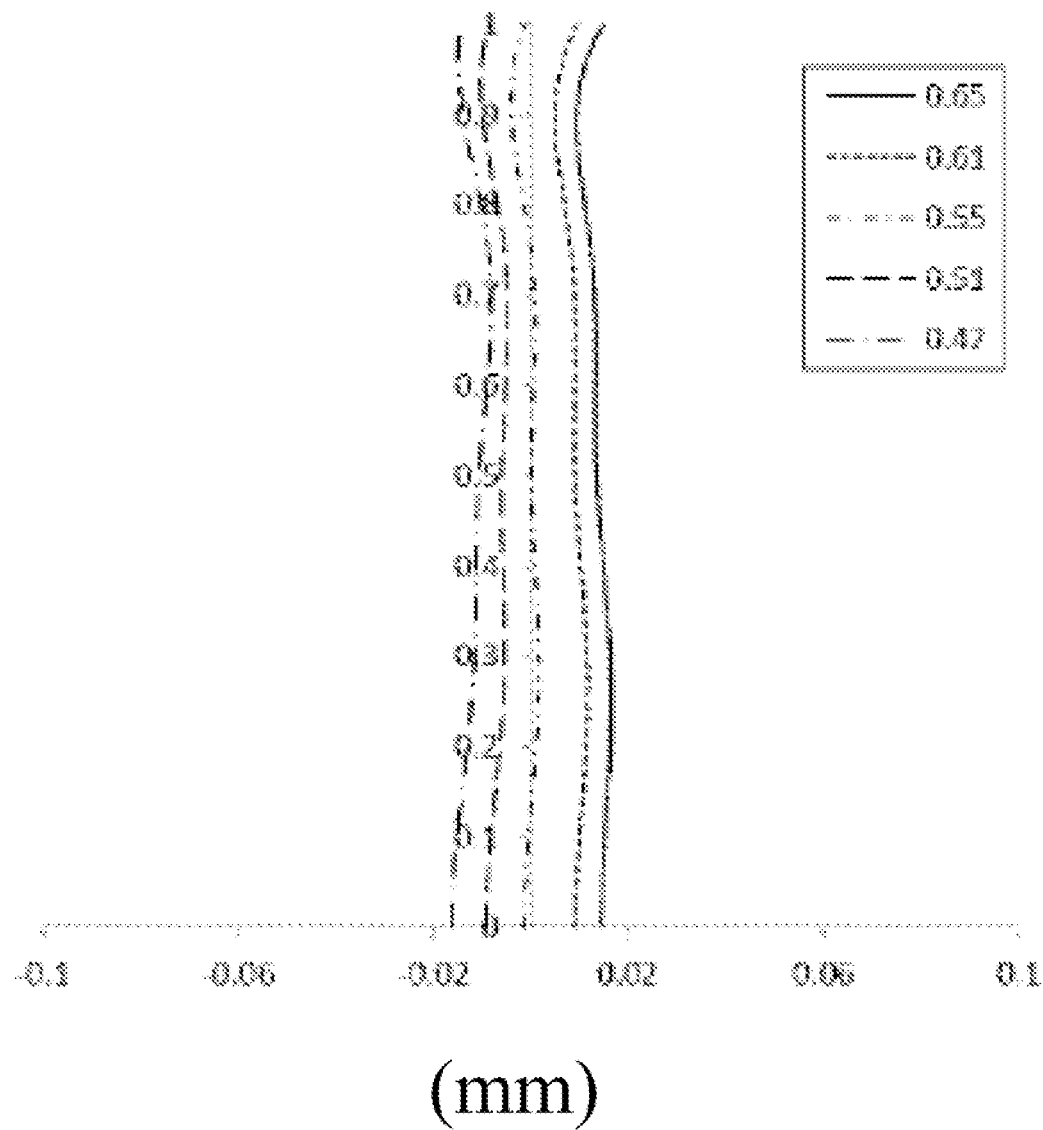
FIG. 14A to FIG. 14D illustrate a longitudinal aberration curve, an astigmatism curve, a distortion curve and a lateral color curve of an optical imaging lens assembly respectively according to embodiment 7
Figure 14B:
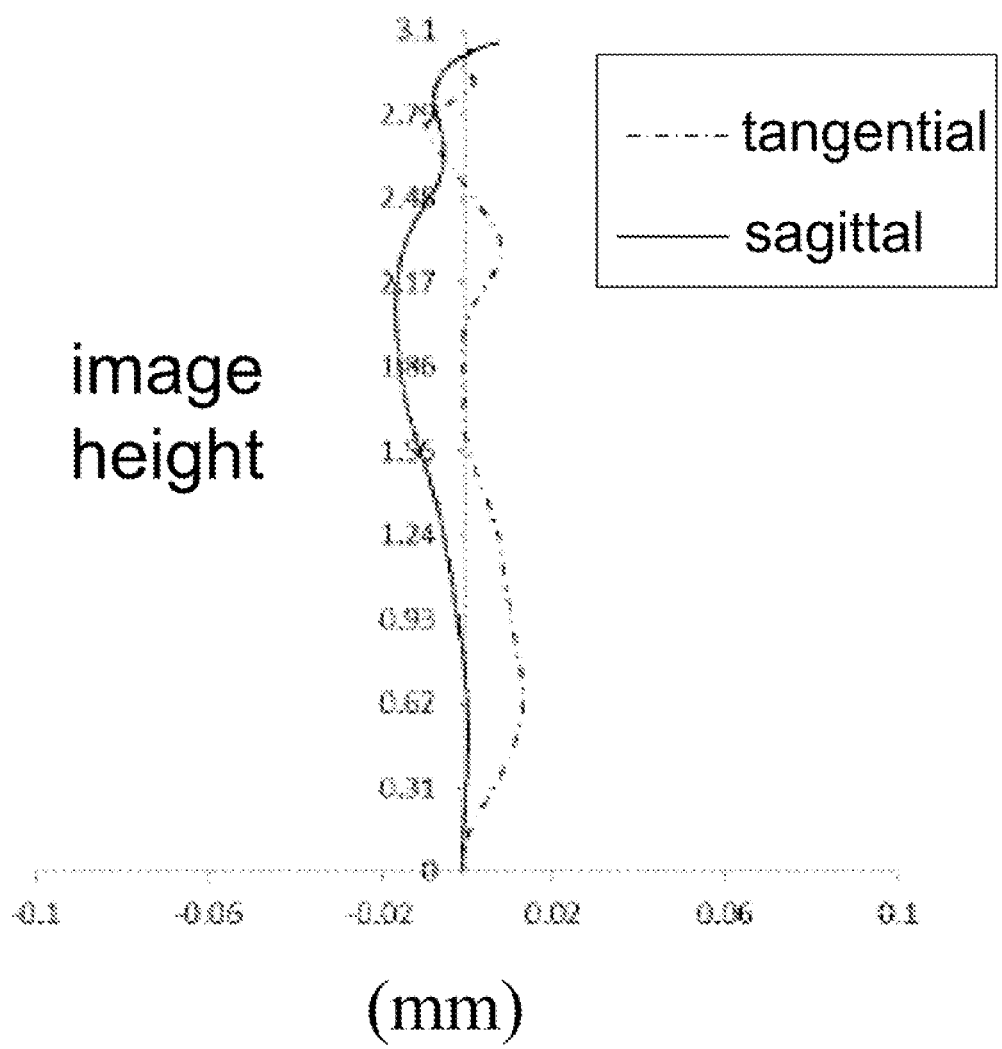
Figure 14C:
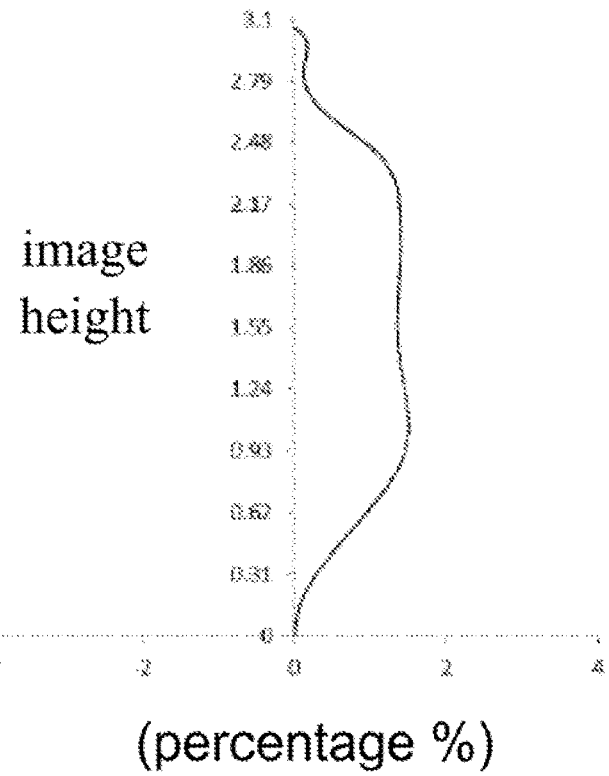
Figure 14D:
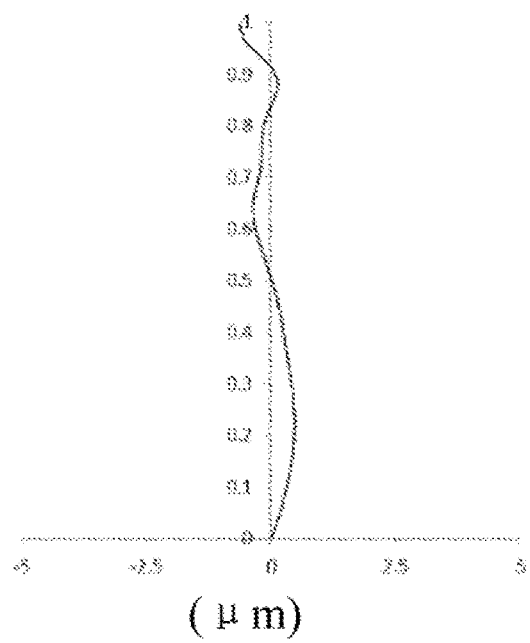

FIG. 14A illustrates a longitudinal aberration curve of the optical imaging lens assembly according to embodiment 7 to represent deviation of a convergence focal point after light with different wavelengths passes through the lens. FIG. 14B illustrates an astigmatism curve of the optical imaging lens assembly according to embodiment 7 to represent a tangential image surface curvature and a sagittal image surface curvature. FIG. 14C illustrates a distortion curve of the optical imaging lens assembly according to embodiment 7 to represent a distortion value under different viewing angles. FIG. 14D illustrates a lateral color curve of the optical imaging lens assembly according to embodiment 7 to represent deviation of different image heights on the imaging surface after the light passes through the lens. According to FIG. 14A to FIG. 14D, it can be seen that the optical imaging lens assembly provided in embodiment 7 can achieve high imaging quality.

Embodiment 8

Figure 15:
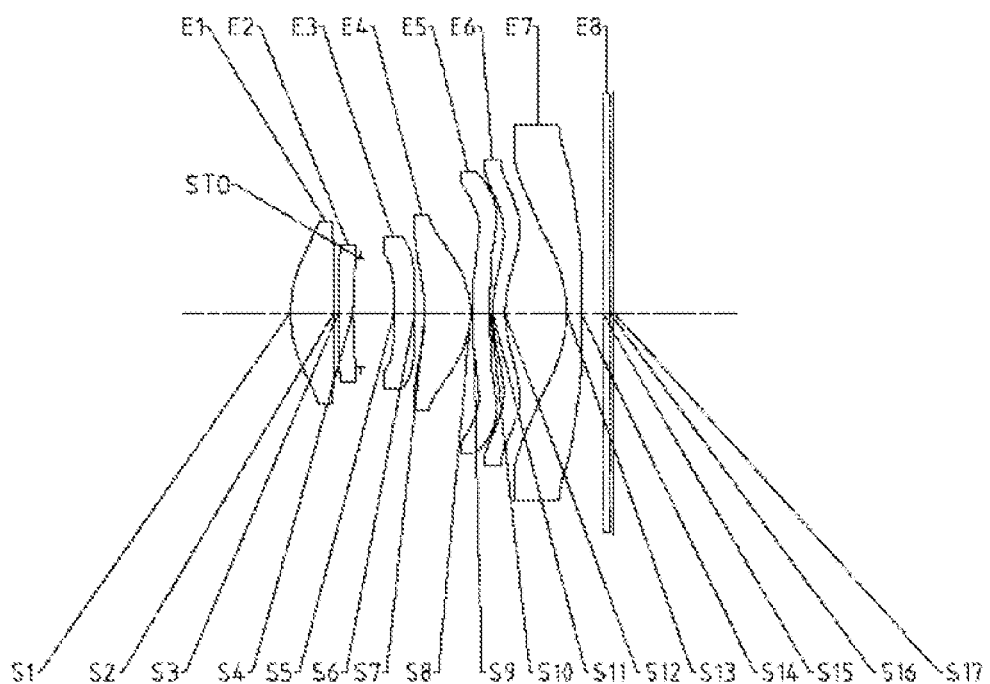
FIG. 15 is a schematic structure diagram of an optical imaging lens assembly according to embodiment 8 of the application.

An optical imaging lens assembly according to embodiment 8 of the application is described below with reference to FIG. 15 to FIG. 16D. FIG. 15 is a schematic structure diagram of an optical imaging lens assembly according to embodiment 8 of the application.

As shown in FIG. 15, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a negative refractive power, an object-side surface S5 thereof is a convex surface, and an image-side surface S6 is a concave surface. The fourth lens E4 has a positive refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a concave surface. The sixth lens E6 has a negative refractive power, an object-side surface S11 thereof is a convex surface, and an image-side surface S12 is a concave surface. The seventh lens E7 has a negative refractive power, an object-side surface S13 thereof is a concave surface, and an image-side surface S14 is a convex surface. The optical filter E8 has an object-side surface S15 and an image-side surface S16. Light from an object sequentially penetrates through each of the surfaces S1 to S16 and is finally image on the imaging surface S17.

Table 15 shows a surface type, radius of curvature, thickness, material and conic coefficient of each lens of the optical imaging lens assembly according to embodiment 8. Units of the radius of curvature and the thickness are mm.

TABLE 22

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| S1 | Aspherical | 1.8185 | 0.6471 | 1.55 | 64.1 | −0.3776 |
| S2 | Aspherical | 13.7056 | 0.0641 | | | −99.0000 |
| S3 | Aspherical | 36.8249 | 0.2100 | 1.67 | 20.4 | 99.0000 |
| S4 | Aspherical | 8.0903 | 0.1031 | | | 22.8969 |
| STO | Spherical | Infinite | 0.5007 | | | 0.0000 |
| S5 | Aspherical | 59.5324 | 0.3032 | 1.65 | 23.5 | 99.0000 |
| S6 | Aspherical | 35.2509 | 0.1507 | | | 99.0000 |
| S7 | Aspherical | −2.2508 | 0.6738 | 1.55 | 64.1 | −2.0083 |
| S8 | Aspherical | −1.1140 | 0.0300 | | | −0.4941 |
| S9 | Aspherical | 24.0578 | 0.2546 | 1.55 | 64.1 | 79.9617 |
| S10 | Aspherical | 108.0748 | 0.0300 | | | 99.0000 |
| S11 | Aspherical | 2.0164 | 0.1784 | 1.67 | 20.4 | −5.6846 |
| S12 | Aspherical | 1.4789 | 0.9105 | | | −5.6382 |
| S13 | Aspherical | −1.9471 | 0.2100 | 1.55 | 64.1 | −1.8582 |

TABLE 22-continued

| Surface number | Surface type | Radius of curvature | Thickness | Material Refractive index | Abbe number | Conic coefficient |
|---|---|---|---|---|---|---|
| S14 | Aspherical | −236.4585 | 0.3119 | | | −99.0000 |
| S15 | Spherical | Infinite | 0.1100 | 1.52 | 64.2 | |
| S16 | Spherical | Infinite | 0.0619 | | | |
| S17 | Spherical | Infinite | | | | |

Table 23 shows higher-order coefficients applied to each aspherical mirror surface in embodiment 8. The surface type of each aspherical surface may be defined by formula (1) in embodiment 1.

TABLE 23

| Surface number | A4 | A6 | A8 | A10 | A12 |
|---|---|---|---|---|---|
| S1 | −2.3343E−03 | 1.1426E−02 | −5.3984E−02 | 8.2741E−02 | −7.8343E−02 |
| S2 | −6.9574E−02 | 6.8760E−02 | −4.3038E−02 | −1.8681E−02 | 5.1579E−02 |
| S3 | −5.8872E−02 | 1.2597E−01 | −6.2807E−02 | −1.0545E−01 | 2.4536E−01 |
| S4 | −2.1132E−02 | 7.5021E−02 | −1.1286E−01 | 2.6627E−02 | 1.4472E−01 |
| S5 | −1.7292E−01 | −1.0931E−02 | −5.7689E−01 | 1.6602E+00 | −2.8340E+00 |
| S6 | −7.2733E−02 | −1.0358E−02 | −1.3788E−01 | 2.0148E−01 | −1.3749E−01 |
| S7 | 7.3273E−02 | 5.5109E−02 | −1.7261E−01 | 2.0500E−01 | −1.2149E−01 |
| S8 | 3.0230E−01 | −4.7260E−01 | 5.9637E−01 | −5.2020E−01 | 3.0702E−01 |
| S9 | 9.6791E−02 | −9.2565E−02 | 9.4221E−02 | −7.9392E−02 | 3.3233E−02 |
| S10 | −4.5830E−02 | 2.0285E−01 | −1.7770E−01 | 7.0108E−02 | −1.4753E−02 |
| S11 | 2.5923E−03 | −1.3043E−01 | 1.8660E−01 | −1.6377E−01 | 8.3997E−02 |
| S12 | −1.5839E−03 | −9.8890E−02 | 1.0849E−01 | −7.5751E−02 | 3.2485E−02 |
| S13 | 6.2070E−02 | −1.8721E−01 | 1.7865E−01 | −7.8461E−02 | 1.7949E−02 |
| S14 | 7.4573E−02 | −1.5680E−01 | 1.1339E−01 | −4.5278E−02 | 1.1372E−02 |

| Surface number | A14 | A16 | A18 | A20 |
|---|---|---|---|---|
| S1 | 3.2467E−02 | −4.5523E−03 | 0.0000E+00 | 0.0000E+00 |
| S2 | −3.3224E−02 | 7.8351E−03 | 0.0000E+00 | 0.0000E+00 |
| S3 | −1.9598E−01 | 5.6256E−02 | 0.0000E+00 | 0.0000E+00 |
| S4 | −2.7063E−01 | 1.4195E−01 | 0.0000E+00 | 0.0000E+00 |
| S5 | 2.4180E+00 | −8.3036E−01 | 0.0000E+00 | 0.0000E+00 |
| S6 | 4.0719E−02 | −1.1898E−03 | 0.0000E+00 | 0.0000E+00 |
| S7 | 3.6053E−02 | −4.2764E−03 | 0.0000E+00 | 0.0000E+00 |
| S8 | −9.9118E−02 | 1.3131E−02 | 0.0000E+00 | 0.0000E+00 |
| S9 | −6.5440E−03 | 4.9378E−04 | 0.0000E+00 | 0.0000E+00 |
| S10 | 1.6232E−03 | −7.4382E−05 | 0.0000E+00 | 0.0000E+00 |
| S11 | −2.5205E−02 | 4.3722E−03 | −4.0591E−04 | 1.5581E−05 |
| S12 | −8.3155E−03 | 1.2366E−03 | −9.8105E−05 | 3.1869E−06 |
| S13 | −2.0208E−03 | 5.7798E−05 | 8.2818E−06 | −5.7912E−07 |
| S14 | −1.8591E−03 | 1.9188E−04 | −1.1279E−05 | 2.8562E−07 |

Table 24 shows effective focal lengths f1 to f7 of the lenses in embodiment 8, a total effective focal length f of the optical imaging lens assembly, a TTL of the optical imaging lens assembly and a half of the diagonal length ImgH of an effective pixel region on the imaging surface S17 of the optical imaging lens assembly.

TABLE 24

| f1(mm) | 3.77 | f(mm) | 3.58 |
|---|---|---|---|
| f2(mm) | −15.58 | TTL(mm) | 4.10 |
| f3(mm) | −134.57 | ImgH(mm) | 3.27 |
| f4(mm) | 3.34 | | |
| f5(mm) | 56.60 | | |
| f6(mm) | −9.59 | | |
| f7(mm) | −3.60 | | |

Figure 16A:
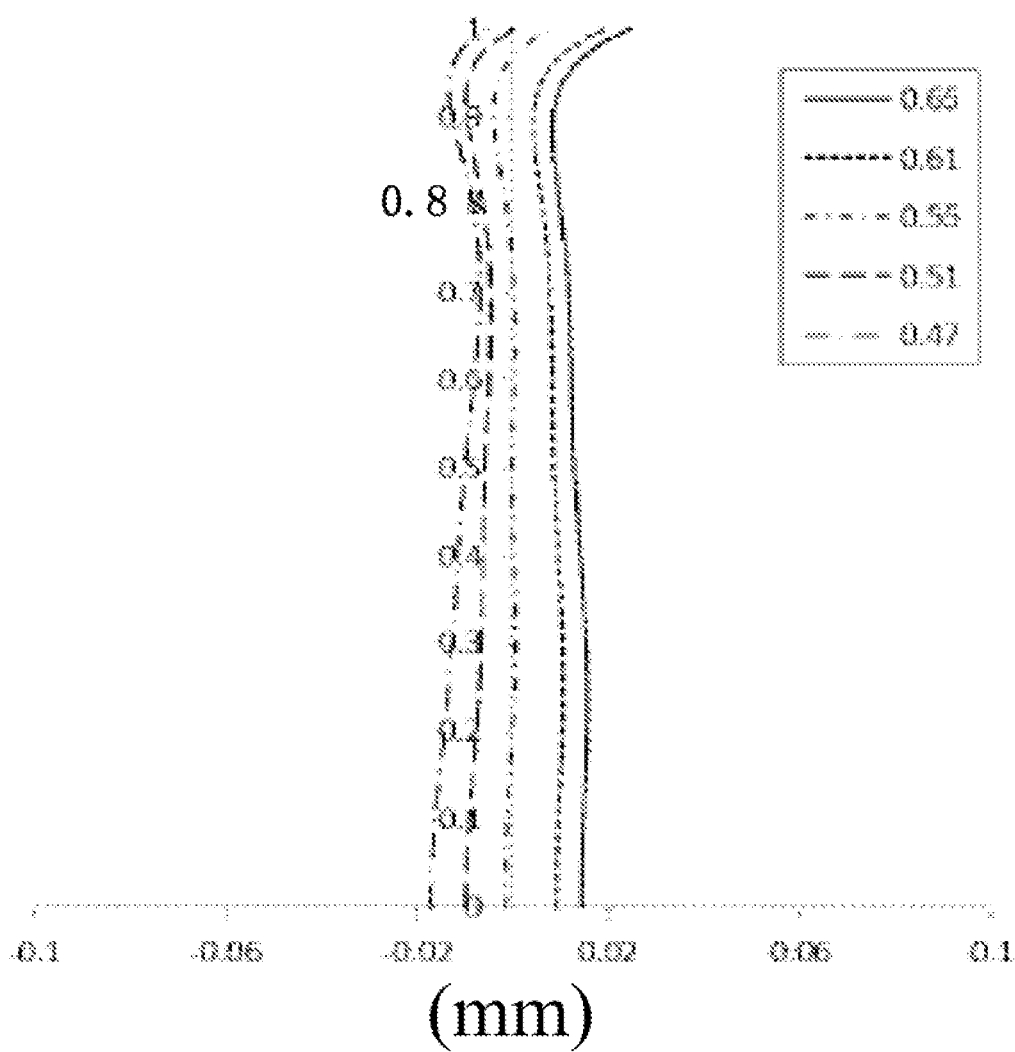
Figure 16C:
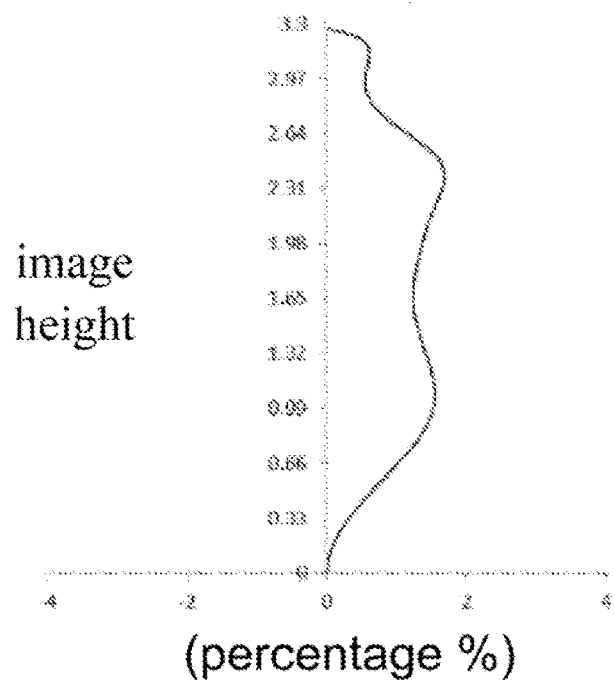
Figure 16D:
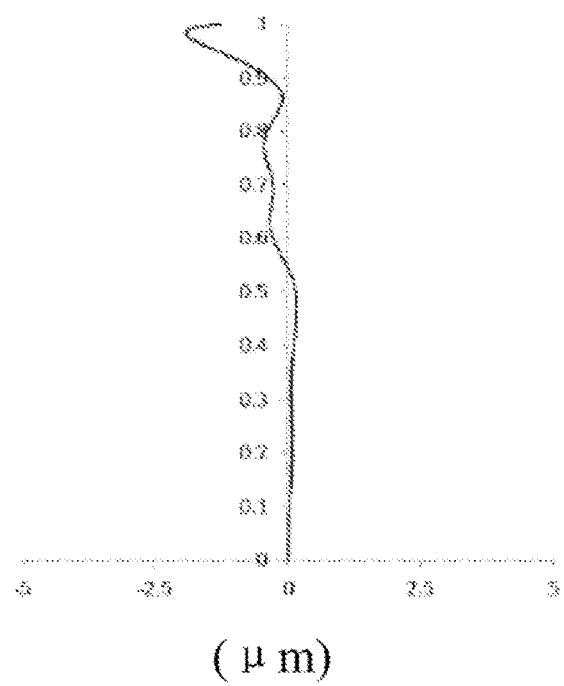

FIG. 16A illustrates a longitudinal aberration curve of the optical imaging lens assembly according to embodiment 8 to represent deviation of a convergence focal point after light with different wavelengths passes through the lens. FIG. 16B illustrates an astigmatism curve of the optical imaging lens assembly according to embodiment 8 to represent a tangential image surface curvature and a sagittal image surface curvature. FIG. 16C illustrates a distortion curve of the optical imaging lens assembly according to embodiment 8 to represent a distortion value under different viewing angles. FIG. 16D illustrates a lateral color curve of the optical imaging lens assembly according to embodiment 8 to represent deviation of different image heights on the imaging surface after the light passes through the lens. According to FIG. 16A to FIG. 16D, it can be seen that the optical imaging lens assembly provided in embodiment 8 can achieve high imaging quality.

Embodiment 9

Figure 17:
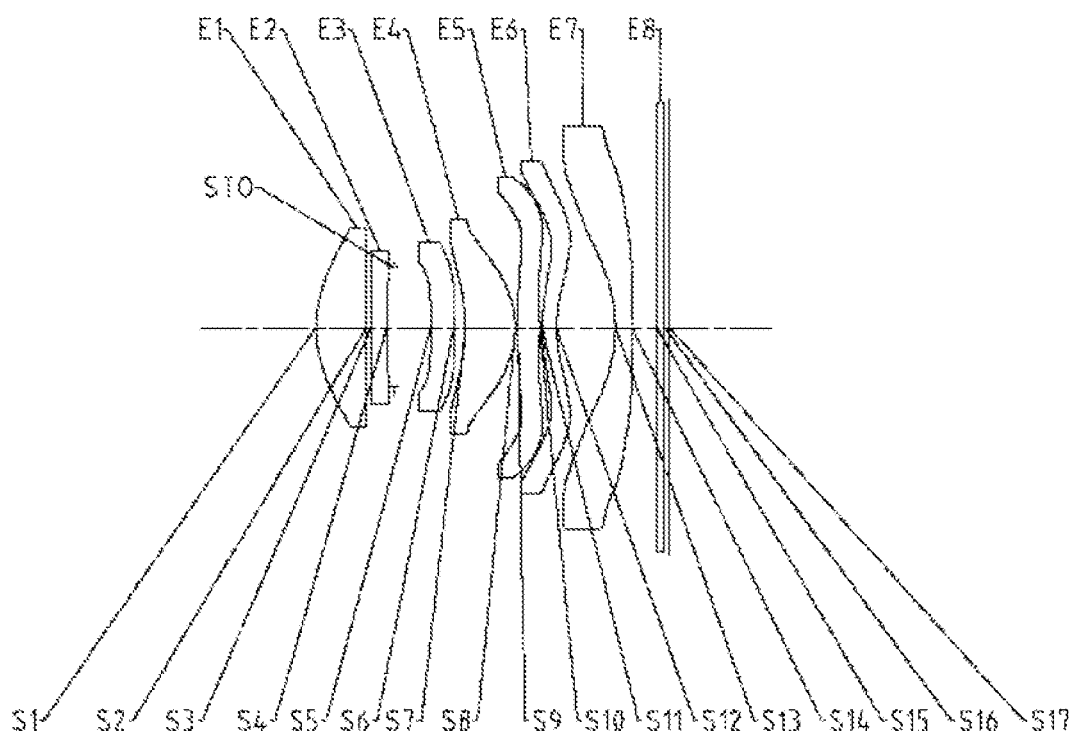
FIG. 17 is a schematic structure diagram of an optical imaging lens assembly according to embodiment 9 of the application.

An optical imaging lens assembly according to embodiment 9 of the application is described below with reference to FIG. 17 to FIG. 18D. FIG. 17 is a schematic structure diagram of an optical imaging lens assembly according to embodiment 9 of the application.

As shown in FIG. 17, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a negative refractive power, an object-side surface S5 thereof is a convex surface, and an image-side surface S6 is a concave surface. The fourth lens E4 has a positive refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a convex surface, and an image-side surface S12 is a concave surface. The seventh lens E7 has a negative refractive power, an object-side surface S13 thereof is a concave surface, and an image-side surface S14 is a convex surface. The optical filter E8 has an object-side surface S15 and an image-side surface S16. Light from an object sequentially penetrates through each of the surfaces S1 to S16 and is finally image on the imaging surface S17.

Table 25 shows a surface type, radius of curvature, thickness, material and conic coefficient of each lens of the optical imaging lens assembly according to embodiment 9. Units of the radius of curvature and the thickness are mm.

TABLE 25

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspherical | 1.8285 | 0.6780 | 1.55 | 64.1 | −0.2792 |

TABLE 25-continued

| Surface number | Surface type | Radius of curvature | Thickness | Material Refractive index | Abbe number | Conic coefficient |
|---|---|---|---|---|---|---|
| S2 | Aspherical | 28.8297 | 0.0631 | | | −99.0000 |
| S3 | Aspherical | 137.0605 | 0.2100 | 1.67 | 20.4 | 99.0000 |
| S4 | Aspherical | 8.4266 | 0.0930 | | | −2.7898 |
| ST0 | Spherical | Infinite | 0.5016 | | | 0.0000 |
| S5 | Aspherical | 449.0601 | 0.3080 | 1.65 | 23.5 | 99.0000 |
| S6 | Aspherical | 141.8230 | 0.1595 | | | −99.0000 |
| S7 | Aspherical | −2.1389 | 0.6736 | 1.55 | 64.1 | −1.2710 |
| S8 | Aspherical | −1.0864 | 0.0300 | | | −0.4990 |
| S9 | Aspherical | 71.6059 | 0.2935 | 1.55 | 64.1 | 79.9618 |
| S10 | Aspherical | −25.0111 | 0.0300 | | | 31.3372 |
| S11 | Aspherical | 2.2855 | 0.1907 | 1.67 | 20.4 | −7.7316 |
| S12 | Aspherical | 1.5276 | 0.8007 | | | −6.7225 |
| S13 | Aspherical | −1.9428 | 0.2210 | 1.55 | 64.1 | −2.0359 |
| S14 | Aspherical | −86.2245 | 0.3273 | | | −99.0000 |
| S15 | Spherical | Infinite | 0.1100 | 1.52 | 64.2 | |
| S16 | Spherical | Infinite | 0.0600 | | | |
| S17 | Spherical | Infinite | | | | |

Table 26 shows higher-order coefficients applied to each aspherical mirror surface in embodiment 9. The surface type of each aspherical surface may be defined by formula (1) in embodiment 1.

TABLE 26

| Surface number | A4 | A6 | A8 | A10 | A12 |
|---|---|---|---|---|---|
| S1 | −2.7721E−03 | 8.0149E−03 | −3.3349E−02 | 4.2138E−02 | −3.3068E−02 |
| S2 | −5.6732E−02 | 6.2199E−02 | −1.9165E−02 | −7.9355E−02 | 1.2343E−01 |
| S3 | −5.6053E−02 | 1.1819E−01 | −5.6125E−02 | −1.3608E−01 | 2.7671E−01 |
| S4 | −2.7600E−02 | 5.9908E−02 | −6.1768E−02 | −8.6254E−02 | 2.3714E−01 |
| S5 | −1.5955E−01 | −9.9095E−02 | −3.0935E−02 | 1.2518E+00 | −2.4939E+00 |
| S6 | −5.6734E−02 | −8.5313E−02 | −8.2089E−02 | 2.8909E−01 | −3.3564E−01 |
| S7 | 8.2103E−02 | 3.2116E−03 | −1.8078E−01 | 3.0636E−01 | −2.1749E−01 |
| S8 | 2.7352E−01 | −3.6828E−01 | 4.1759E−01 | −3.3416E−01 | 1.8871E−01 |
| S9 | 6.4512E−02 | −3.0444E−02 | 3.1442E−02 | −4.9163E−02 | 2.6589E−02 |
| S10 | −4.1808E−02 | 2.0860E−01 | −1.9605E−01 | 8.4196E−02 | −1.9957E−02 |
| S11 | −2.5677E−02 | −4.1180E−02 | 3.6471E−02 | −3.0274E−02 | 1.2904E−02 |
| S12 | −2.4160E−02 | −4.6622E−02 | 2.9437E−02 | −1.1120E−02 | 1.9117E−03 |
| S13 | 5.9540E−02 | −1.7231E−01 | 1.6297E−01 | −6.7357E−02 | 1.2589E−02 |
| S14 | 7.9440E−02 | −1.7434E−01 | 1.3470E−01 | −5.8105E−02 | 1.5885E−02 |

| Surface number | A14 | A16 | A18 | A20 |
|---|---|---|---|---|
| S1 | 8.7065E−03 | 1.7571E−04 | 0.0000E+00 | 0.0000E+00 |
| S2 | −7.3994E−02 | 1.7239E−02 | 0.0000E+00 | 0.0000E+00 |
| S3 | −2.0308E−01 | 5.3532E−02 | 0.0000E+00 | 0.0000E+00 |
| S4 | −2.4839E−01 | 9.7335E−02 | 0.0000E+00 | 0.0000E+00 |
| S5 | 2.2692E+00 | −7.7264E−01 | 0.0000E+00 | 0.0000E+00 |
| S6 | 1.9517E−01 | −4.3262E−02 | 0.0000E+00 | 0.0000E+00 |
| S7 | 7.4341E−02 | −1.0118E−02 | 0.0000E+00 | 0.0000E+00 |
| S8 | −5.9209E−02 | 7.9412E−03 | 0.0000E+00 | 0.0000E+00 |
| S9 | −6.1272E−03 | 5.2600E−04 | 0.0000E+00 | 0.0000E+00 |
| S10 | 2.5788E−03 | −1.4438E−04 | 0.0000E+00 | 0.0000E+00 |
| S11 | −1.4271E−03 | −5.3973E−04 | 1.6627E−04 | −1.3085E−05 |
| S12 | 4.7177E−04 | −2.9049E−04 | 5.0032E−05 | −2.9795E−06 |
| S13 | −4.2829E−04 | −2.1661E−04 | 3.3446E−05 | −1.5310E−06 |
| S14 | −2.8410E−03 | 3.2116E−04 | −2.0625E−05 | 5.6808E−07 |

Table 27 shows effective focal lengths f1 to f7 of the lenses in embodiment 9, a total effective focal length f of the optical imaging lens assembly, a TTL of the optical imaging lens assembly and a half of the diagonal length ImgH of an effective pixel region on the imaging surface S17 of the optical imaging lens assembly.

TABLE 27

| f1(mm) | 3.54 | f(mm) | 3.58 |
|---|---|---|---|
| f2(mm) | −13.46 | TTL(mm) | 4.07 |
| f3(mm) | −321.30 | ImgH(mm) | 3.06 |
| f4(mm) | 3.30 | | |
| f5(mm) | 33.98 | | |
| f6(mm) | −7.68 | | |
| f7(mm) | −3.64 | | |

Figure 18C:
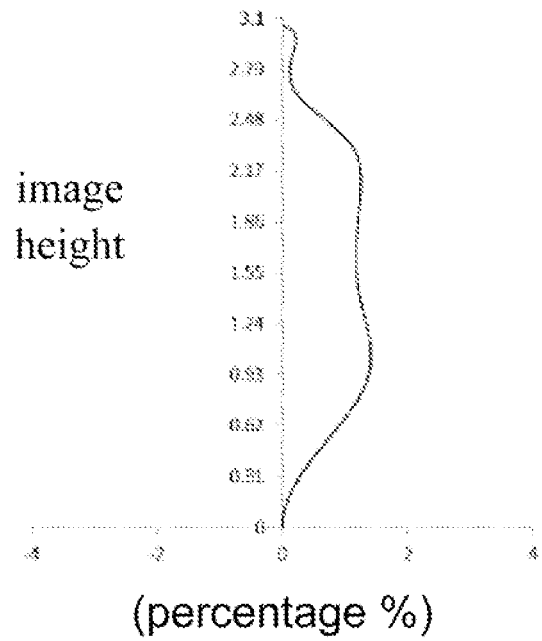
Figure 18D:
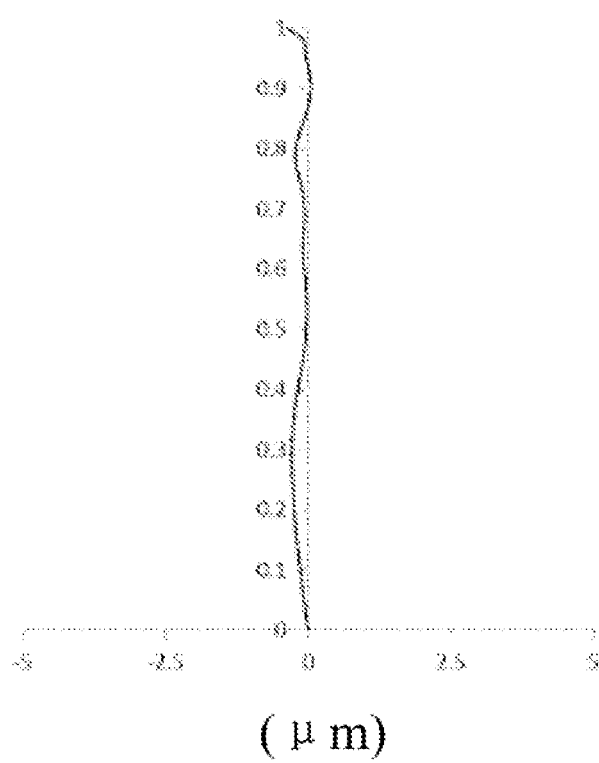

FIG. 18A illustrates a longitudinal aberration curve of the optical imaging lens assembly according to embodiment 9 to represent deviation of a convergence focal point after light with different wavelengths passes through the lens. FIG. 18B illustrates an astigmatism curve of the optical imaging lens assembly according to embodiment 9 to represent a tangential image surface curvature and a sagittal image surface curvature. FIG. 18C illustrates a distortion curve of the optical imaging lens assembly according to embodiment 9 to represent a distortion value under different viewing angles. FIG. 18D illustrates a lateral color curve of the optical imaging lens assembly according to embodiment 9 to represent deviation of different image heights on the imaging surface after the light passes through the lens. According to FIG. 18A to FIG. 18D, it can be seen that the optical imaging lens assembly provided in embodiment 9 can achieve high imaging quality.

Embodiment 10

Figure 19:
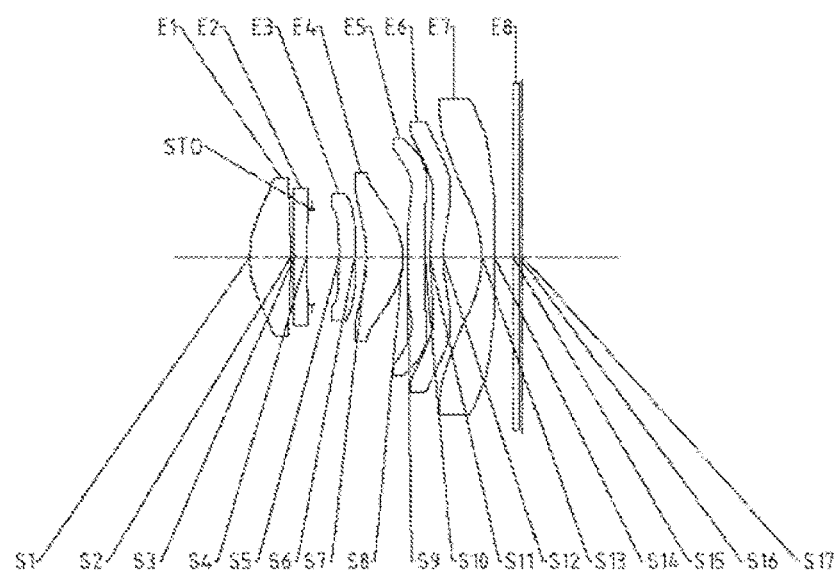
FIG. 19 is a schematic structure diagram of an optical imaging lens assembly according to embodiment 10 of the application.

An optical imaging lens assembly according to embodiment 10 of the application is described below with reference to FIG. 19 to FIG. 20D. FIG. 19 is a schematic structure diagram of an optical imaging lens assembly according to embodiment 10 of the application.

As shown in FIG. 19, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a convex surface. The second lens E2 has a negative refractive power, an object-side surface S3 thereof is a concave surface, and an image-side surface S4 is a concave surface. The third lens E3 has a positive refractive power, an object-side surface S5 thereof is a convex surface, and an image-side surface S6 is a concave surface. The fourth lens E4 has a positive refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a convex surface, and an image-side surface S12 is a concave surface. The seventh lens E7 has a negative refractive power, an object-side surface S13 thereof is a concave surface, and an image-side surface S14 is a concave surface. The optical filter E8 has an object-side surface S15 and an image-side surface S16. Light from an object sequentially penetrates through each of the surfaces S1 to S16 and is finally image on the imaging surface S17.

Table 28 shows a surface type, radius of curvature, thickness, material and conic coefficient of each lens of the optical imaging lens assembly according to embodiment 10. Units of the radius of curvature and the thickness are mm.

TABLE 28

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| S1 | Aspherical | 1.8940 | 0.7061 | 1.55 | 64.1 | −0.3462 |
| S2 | Aspherical | −251.5488 | 0.0628 | | | −67.1851 |
| S3 | Aspherical | −36.2198 | 0.2100 | 1.67 | 20.4 | −51.2262 |
| S4 | Aspherical | 9.8307 | 0.0855 | | | −16.9643 |
| STO | Spherical | Infinite | 0.4867 | | | 0.0000 |
| S5 | Aspherical | 23.2062 | 0.2721 | 1.65 | 23.5 | 98.0407 |
| S6 | Aspherical | 23.9616 | 0.2073 | | | 95.5370 |
| S7 | Aspherical | −2.0844 | 0.6315 | 1.55 | 64.1 | −1.4645 |
| S8 | Aspherical | −1.0861 | 0.0767 | | | −0.5072 |
| S9 | Aspherical | 36.2320 | 0.3042 | 1.55 | 64.1 | 79.9617 |
| S10 | Aspherical | −35.4331 | 0.0876 | | | 99.0000 |
| S11 | Aspherical | 4.7916 | 0.2321 | 1.67 | 20.4 | 0.2017 |
| S12 | Aspherical | 2.4565 | 0.6762 | | | −5.3285 |
| S13 | Aspherical | −1.9747 | 0.2171 | 1.55 | 64.1 | −1.9692 |
| S14 | Aspherical | 104.2984 | 0.3240 | | | 51.4334 |
| S15 | Spherical | Infinite | 0.1100 | 1.52 | 64.2 | |
| S16 | Spherical | Infinite | 0.0600 | | | |
| S17 | Spherical | Infinite | | | | |

Table 29 shows higher-order coefficients applied to each aspherical mirror surface in embodiment 10. The surface type of each aspherical surface may be defined by formula (1) given in embodiment 1.

TABLE 29

| Surface number | A4 | A6 | A8 | A10 | A12 |
|---|---|---|---|---|---|
| S1 | −4.9429E−03 | 1.2068E−02 | −4.9736E−02 | 6.8856E−02 | −5.6596E−02 |
| S2 | −7.6050E−02 | 1.2749E−01 | −1.2204E−01 | 2.6188E−02 | 4.4791E−02 |
| S3 | −7.9039E−02 | 2.0684E−01 | −1.7963E−01 | −5.6232E−02 | 2.5805E−01 |
| S4 | −4.2426E−02 | 1.2056E−01 | −1.9476E−01 | 1.2229E−01 | −7.2280E−03 |
| S5 | −1.5059E−01 | −1.5756E−01 | 1.3849E−01 | −4.5222E−01 | 8.8738E−01 |
| S6 | −7.2502E−02 | −6.4055E−03 | −2.1864E−01 | 3.6428E−01 | −2.5660E−01 |
| S7 | 3.4558E−02 | 2.1545E−01 | −5.4778E−01 | 6.7659E−01 | −4.5070E−01 |
| S8 | 2.4903E−01 | −2.5718E−01 | 2.6955E−01 | −2.4827E−01 | 1.7254E−01 |
| S9 | 8.5559E−02 | −5.2294E−02 | 4.0297E−02 | −4.9695E−02 | 2.6087E−02 |
| S10 | −5.2011E−02 | 1.9789E−01 | −1.7131E−01 | 6.5336E−02 | −1.2571E−02 |
| S11 | −5.7210E−03 | −5.2690E−02 | 2.1174E−02 | 2.8209E−04 | −8.4537E−03 |
| S12 | −3.3645E−02 | −1.8733E−02 | −1.6538E−02 | 3.5126E−02 | −2.4771E−02 |

TABLE 29-continued

| | | | | |
|---|---|---|---|---|
| S13 | 1.0651E−01 | −3.3308E−01 | 3.6863E−01 | −2.0507E−01 | 6.6634E−02 |
| S14 | 1.1211E−01 | −2.5584E−01 | 2.1216E−01 | −9.7317E−02 | 2.7653E−02 |

| Surface number | A14 | A16 | A18 | A20 |
|---|---|---|---|---|
| S1 | 2.0043E−02 | −2.2115E−03 | 0.0000E+00 | 0.0000E+00 |
| S2 | −3.6747E−02 | 8.9822E−03 | 0.0000E+00 | 0.0000E+00 |
| S3 | −2.0500E−01 | 5.4448E−02 | 0.0000E+00 | 0.0000E+00 |
| S4 | −5.8683E−02 | 3.1712E−02 | 0.0000E+00 | 0.0000E+00 |
| S5 | −9.7976E−01 | 4.4010E−01 | 0.0000E+00 | 0.0000E+00 |
| S6 | 6.9436E−02 | 2.3602E−03 | 0.0000E+00 | 0.0000E+00 |
| S7 | 1.5770E−01 | −2.2867E−02 | 0.0000E+00 | 0.0000E+00 |
| S8 | −6.0933E−02 | 8.3506E−03 | 0.0000E+00 | 0.0000E+00 |
| S9 | −6.0087E−03 | 5.1775E−04 | 0.0000E+00 | 0.0000E+00 |
| S10 | 1.1225E−03 | −3.0839E−05 | 0.0000E+00 | 0.0000E+00 |
| S11 | 6.2732E−03 | −2.0497E−03 | 3.1676E−04 | −1.8894E−05 |
| S12 | 9.3404E−03 | −1.9693E−03 | 2.1794E−04 | −9.8554E−06 |
| S13 | −1.3304E−02 | 1.6161E−03 | −1.0995E−04 | 3.2167E−06 |
| S14 | −4.9928E−03 | 5.5587E−04 | −3.4653E−05 | 9.2175E−07 |

Table 30 shows effective focal lengths f1 to f7 of the lenses in embodiment 10, a total effective focal length f of the optical imaging lens assembly, a TTL of the optical imaging lens assembly and a half of the diagonal length ImgH of an effective pixel region on the imaging surface S17 of the optical imaging lens assembly.

TABLE 30

| | | | |
|---|---|---|---|
| f1(mm) | 3.45 | f(mm) | 3.58 |
| f2(mm) | −11.56 | TTL(mm) | 4.05 |
| f3(mm) | 999.26 | ImgH(mm) | 3.06 |
| f4(mm) | 3.39 | | |
| f5(mm) | 32.85 | | |
| f6(mm) | −7.87 | | |
| f7(mm) | −3.55 | | |

Figure 20A:
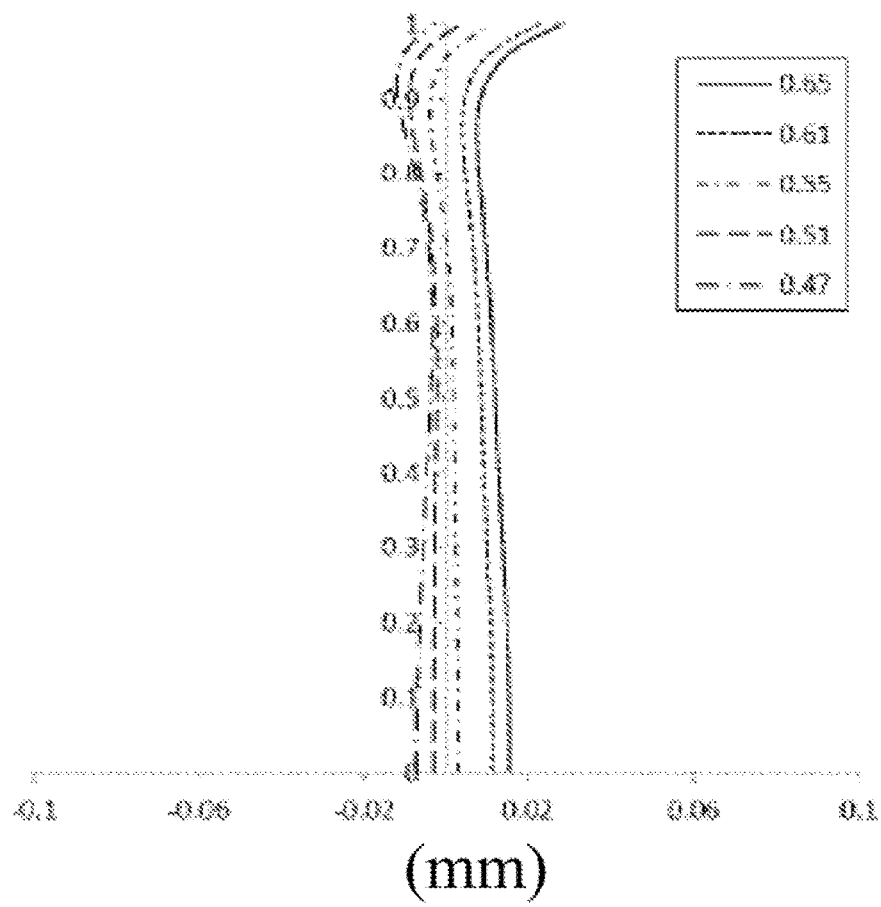
FIG. 20A to FIG. 20D illustrate a longitudinal aberration curve, an astigmatism curve, a distortion curve and a lateral color curve of an optical imaging lens assembly respectively according to embodiment 10.
Figure 20B:
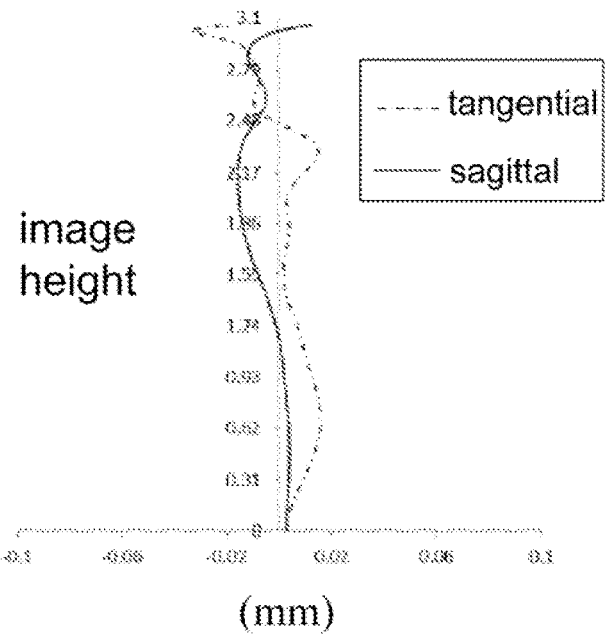
Figure 20C:
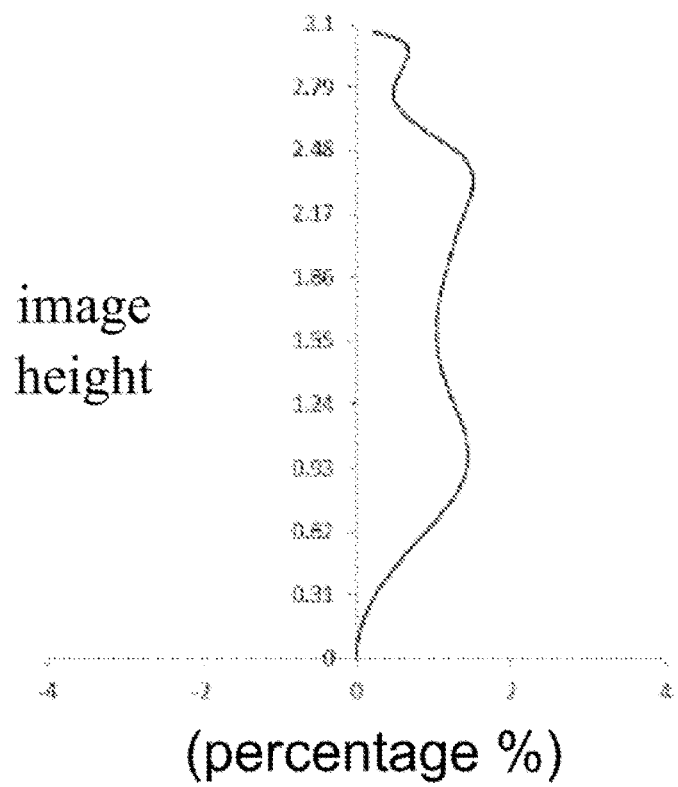
Figure 20D:
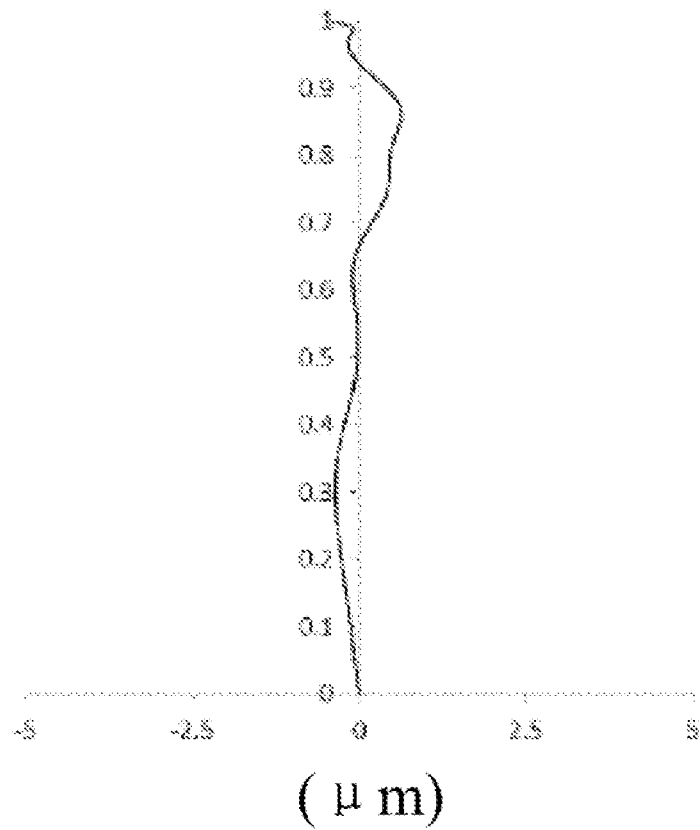

FIG. 20A illustrates a longitudinal aberration curve of the optical imaging lens assembly according to embodiment 10 to represent deviation of a convergence focal point after light with different wavelengths passes through the lens. FIG. 20B illustrates an astigmatism curve of the optical imaging lens assembly according to embodiment 10 to represent a tangential image surface curvature and a sagittal image surface curvature. FIG. 20C illustrates a distortion curve of the optical imaging lens assembly according to embodiment 10 to represent a distortion value under different viewing angles. FIG. 20D illustrates a lateral color curve of the optical imaging lens assembly according to embodiment 10 to represent deviation of different image heights on the imaging surface after the light passes through the lens. According to FIG. 20A to FIG. 20D, it can be seen that the optical imaging lens assembly provided in embodiment 10 may achieve high imaging quality.

Embodiment 11

Figure 21:
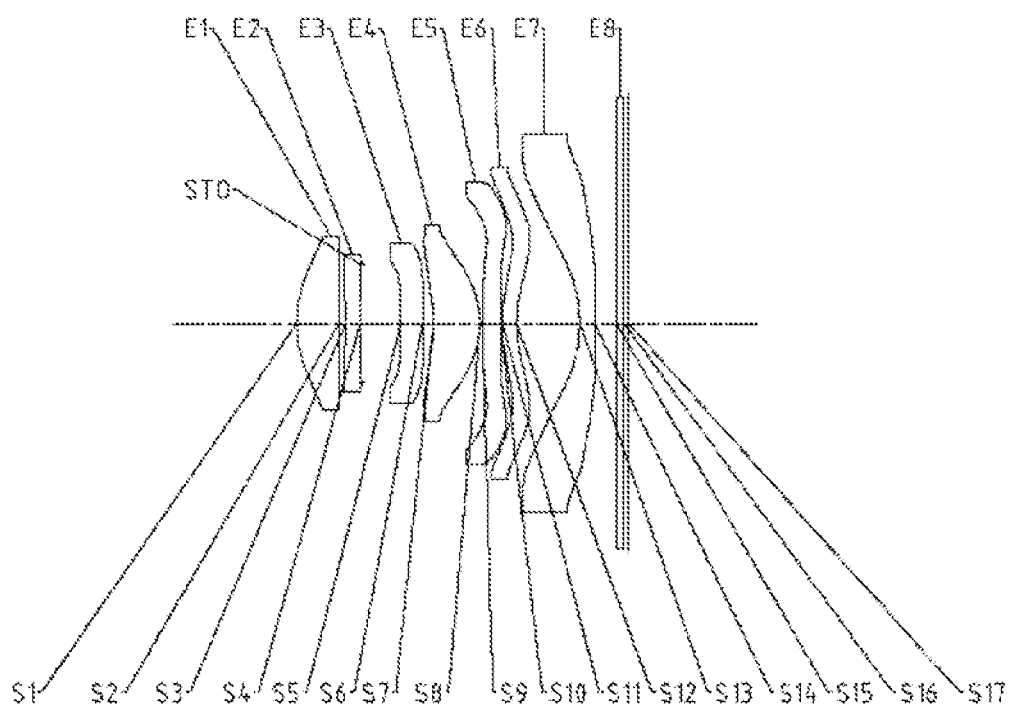
FIG. 21 is a schematic structure diagram of an optical imaging lens assembly according to embodiment 11 of the application.

An optical imaging lens assembly according to embodiment 11 of the application is described below with reference to FIG. 21 to FIG. 22D. FIG. 21 is a schematic structure diagram of an optical imaging lens assembly according to embodiment 11 of the application.

As shown in FIG. 21, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a negative refractive power, an object-side surface S3 thereof is a concave surface, and an image-side surface S4 is a convex surface. The third lens E3 has a negative refractive power, an object-side surface S5 thereof is a convex surface, and an image-side surface S6 is a concave surface. The fourth lens E4 has a positive refractive power, an object-side surface S7 thereof is a concave surface, and an image-side surface S is a convex surface. The fifth lens E has a positive refractive power, an object-side surface S9 thereof is a convex surface, and an image-side surface S10 is a convex surface. The sixth lens E6 has a negative refractive power, an object-side surface S11 thereof is a convex surface, and an image-side surface S12 is a concave surface. The seventh lens E1 has a negative refractive power, an object-side surface S13 thereof is a concave surface, and an image-side surface S14 is a convex surface. The optical filter E has an object-side surface S15 and an image-side surface S16. Light from an object sequentially penetrates through each of the surfaces S1 to S16 and is finally image on the imaging surface S17.

Table 31 shows a surface type, radius of curvature, thickness, material and conic coefficient of each lens of the optical imaging lens assembly according to embodiment 11. Units of the radius of curvature and the thickness are mm.

TABLE 31

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| S1 | Aspherical | 1.8289 | 0.6035 | 1.55 | 64.1 | −0.3788 |
| S2 | Aspherical | 12.1540 | 0.0961 | | | −57.6962 |
| S3 | Aspherical | −14.7403 | 0.2100 | 1.67 | 20.4 | −99.0000 |
| S4 | Aspherical | 10.4660 | 0.1006 | | | 6.3627 |
| STO | Spherical | Infinite | 0.5544 | | | 0.0000 |
| S5 | Aspherical | 23.1339 | 0.3094 | 1.65 | 23.5 | 63.5669 |
| S6 | Aspherical | 11.0873 | 0.1558 | | | 20.4960 |
| S7 | Aspherical | −2.4405 | 0.6711 | 1.55 | 64.1 | −2.0209 |
| S8 | Aspherical | −1.1137 | 0.0300 | | | −0.4985 |
| S9 | Aspherical | 42.8006 | 0.2578 | 1.55 | 64.1 | 79.9617 |
| S10 | Aspherical | −642.7137 | 0.0300 | | | 0.0000 |
| S11 | Aspherical | 2.3549 | 0.1981 | 1.67 | 20.4 | −5.7859 |
| S12 | Aspherical | 1.6470 | 0.9131 | | | −6.4354 |
| S13 | Aspherical | −1.8643 | 0.2100 | 1.55 | 64.1 | −1.8119 |
| S14 | Aspherical | −46.1348 | 0.3102 | | | −99.0000 |

TABLE 31-continued

| Surface number | Surface type | Radius of curvature | Thickness | Material Refractive index | Abbe number | Conic coefficient |
|---|---|---|---|---|---|---|
| S15 | Spherical | Infinite | 0.1100 | 1.52 | 64.2 | |
| S16 | Spherical | Infinite | 0.0602 | | | |
| S17 | Spherical | Infinite | | | | |

Table 32 shows higher-order coefficients applied to each aspherical mirror surface in embodiment 11. The surface type of each aspherical surface may be defined by formula (1) in embodiment 1.

TABLE 32

| Surface number | A4 | A6 | A8 | A10 | A12 |
|---|---|---|---|---|---|
| S1 | −2.5407E−03 | 1.4224E−02 | −6.0603E−02 | 8.5056E−02 | −7.0126E−02 |
| S2 | −4.4959E−02 | −2.5429E−02 | 1.3717E−01 | −2.6272E−01 | 2.6962E−01 |
| S3 | −3.9168E−02 | 3.8141E−02 | 1.4809E−01 | −4.1669E−01 | 5.2193E−01 |
| S4 | −1.7274E−02 | 3.7398E−02 | 6.1725E−02 | −2.7547E−01 | 3.7548E−01 |
| S5 | −1.8587E−01 | 1.5375E−02 | −5.7955E−01 | 1.6167E+00 | −2.6307E+00 |
| S6 | −8.5027E−02 | 9.2470E−03 | −1.4788E−01 | 2.3676E−01 | −2.0311E−01 |
| S7 | 7.4672E−02 | 5.1508E−02 | −1.1907E−01 | 8.7651E−02 | −2.1300E−02 |
| S8 | 2.8408E−01 | −4.1587E−01 | 5.2789E−01 | −4.7745E−01 | 2.9001E−01 |
| S9 | 6.9939E−02 | −3.0452E−02 | 2.9595E−02 | −4.8590E−02 | 2.6355E−02 |
| S10 | −5.2204E−02 | 2.3561E−01 | −2.2375E−01 | 9.9451E−02 | −2.4419E−02 |
| S11 | −1.3243E−02 | −5.4925E−02 | 4.6452E−02 | −2.7141E−02 | 6.6907E−03 |
| S12 | −1.7733E−02 | −4.7670E−02 | 2.4319E−02 | 1.5551E−03 | −9.2631E−03 |
| S13 | 5.8507E−02 | −1.7083E−01 | 1.5443E−01 | −6.0204E−02 | 1.0071E−02 |
| S14 | 7.9910E−02 | −1.6789E−01 | 1.2717E−01 | −5.4323E−02 | 1.4747E−02 |

| Surface number | A14 | A16 | A18 | A20 |
|---|---|---|---|---|
| S1 | 2.1156E−02 | −6.1784E−04 | 0.0000E+00 | 0.0000E+00 |
| S2 | −1.4591E−01 | 3.3577E−02 | 0.0000E+00 | 0.0000E+00 |
| S3 | −3.3536E−01 | 8.7853E−02 | 0.0000E+00 | 0.0000E+00 |
| S4 | −2.8810E−01 | 9.6638E−02 | 0.0000E+00 | 0.0000E+00 |
| S5 | 2.1858E+00 | −7.2849E−01 | 0.0000E+00 | 0.0000E+00 |
| S6 | 9.1403E−02 | −1.5864E−02 | 0.0000E+00 | 0.0000E+00 |
| S7 | −2.1798E−03 | 1.1951E−03 | 0.0000E+00 | 0.0000E+00 |
| S8 | −9.3720E−02 | 1.2189E−02 | 0.0000E+00 | 0.0000E+00 |
| S9 | −6.0021E−03 | 5.0592E−04 | 0.0000E+00 | 0.0000E+00 |
| S10 | 3.2272E−03 | −1.8088E−04 | 0.0000E+00 | 0.0000E+00 |
| S11 | 1.0940E−03 | −9.3132E−04 | 1.7820E−04 | −1.1490E−05 |
| S12 | 5.2149E−03 | −1.3470E−03 | 1.6953E−04 | −8.4070E−06 |
| S13 | −8.4028E−06 | −2.4326E−04 | 3.2711E−05 | −1.4114E−06 |
| S14 | −2.6034E−03 | 2.8763E−04 | −1.7906E−05 | 4.7599E−07 |

Table 33 shows effective focal lengths f1 to f7 of the lenses in embodiment 11, a total effective focal length f of the optical imaging lens assembly, a TTL of the optical imaging lens assembly and a half of the diagonal length ImgH of an effective pixel region on the imaging surface S17 of the optical imaging lens assembly.

TABLE 33

| f1(mm) | 3.86 | f(mm) | 3.58 |
|---|---|---|---|
| f2(mm) | −22.13 | TTL(mm) | 4.15 |
| f3(mm) | −33.32 | ImgH(mm) | 3.27 |
| f4(mm) | 3.18 | | |
| f5(mm) | 73.48 | | |
| f6(mm) | −9.24 | | |
| f7(mm) | −3.56 | | |

Figure 22A:
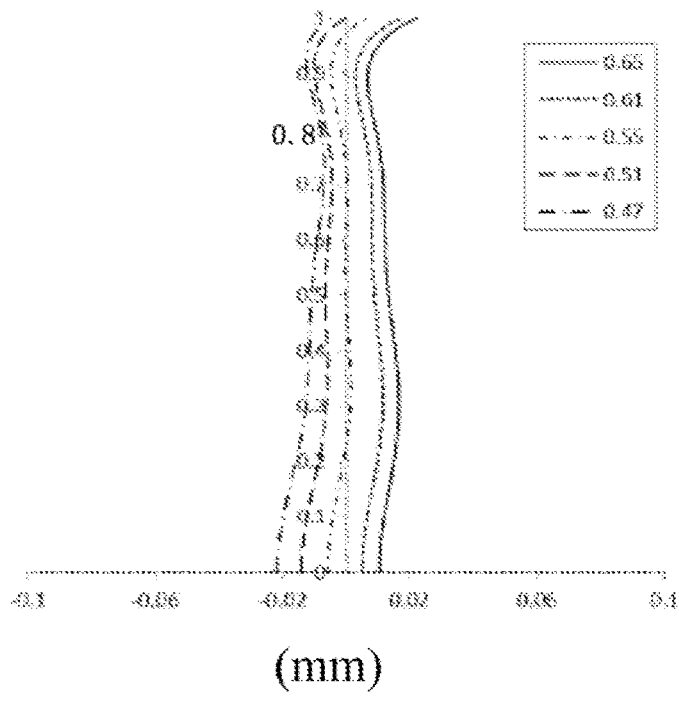
FIG. 22A to FIG. 22D illustrate a longitudinal aberration curve, an astigmatism curve, a distortion curve and a lateral color curve of an optical imaging lens assembly respectively according to embodiment 11.
Figure 22B:
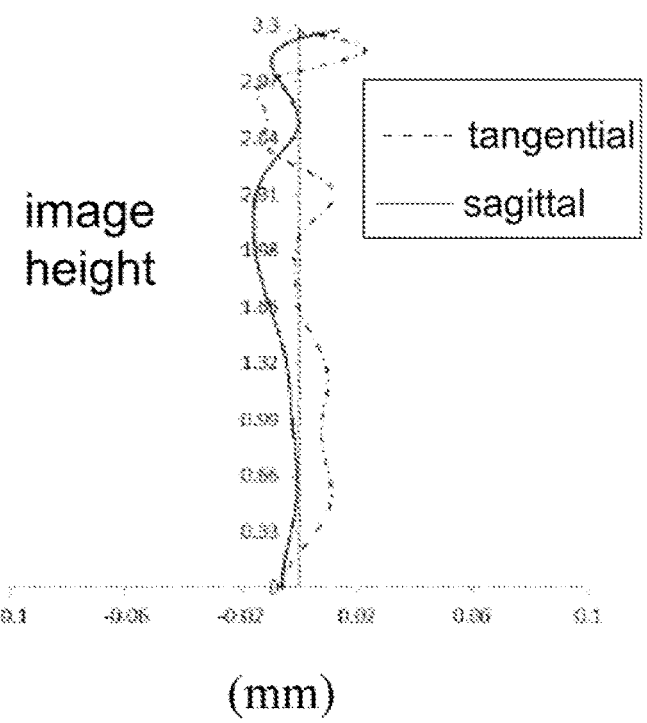
Figure 22C:
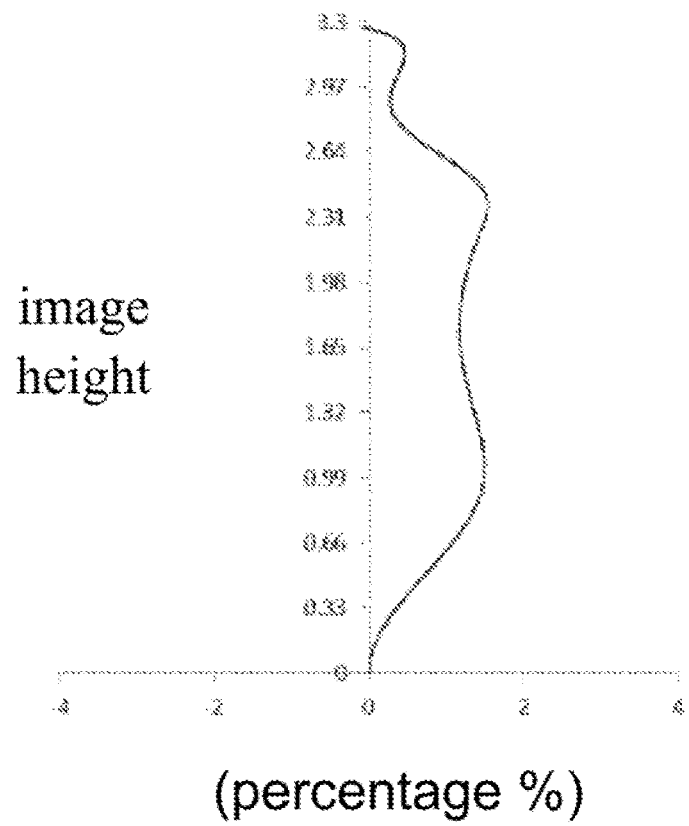
Figure 22D:
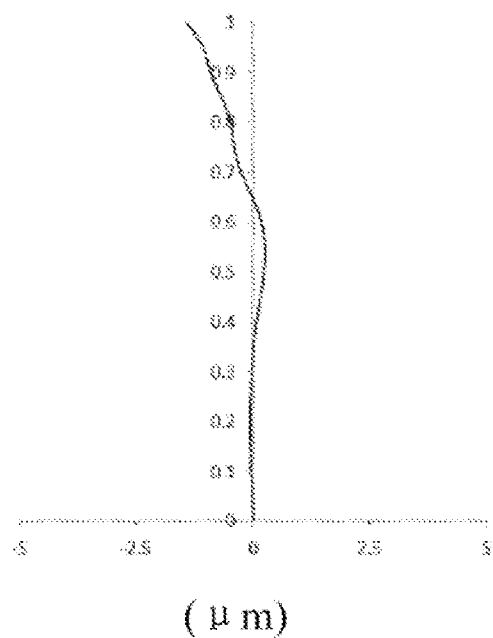

FIG. 22A illustrates a longitudinal aberration curve of the optical imaging lens assembly according to embodiment 11 to represent deviation of a convergence focal point after light with different wavelengths passes through the lens. FIG. 22B illustrates an astigmatism curve of the optical imaging lens assembly according to embodiment 11 to represent a tangential image surface curvature and a sagittal image surface curvature. FIG. 22O illustrates a distortion curve of the optical imaging lens assembly according to embodiment 11 to represent a distortion value under different viewing angles. FIG. 22D illustrates a lateral color curve of the optical imaging lens assembly according to embodiment 11 to represent deviation of different image heights on the imaging surface after the light passes through the lens. According to FIG. 22A to FIG. 22D, it can be seen that the optical imaging lens assembly provided in embodiment 11 can achieve high imaging quality.

Embodiment 12

Figure 23:
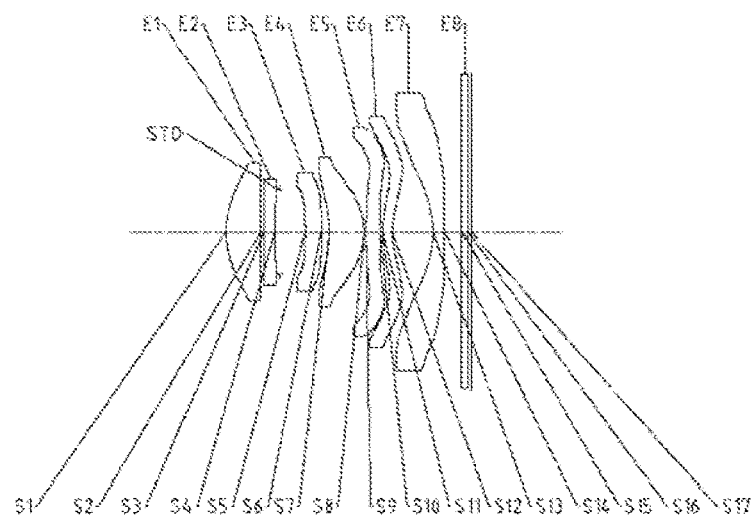
FIG. 23 is a schematic structure diagram of an optical imaging lens assembly according to embodiment 12 of the application.

An optical imaging lens assembly according to embodiment 12 of the application is described below with reference to FIG. 23 to FIG. 24D. FIG. 23 is a schematic structure diagram of an optical imaging lens assembly according to embodiment 12 of the application.

As shown in FIG. 23, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a negative refractive power, an object-side surface S5 thereof is a concave surface, and an image-side surface S6 is a concave surface. The fourth lens E4 has a positive refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a concave surface. The sixth lens E6 has a negative refractive power, an object-side surface S11 thereof is a convex surface, and an image-side surface S12 is a concave surface. The seventh lens E7 has a negative refractive power, an object-side surface S13 thereof is a concave surface, and an image-side surface S14 is a convex surface. The optical filter E8 has an object-side surface S15 and an image-side surface S16. Light from an object sequentially penetrates through each of the surfaces S1 to S16 and is finally image on the imaging surface S17.

Table 34 shows a surface type, radius of curvature, thickness, material and conic coefficient of each lens of the optical imaging lens assembly according to embodiment 12. Units of the radius of curvature and the thickness are mm.

TABLE 34

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspherical | 1.8308 | 0.6766 | 1.55 | 64.1 | −0.2823 |

TABLE 34-continued

| Surface number | Surface type | Radius of curvature | Thickness | Material Refractive index | Abbe number | Conic coefficient |
|---|---|---|---|---|---|---|
| S2 | Aspherical | 29.5390 | 0.0626 | | | −99.0000 |
| S3 | Aspherical | 113.5070 | 0.2100 | 1.67 | 20.4 | 99.0000 |
| S4 | Aspherical | 8.2899 | 0.0934 | | | −3.6890 |
| ST0 | Spherical | Infinite | 0.4972 | | | 0.0000 |
| S5 | Aspherical | −168.9187 | 0.3097 | 1.65 | 23.5 | −99.0000 |
| S6 | Aspherical | 188.1432 | 0.1591 | | | −99.0000 |
| S7 | Aspherical | −2.1667 | 0.6797 | 1.55 | 64.1 | −1.2600 |
| S8 | Aspherical | −1.0851 | 0.0300 | | | −0.4992 |
| S9 | Aspherical | 22.3154 | 0.2773 | 1.55 | 64.1 | 79.9618 |
| S10 | Aspherical | 54.8845 | 0.0457 | | | 71.5446 |
| S11 | Aspherical | 2.1175 | 0.1847 | 1.67 | 20.4 | −7.5982 |
| S12 | Aspherical | 1.4936 | 0.7961 | | | −6.4928 |
| S13 | Aspherical | −1.9215 | 0.2264 | 1.55 | 64.1 | −2.0194 |
| S14 | Aspherical | −44.6946 | 0.3317 | | | −99.0000 |
| S15 | Spherical | Infinite | 0.1100 | 1.52 | 64.2 | |
| S16 | Spherical | Infinite | 0.0600 | | | |
| S17 | Spherical | Infinite | | | | |

Table 35 shows higher-order coefficients applied to each aspherical mirror surface in embodiment 12. The surface type of each aspherical surface may be defined by formula (1) in embodiment 1.

TABLE 35

| Surface number | A4 | A6 | A8 | A10 | A12 |
|---|---|---|---|---|---|
| S1 | −2.8378E−03 | 8.2507E−03 | −3.4378E−02 | 4.4350E−02 | −3.5483E−02 |
| S2 | −5.8764E−02 | 7.2948E−02 | −4.3194E−02 | −5.0649E−02 | 1.0419E−01 |
| S3 | −5.8365E−02 | 1.3435E−01 | −1.0260E−01 | −6.1592E−02 | 2.0765E−01 |
| S4 | −2.8984E−02 | 7.1690E−02 | −1.1038E−01 | 2.3078E−02 | 9.4744E−02 |
| S5 | −1.6337E−01 | −8.2156E−02 | −4.0875E−01 | 1.5860E+00 | −3.0932E+00 |
| S6 | −5.4411E−02 | −8.9888E−02 | −8.3744E−02 | 3.0033E−01 | −3.4472E−01 |
| S7 | 8.8486E−02 | −3.7526E−03 | −2.0212E−01 | 3.5339E−01 | −2.5407E−01 |
| S8 | 2.8094E−01 | −4.0321E−01 | 4.7875E−01 | −3.9081E−01 | 2.1855E−01 |
| S9 | 7.8751E−02 | −7.7483E−02 | 9.0492E−02 | −8.7971E−02 | 4.0299E−02 |
| S10 | −4.5795E−02 | 1.9283E−01 | −1.7378E−01 | 7.0585E−02 | −1.5749E−02 |
| S11 | −1.6914E−01 | −7.5487E−02 | 9.2220E−02 | −7.6429E−02 | 3.5132E−02 |
| S12 | −1.6732E−02 | −7.0878E−02 | 6.2899E−02 | −3.4407E−02 | 1.0832E−02 |
| S13 | 6.4502E−02 | −1.8715E−01 | 1.7896E−01 | −7.5411E−02 | 1.4603E−02 |
| S14 | 8.4643E−02 | −1.8813E−01 | 1.5102E−01 | −6.8264E−02 | 1.9512E−02 |

| Surface number | A14 | A16 | A18 | A20 |
|---|---|---|---|---|
| S1 | 9.8376E−03 | −2.0674E−06 | 0.0000E+00 | 0.0000E+00 |
| S2 | −6.7266E−02 | 1.6333E−02 | 0.0000E+00 | 0.0000E+00 |
| S3 | −1.6819E−01 | 4.6063E−02 | 0.0000E+00 | 0.0000E+00 |
| S4 | −1.4920E−01 | 6.8812E−02 | 0.0000E+00 | 0.0000E+00 |
| S5 | 2.8194E+00 | −9.7334E−01 | 0.0000E+00 | 0.0000E+00 |
| S6 | 1.9894E−01 | −4.4201E−02 | 0.0000E+00 | 0.0000E+00 |
| S7 | 8.7343E−02 | −1.1911E−02 | 0.0000E+00 | 0.0000E+00 |
| S8 | −6.7537E−02 | 8.8864E−03 | 0.0000E+00 | 0.0000E+00 |
| S9 | −8.5814E−03 | 6.9936E−04 | 0.0000E+00 | 0.0000E+00 |
| S10 | 1.9363E−03 | −1.0579E−04 | 0.0000E+00 | 0.0000E+00 |
| S11 | −7.9868E−03 | 6.4278E−04 | 4.5252E−05 | −7.6376E−06 |
| S12 | −1.4383E−03 | −7.5723E−05 | 4.0041E−05 | −2.9616E−06 |
| S13 | −6.3676E−04 | −2.2410E−04 | 3.6842E−05 | −1.7354E−06 |
| S14 | −3.6118E−03 | 4.1750E−04 | −2.7160E−05 | 7.5351E−07 |

Table 36 shows effective focal lengths f1 to f7 of the lenses in embodiment 12, a total effective focal length f of the optical imaging lens assembly, a TTL of the optical imaging lens assembly and a half of the diagonal length ImgH of an effective pixel region on the imaging surface S17 of the optical imaging lens assembly.

TABLE 36

| f1(mm) | 3.54 | f(mm) | 3.58 |
|---|---|---|---|
| f2(mm) | −13.41 | TTL(mm) | 4.07 |
| f3(mm) | −137.86 | ImgH(mm) | 3.06 |
| f4(mm) | 3.26 | | |
| f5(mm) | 68.65 | | |
| f6(mm) | −8.62 | | |
| f7(mm) | −3.68 | | |

Figure 24A:
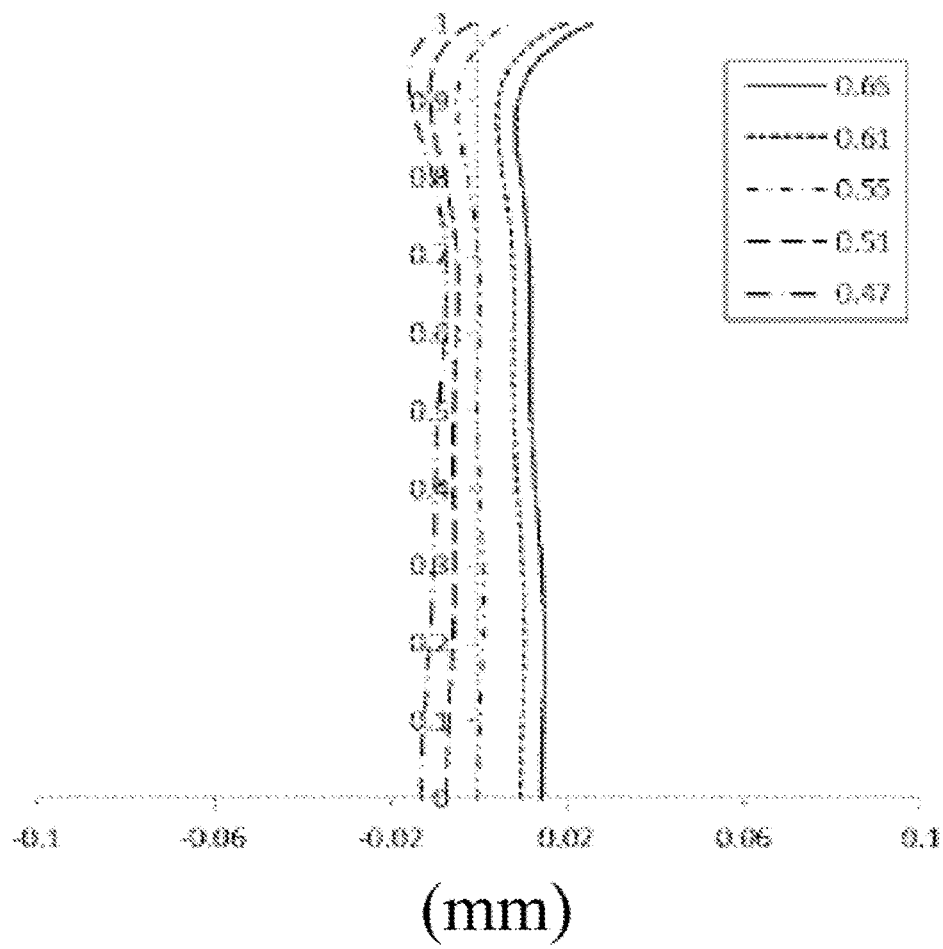
FIG. 24A to FIG. 24D illustrate a longitudinal aberration curve, an astigmatism curve, a distortion curve and a lateral color curve of an optical imaging lens assembly respectively according to embodiment 12.
Figure 24B:
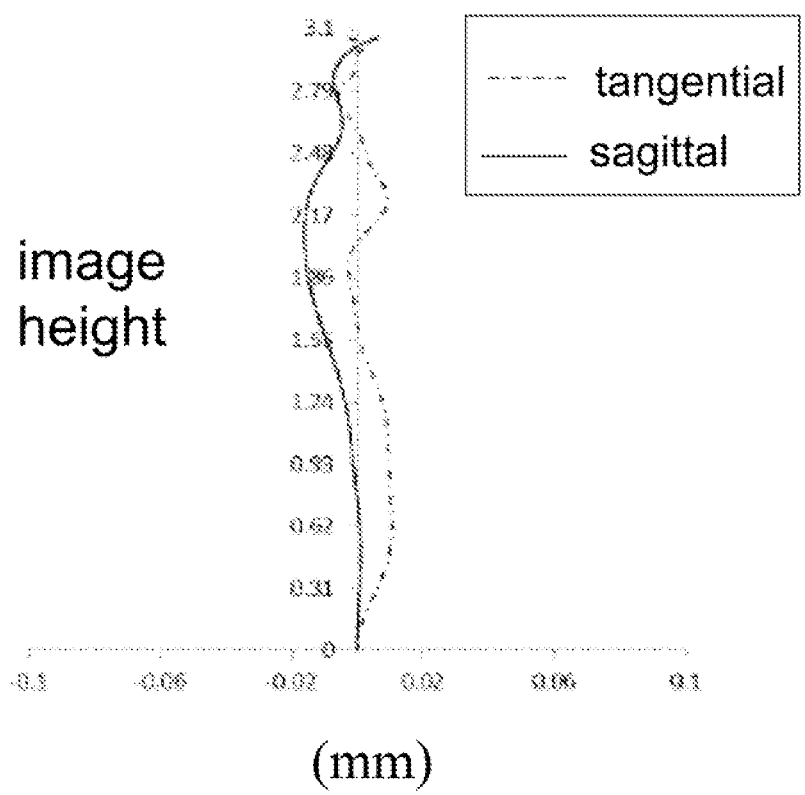
Figure 24C:
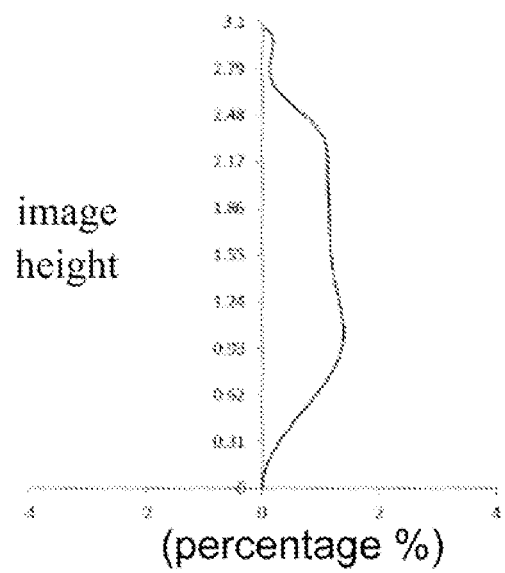
Figure 24D:
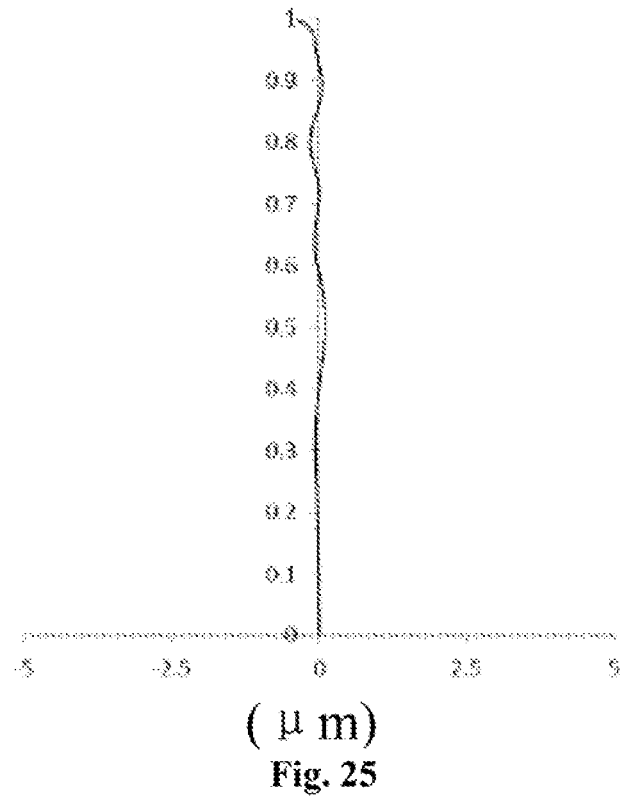

FIG. 24A illustrates a longitudinal aberration curve of the optical imaging lens assembly according to embodiment 12 to represent deviation of a convergence focal point after light with different wavelengths passes through the lens. FIG. 24B illustrates an astigmatism curve of the optical imaging lens assembly according to embodiment 12 to represent a tangential image surface curvature and a sagittal image surface curvature. FIG. 24C illustrates a distortion curve of the optical imaging lens assembly according to embodiment 12 to represent a distortion value under different viewing angles. FIG. 24D illustrates a lateral color curve of the optical imaging lens assembly according to embodiment 12 to represent deviation of different image heights on the imaging surface after the light passes through the lens. According to FIG. 24A to FIG. 24D, it can be seen that the optical imaging lens assembly provided in embodiment 12 can achieve high imaging quality.

Embodiment 13

Figure 25:
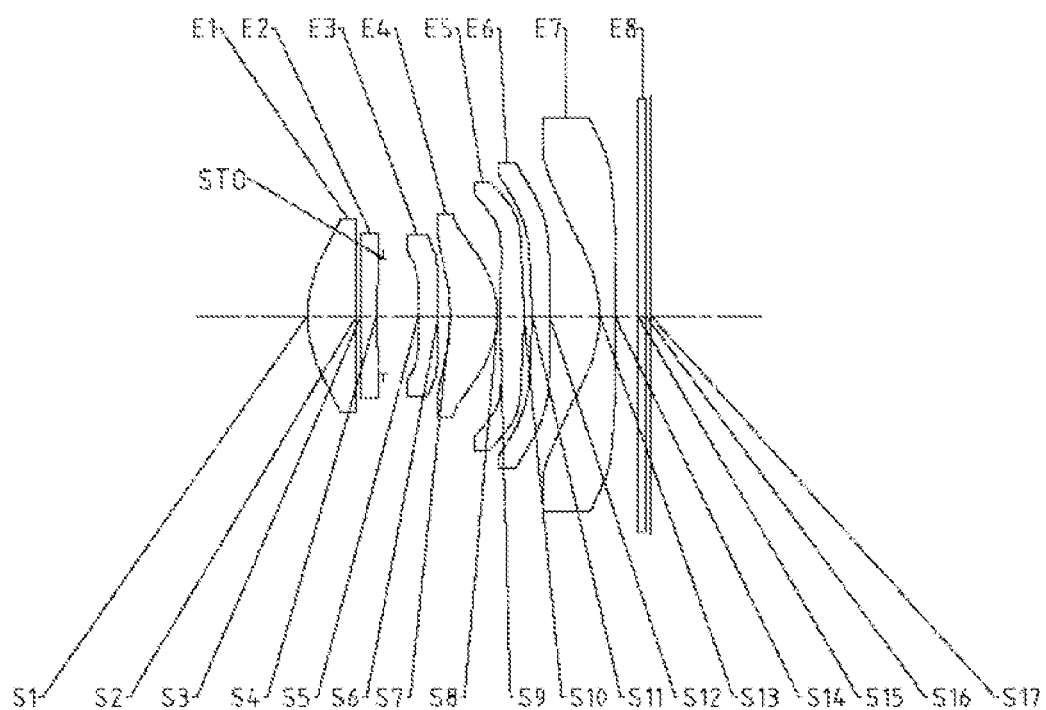
FIG. 25 is a schematic structure diagram of an optical imaging lens assembly according to embodiment 13 of the application.

An optical imaging lens assembly according to embodiment 13 of the application is described below with reference to FIG. 25 to FIG. 26D. FIG. 25 is a schematic structure diagram of an optical imaging lens assembly according to embodiment 13 of the application.

As shown in FIG. 25, the optical imaging lens assembly according to an exemplary implementation of the application includes, sequentially from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a negative refractive power, an object-side surface S5 thereof is a convex surface, and an image-side surface S6 is a concave surface. The fourth lens E4 has a positive refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a concave surface, and an image-side surface S12 is a convex surface. The seventh lens E1 has a negative refractive power, an object-side surface S13 thereof is a concave surface, and an image-side surface S14 is a concave surface. The optical filter E8 has an object-side surface S15 and an image-side surface S16. Light from an object sequentially penetrates through each of the surfaces S1 to S16 and is finally image on the imaging surface S17.

Table 37 shows a surface type, radius of curvature, thickness, material and conic coefficient of each lens of the optical imaging lens assembly according to embodiment 13. Units of the radius of curvature and the thickness are mm.

TABLE 37

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| S1 | Aspherical | 1.8240 | 0.6811 | 1.55 | 64.1 | −0.3002 |
| S2 | Aspherical | 33.7676 | 0.0626 | | | −48.1318 |
| S3 | Aspherical | 180.5127 | 0.2100 | 1.67 | 20.4 | −99.0000 |
| S4 | Aspherical | 10.4660 | 0.1006 | | | 51.7385 |
| STO | Spherical | Infinite | 0.4891 | | | 0.0000 |
| S5 | Aspherical | 24.7812 | 0.2763 | 1.65 | 23.5 | −12.5747 |
| S6 | Aspherical | 17.2379 | 0.1666 | | | −89.7305 |
| S7 | Aspherical | −2.2372 | 0.6551 | 1.55 | 64.1 | −1.5723 |
| S8 | Aspherical | −1.0971 | 0.0300 | | | −0.4981 |
| S9 | Aspherical | 107.0112 | 0.3323 | 1.55 | 64.1 | 79.9618 |
| S10 | Aspherical | −11.3363 | 0.1133 | | | 30.5212 |
| S11 | Aspherical | −5.4214 | 0.2383 | 1.67 | 20.4 | −88.1298 |
| S12 | Aspherical | −1,924.7646 | 0.6986 | | | −99.0000 |
| S13 | Aspherical | −1.7949 | 0.2100 | 1.55 | 64.1 | −1.8969 |
| S14 | Aspherical | 234.0159 | 0.3184 | | | 99.0000 |
| S15 | Spherical | Infinite | 0.1100 | 1.52 | 64.2 | |
| S16 | Spherical | Infinite | 0.0659 | | | |
| S17 | Spherical | Infinite | | | | |

Table 38 shows higher-order coefficients applied to each aspherical mirror surface in embodiment 13. The surface type of each aspherical surface may be defined by formula (1) in embodiment 1.

TABLE 38

| Surface number | A4 | A6 | A8 | A10 | A12 |
|---|---|---|---|---|---|
| S1 | −2.7625E−03 | 1.0521E−02 | −4.1437E−02 | 5.5587E−02 | −4.5636E−02 |
| S2 | −6.4436E−02 | 9.0992E−02 | −7.4166E−02 | −1.5466E−02 | 7.8037E−02 |
| S3 | −6.8357E−02 | 1.7554E−01 | −1.9865E−01 | 9.7311E−02 | 4.3605E−02 |
| S4 | −3.6326E−02 | 1.0919E−01 | −2.3275E−01 | 3.1367E−01 | −3.2009E−01 |
| S5 | −1.7540E−01 | −5.2525E−02 | −4.5785E−01 | 1.4718E+00 | −2.6140E+00 |
| S6 | −7.9982E−02 | −5.2659E−03 | −2.3485E−01 | 4.1592E−01 | −3.4914E−01 |
| S7 | 4.2735E−02 | 2.1843E−01 | −6.2265E−01 | 8.0683E−01 | −5.4589E−01 |
| S8 | 2.9231E−01 | −3.3249E−01 | 2.3456E−01 | −6.5692E−02 | −4.1845E−03 |
| S9 | 1.1447E−01 | −1.6911E−01 | 8.7131E−02 | −1.6071E−02 | −1.0362E−02 |
| S10 | −9.1296E−04 | 3.1391E−02 | −1.3134E−02 | −1.3837E−02 | 9.2902E−03 |
| S11 | 1.0296E−01 | −2.1893E−01 | 2.1645E−01 | −1.1462E−01 | 2.0094E−02 |
| S12 | 3.6179E−02 | −7.3116E−02 | 1.2834E−02 | 3.6031E−02 | −3.3649E−02 |
| S13 | 4.8294E−02 | −1.6029E−01 | 1.5442E−01 | −6.2847E−02 | 1.0902E−02 |
| S14 | 1.1221E−01 | −2.0850E−01 | 1.6280E−01 | −7.2483E−02 | 2.0064E−02 |

| Surface number | A14 | A16 | A18 | A20 |
|---|---|---|---|---|
| S1 | 1.4611E−02 | −9.4085E−04 | 0.0000E+00 | 0.0000E+00 |
| S2 | −5.5843E−02 | 1.4039E−02 | 0.0000E+00 | 0.0000E+00 |
| S3 | −7.4319E−02 | 2.3777E−02 | 0.0000E+00 | 0.0000E+00 |
| S4 | 1.7442E−01 | −3.6554E−02 | 0.0000E+00 | 0.0000E+00 |
| S5 | 2.2952E+00 | −7.8307E−01 | 0.0000E+00 | 0.0000E+00 |
| S6 | 1.5972E−01 | −2.9847E−02 | 0.0000E+00 | 0.0000E+00 |
| S7 | 1.9065E−01 | −2.7309E−02 | 0.0000E+00 | 0.0000E+00 |
| S8 | 1.0754E−02 | −2.2945E−03 | 0.0000E+00 | 0.0000E+00 |
| S9 | 5.7845E−03 | −7.7965E−04 | 0.0000E+00 | 0.0000E+00 |
| S10 | −1.9430E−03 | 1.3620E−04 | 0.0000E+00 | 0.0000E+00 |
| S11 | 7.5849E−03 | −4.3760E−03 | 7.9395E−04 | −5.1443E−05 |
| S12 | 1.3686E−02 | −2.9616E−03 | 3.3330E−04 | −1.5414E−05 |
| S13 | −5.5072E−06 | −2.8228E−04 | 3.9064E−05 | −1.7317E−06 |
| S14 | −3.5131E−03 | 3.7696E−04 | −2.2522E−05 | 5.7157E−07 |

Table 39 shows effective focal lengths f1 to f7 of the lenses in embodiment 13, a total effective focal length f of the optical imaging lens assembly, a TTL of the optical imaging lens assembly and a half of the diagonal length ImgH of an effective pixel region on the imaging surface S17 of the optical imaging lens assembly.

TABLE 39

| f1(mm) | 3.50 | f(mm) | 3.58 |
|---|---|---|---|
| f2(mm) | −13.65 | TTL(mm) | 4.07 |
| f3(mm) | −89.02 | ImgH(mm) | 3.03 |
| f4(mm) | 3.28 | | |
| f5(mm) | 18.79 | | |
| f6(mm) | −8.15 | | |
| f7(mm) | −3.26 | | |

Figure 26A:
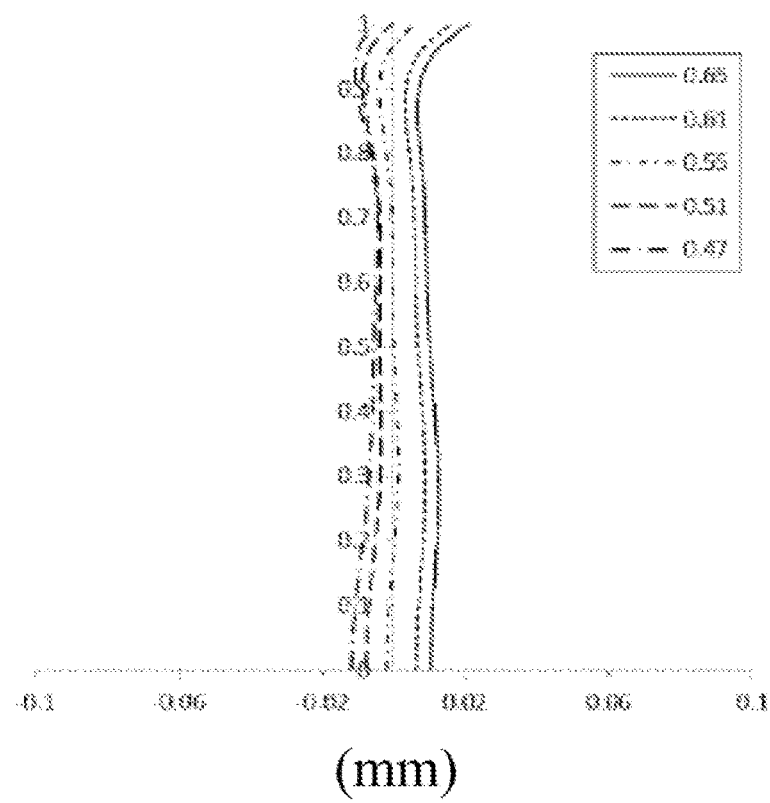
FIG. 26A to FIG. 26D illustrate a longitudinal aberration curve, an astigmatism curve, a distortion curve and a lateral color curve of an optical imaging lens assembly respectively according to embodiment 13.
Figure 26B:
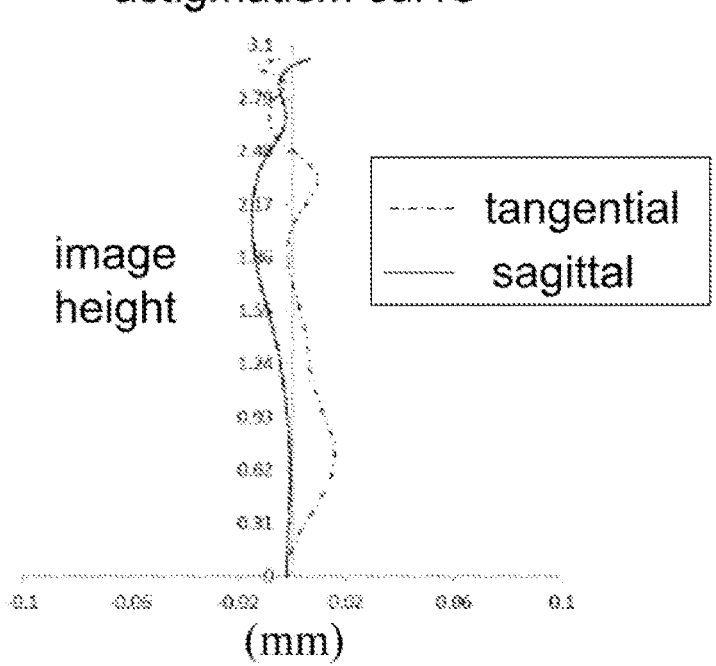
Figure 26C:
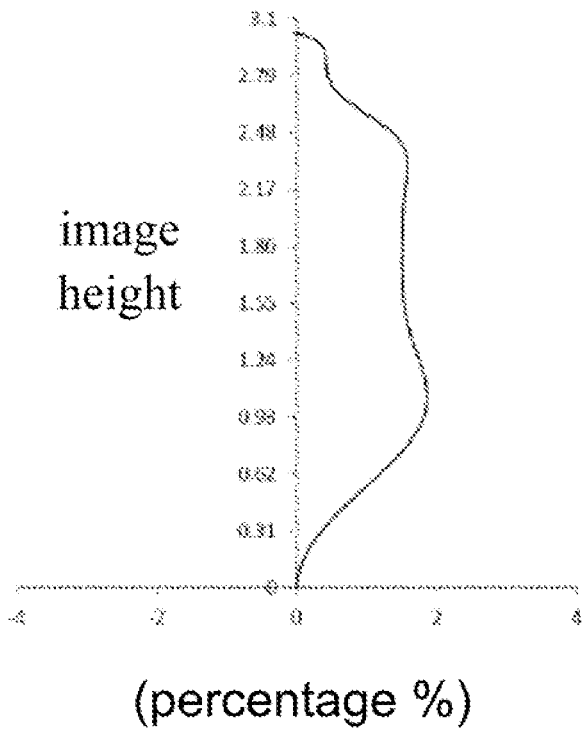
Figure 26D:
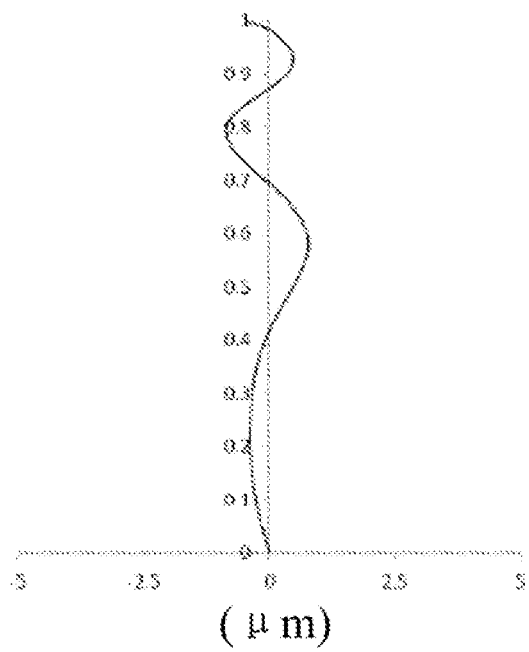

FIG. 26A illustrates a longitudinal aberration curve of the optical imaging lens assembly according to embodiment 13 to represent deviation of a convergence focal point after light with different wavelengths passes through the lens. FIG. 26B illustrates an astigmatism curve of the optical imaging lens assembly according to embodiment 13 to represent a tangential image surface curvature and a sagittal image surface curvature. FIG. 26C illustrates a distortion curve of the optical imaging lens assembly according to embodiment 13 to represent a distortion value under different viewing angles. FIG. 26D illustrates a lateral color curve of the optical imaging lens assembly according to embodiment 13 to represent deviation of different image heights on the imaging surface after the light passes through the lens. According to FIG. 26A to FIG. 26D, it can be seen that the optical imaging lens assembly provided in embodiment 13 can achieve high imaging quality.

From the above, embodiment 1 to embodiment 13 meet relationships shown in Tables 40 and 41 respectively.

TABLE 40

| Conditional expression | embodiment | | | | | | |
|---|---|---|---|---|---|---|---|
| | 1 | 2 | 3 | 4 | 5 | 6 | 7 |
| f/EPD | 1.41 | 1.50 | 1.64 | 1.76 | 1.81 | 1.84 | 1.84 |
| f4/f | 1.06 | 0.99 | 0.97 | 0.94 | 0.95 | 1.05 | 0.92 |
| f1/CT1 | 5.35 | 5.03 | 5.04 | 5.12 | 5.07 | 6.38 | 5.05 |
| (R3 + R4)/(R3 − R4) | 5.99 | 0.93 | 1.41 | 1.42 | 1.30 | −45.55 | 1.04 |
| R13/CT7 | −11.33 | −9.08 | −9.13 | −9.41 | −9.34 | −9.39 | −9.04 |
| β7 | 15.0 | 33.0 | 22.0 | 25.0 | 38.0 | 51.0 | 25.0 |
| |f6/CT6| | 58.09 | 42.78 | 54.78 | 42.62 | 32.70 | 32.01 | 63.07 |
| |f1/f7| | 1.24 | 1.08 | 1.06 | 1.00 | 1.01 | 1.20 | 0.96 |
| f4/R7 | −1.36 | −1.40 | −1.55 | −1.58 | −1.65 | −1.77 | −1.55 |
| |R9/R10| | 3.55 | 2.71 | 1.88 | 2.83 | 1.70 | 4.55 | 1.42 |

TABLE 41

| Conditional expression | embodiment | | | | | |
|---|---|---|---|---|---|---|
| | 8 | 9 | 10 | 11 | 12 | 13 |
| f/EPD | 1.87 | 1.87 | 1.81 | 1.88 | 1.87 | 1.87 |
| f4/f | 0.93 | 0.92 | 0.95 | 0.89 | 0.91 | 0.92 |
| f1/CT1 | 5.82 | 5.23 | 4.88 | 6.40 | 5.24 | 5.14 |
| (R3 + R4)/(R3 − R4) | 1.56 | 1.13 | 0.57 | −1.00 | 1.16 | 1.10 |
| R13/CT7 | −9.27 | −8.79 | −9.10 | −8.88 | −8.49 | −8.55 |
| β7 | 19.0 | 35.0 | 39.0 | 25.0 | 40.0 | 36.0 |
| |f6/CT6| | 53.73 | 40.24 | 33.89 | 46.67 | 46.66 | 34.19 |

TABLE 41-continued

| Conditional expression | embodiment | | | | | |
|---|---|---|---|---|---|---|
| | 8 | 9 | 10 | 11 | 12 | 13 |
| \|f1/f7\| | 1.05 | 0.97 | 0.97 | 1.08 | 0.96 | 1.07 |
| f4/R7 | −1.48 | −1.54 | −1.63 | −1.30 | −1.50 | −1.46 |
| \|R9/R10\| | 0.22 | 2.86 | 1.02 | 0.07 | 0.41 | 9.44 |

The application also provides an imaging device, of which an electronic photosensitive element may be a CCD or a CMOS. The imaging device may be an independent imaging device such as a digital camera, and may also be an imaging module integrated into a mobile electronic device such as a mobile phone. The imaging device is provided with the abovementioned optical imaging lens assembly.

The above description is only description about the preferred embodiments of the application and adopted technical principles. Those skilled in the art should know that the scope of invention involved in the application is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the application.

What is claimed is:

1. An optical imaging lens assembly, comprising a first lens, a second lens, a third lens, a fourth lens, a fifth lens, a sixth lens and a seventh lens which are provided in sequence from an object side to an image side along an optical axis and have refractive powers, wherein
   the first lens has a positive refractive power;
   the fourth lens has a positive refractive power, an object-side surface of the fourth lens is a concave surface, and an image-side surface is a convex surface;
   an object-side surface of the fifth lens is a convex surface;
   the sixth lens has a negative refractive power; and
   the seventh lens has a negative refractive power,
   wherein a radius of curvature R13 of an object-side surface of the seventh lens and a center thickness CT7 of the seventh lens satisfy the following relationship: −12<R13/CT7<−8,
   wherein an effective focal length f4 of the fourth lens and an effective focal length f of the optical imaging lens assembly satisfy the following relationship: 0.5<f4/f<1.5
   wherein an object-side surface of the seventh lens is a concave surface.

2. The optical imaging lens assembly as claimed in claim 1, wherein an effective focal length f1 of the first lens and a center thickness CT1 of the first lens satisfy the following relationship: 4.5<f1/CT1<6.5.

3. The optical imaging lens assembly as claimed in claim 1, wherein an effective focal length f4 of the fourth lens and a radius of curvature R7 of the object-side surface of the fourth lens satisfy the following relationship: −2<f4/R7<−1.

4. The optical imaging lens assembly as claimed in claim 1, wherein a radius of curvature R9 of the object-side surface of the fifth lens and a radius of curvature R10 of an image-side surface of the fifth lens satisfy the following relationship: 0<|R9/R10|<10.

5. The optical imaging lens assembly as claimed in claim 1, wherein an effective focal length f6 of the sixth lens and a center thickness CT6 of the sixth lens satisfy the following relationship: 32<|f6/CT6|<64.

6. The optical imaging lens assembly as claimed in claim 1, wherein a maximum inclination angle β7 of an image-side surface of the seventh lens satisfies the following relationship: 15°≤β7≤51°.

7. The optical imaging lens assembly as claimed in 1, wherein an effective focal length f of the optical imaging lens assembly and an Entrance Pupil Diameter (EPD) of the optical imaging lens assembly satisfy the following relationship: f/EPD≤2.0.

8. The optical imaging lens assembly as claimed in 1, wherein a radius of curvature R3 of an object-side surface of the second lens and a radius of curvature R4 of an image-side surface of the second lens satisfy the following relationship: −46<(R3+R4)/(R3−R4)<6.

9. The optical imaging lens assembly as claimed in 1, wherein an effective focal length f1 of the first lens and an effective focal length f7 of the seventh lens satisfy the following relationship: 0.5<|f1/f7|<1.5.

10. An optical imaging lens assembly, comprising, sequentially a first lens, a second lens, a third lens, a fourth lens, a fifth lens, a sixth lens and a seventh lens which are provided in sequence from an object side to an image side along an optical axis and have refractive powers, wherein
   the first lens has a positive refractive power;
   the fourth lens has a positive refractive power, and an object-side surface of the fourth lens is a concave surface;
   an object-side surface of the fifth lens is a convex surface;
   the sixth lens has a negative refractive power;
   the seventh lens has a negative refractive power; and
   an effective focal length f4 of the fourth lens and an effective focal length f of the optical imaging lens assembly satisfy the following relationship: 0.5<f4/f<1.5,
   wherein a radius of curvature R13 of an object-side surface of the seventh lens and a center thickness CT7 of the seventh lens satisfy the following relationship: −12<R13/CT7<−8.

11. The optical imaging lens assembly as claimed in claim 10, wherein an effective focal length f1 of the first lens and a center thickness CT1 of the first lens satisfy the following relationship: 4.5<f1/CT1<6.5.

12. The optical imaging lens assembly as claimed in claim 10, wherein an effective focal length f4 of the fourth lens and a radius of curvature R7 of the object-side surface of the fourth lens satisfy the following relationship: −2<f4/R7<−1.

13. The optical imaging lens assembly as claimed in claim 10, wherein a radius of curvature R9 of the object-side surface of the fifth lens and a radius of curvature R10 of an image-side surface of the fifth lens satisfy the following relationship: 0<|R9/R10|<10.

14. The optical imaging lens assembly as claimed in claim 10, wherein an effective focal length f6 of the sixth lens and a center thickness CT6 of the sixth lens satisfy the following relationship: 32<|f6/CT6|<64.

15. The optical imaging lens assembly as claimed in claim 10, wherein a maximum inclination angle β7 of an image-side surface of the seventh lens satisfies the following relationship: 15°≤β7≤51°.

16. The optical imaging lens assembly as claimed in claim 10, wherein an effective focal length f of the optical imaging lens assembly and an Entrance Pupil Diameter (EPD) of the optical imaging lens assembly satisfy the following relationship: f/EPD≤2.0, or wherein a radius of curvature R3 of an object-side surface of the second lens and a radius of curvature R4 of an image-side surface of the second lens satisfy the following relationship: −46<(R3+R4)/(R3−R4)<6, or wherein an effective focal length f1 of the first lens and an effective focal length f7 of the seventh lens satisfy the following relationship: 0.5<|f1/f7|<1.5.

\* \* \* \* \*